(12) United States Patent
Matsusaka et al.

(10) Patent No.: US 8,270,095 B2
(45) Date of Patent: Sep. 18, 2012

(54) VARIABLE-POWER OPTICAL SYSTEM, IMAGE PICKUP DEVICE, AND DIGITAL APPARATUS

(75) Inventors: Keiji Matsusaka, Osaka (JP); Soh Ohzawa, Toyonaka (JP); Yasunari Fukuta, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 609 days.

(21) Appl. No.: 12/519,211

(22) PCT Filed: Nov. 27, 2007

(86) PCT No.: PCT/JP2007/072824
§ 371 (c)(1),
(2), (4) Date: Jun. 15, 2009

(87) PCT Pub. No.: WO2008/075539
PCT Pub. Date: Jun. 26, 2008

(65) Prior Publication Data
US 2010/0045808 A1    Feb. 25, 2010

(30) Foreign Application Priority Data
Dec. 20, 2006    (JP) ................................. 2006-342947

(51) Int. Cl.
*G02B 15/14* (2006.01)
(52) U.S. Cl. .......................... 359/686; 359/682; 359/683
(58) Field of Classification Search .................. 359/686, 359/680–682
See application file for complete search history.

(56) References Cited

U.S. PATENT DOCUMENTS

| | | | | |
|---|---|---|---|---|
| 5,748,384 A * | 5/1998 | Sensui | | 359/686 |
| 5,768,942 A | 6/1998 | Gruber et al. | | 74/89.14 |
| 5,963,377 A | 10/1999 | Okada et al. | | 359/686 |
| 6,710,931 B1 * | 3/2004 | Misaka | | 359/686 |
| 6,809,880 B2 * | 10/2004 | Murata | | 359/686 |
| 7,265,912 B2 * | 9/2007 | Matsusaka | | 359/691 |
| 7,379,250 B2 * | 5/2008 | Souma | | 359/686 |
| 7,944,619 B2 * | 5/2011 | Hosokawa | | 359/678 |
| 2004/0130647 A1 | 7/2004 | Kuba | | 348/335 |
| 2005/0046963 A1 | 3/2005 | Adachi | | 359/689 |
| 2006/0092815 A1 * | 5/2006 | Kimura et al. | | 369/112.08 |
| 2006/0268426 A1 | 11/2006 | Arimoto et al. | | 359/686 |
| 2011/0194191 A1 * | 8/2011 | Shibata et al. | | 359/680 |

FOREIGN PATENT DOCUMENTS

| | | |
|---|---|---|
| JP | 9-90224 A | 4/1997 |
| JP | 9-159916 A | 6/1997 |
| JP | 11-109230 A | 4/1999 |
| JP | 2001-116992 A | 4/2001 |
| JP | 2004-205796 A | 7/2004 |
| JP | 2005-55725 A | 3/2005 |
| JP | 2005-77825 A | 3/2005 |
| JP | 2006-330349 A | 12/2006 |
| WO | WO 2008/075539 A1 | 6/2008 |

* cited by examiner

*Primary Examiner* — Jordan Schwartz
(74) *Attorney, Agent, or Firm* — Cozen O'Connor

(57) ABSTRACT

A variable-power optical system includes, in order from an object side thereof: a first lens group with a negative optical power; a second lens group with a positive optical power; a third lens group with a negative optical power; and a fourth lens group with a positive optical power. An interval between the first lens group and the second lens group decreases when a power of the variable-power optical system varies from a wide-angle end to a telephoto end. The second lens group includes at least one aspheric surface. The variable-power optical system satisfies the predetermined conditional expressions.

19 Claims, 28 Drawing Sheets

FIG. 2a
FIG. 2b
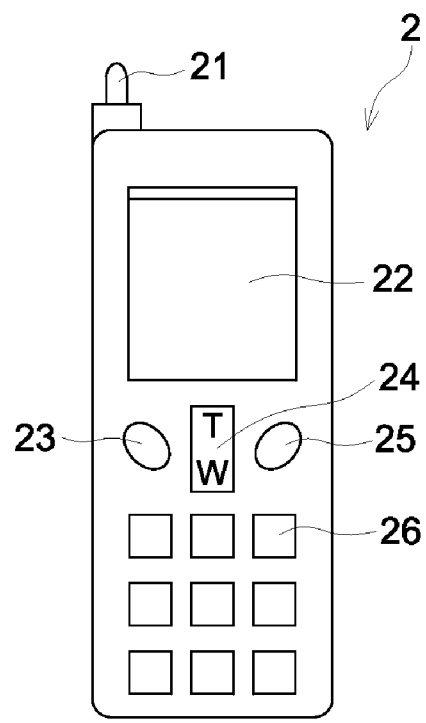
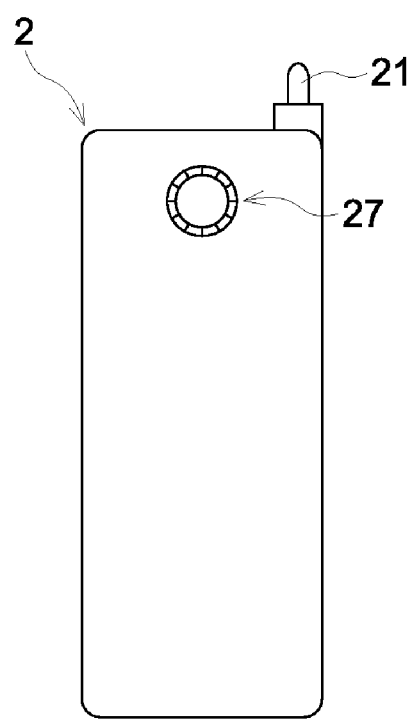

VARIABLE-POWER OPTICAL SYSTEM, IMAGE PICKUP DEVICE, AND DIGITAL APPARATUS

RELATED APPLICATIONS

This application is a U.S. National Stage Phase Application under 35 U.S.C. 371 of International Application No. PCT/JP2007/072824, filed with the Japanese Patent Office on Nov. 27, 2007, which is based on Japanese Patent Application No. 2006-342947.

TECHNICAL FIELD

The present invention relates to a variable-power optical system including a plurality of lens groups wherein power is varied by changing a space between lens groups in an optical axis direction, an image pickup device equipped with this variable-power optical system, and a digital apparatus with this image pickup device mounted thereon, particularly to a variable-power optical system suited for extremely miniaturized configurations.

BACKGROUND ART

In recent years, there has been a remarkable spread of mobile phones and PDAs (Personal Digital Assistant). It has become a common practice to incorporate a compact digital still camera unit and digital video unit in such devices. These devices are characterized by severe restrictions on the size and cost. Therefore, there has been generally used a small-sized image pickup device equipped with a smaller number of pixels than that in a normal digital still camera, and a unifocal optical system including about one to three plastic lenses. In the image pickup device mounted on a mobile information terminal, technology is advancing rapidly toward a further increase in pixel level and functional level. In this context, there has been an intense demand for a compact variable-power optical system compatible with an image pickup element of high pixel level and capable of capturing the image of a subject located far away from a user, wherein this variable-power optical system can be mounted on a mobile phone and others.

For example, the Patent Literature 1 discloses a three-component variable-power optical system with negative-positive-negative components wherein the first lens group is fixed to achieve minimizing the optical system. In the disclosed optical system, however, a power arrangement in the first lens group and lens materials in the second lens group are not optimized, and correction of astigmatism and chromatic aberration becomes insufficient.

The Patent Literature 2 proposes a four-component variable-power optical system with negative-positive-negative-positive components, a so-called light bending optical system wherein the optical axis is bent at right angles and the optical unit is designed to have a slim configuration. However, this system contains a prism for bending the optical axis, and this results in increased costs. Although an attempt for thin configuration has been made, the overall length of the optical system is excessive, and efforts toward compact configuration are insufficient in terms of unit volume.

The Patent Literature 3 proposes a four-component variable-power optical system with negative-positive-negative-positive components wherein all four lenses are movable to ensure both of an increased angle of view and back-focusing. However, this arrangement entails the disadvantages of an increase in the number of movable lens groups, and insufficient correction of spherical aberration and astigmatism. More compact configuration of the variable-power optical system is difficult.

Patent Literature 1: Japanese Unexamined Patent Application Publication No. 2005-55725
Patent Literature 2: Japanese Unexamined Patent Application Publication No. 2004-205796
Patent Literature 3: Japanese Unexamined Patent Application Publication No. 2001-116992

DISCLOSURE OF INVENTION

Technical Problem

In the conventional variable-power optical system proposed so far, efforts for compact configuration are insufficient in terms of unit volume, as viewed from the number of lenses used and the traveling amount of lenses for varying the power. If a further attempt is made for compact configuration of the variable-power optical system, a problem in aberration correction has arisen.

In view of the prior art problems described above, it is an object of the present invention to provide a variable-power optical system, image pickup device and digital apparatus capable of meeting both requirements for satisfactory correction of such aberrations as chromatic aberration and astigmatism, and extremely compact configuration of a variable-power optical system.

Solution to Problem

To solve the aforementioned technical problems, the present invention provides a variable-power optical system, image pickup device and digital apparatus having the following configuration. The terms used in the following description of this Specification are defined as follows:

(a) Refractive index indicates a value with respect to the wavelength of the d line (587.56 nm).

(b) Abbe number is defined as value vd obtained from the following formula when the refractive indexes with respect to the d line, F line (486.13 nm) and C line (656.28 nm) are assumed as nd, nF and nC, and the Abbe number is assumed as vd:

$$vd=(nd-1)/(nF-nC)$$

(c) The representation for a surface shape is based on paraxial curvature.

(d) Optical power for each of single lenses constituting a cemented lens is defined as a optical power when both sides of the surface of each single lens are assumed as being occupied with air.

(e) Aspheric sag is defined as a parameter representing a difference between a distance in the direction of optical axis between the tip of a lens surface and a point on an aspheric curve with respect to the maximum effective radius, and a spherical sag based on a paraxial curvature.

(f) A resin material used for a complex type aspheric lens (a lens formed in an aspheric shape by coating a spherical glass material as a substrate with a thin resin material) has only an additional function of the substrate glass material. Accordingly, this material is not handled as an independent optical member. It will be handled in the same manner as when the substrate glass material has an aspheric surface, and the number of lenses is assumed as one. In this case, the refractive index of the glass material as a substrate is employed as a refractive index of the lens.

(g) In a light bending optical system, prisms are included in counting the lenses.

(h) The terms "concave", "convex", and "meniscus" used with respect to lenses are defined as representing the shape of the lenses in the vicinity of the optical axis (in the vicinity of the center of the lens) (as a representation based on the paraxial curvature).

1. A variable-power optical system comprising, in order from an object side thereof:

a first lens group with a negative optical power;
a second lens group with a positive optical power;
a third lens group with a negative optical power; and
a fourth lens group with a positive optical power, wherein an interval between the first lens group and the second lens group decreases when a power of the variable-power optical system varies from a wide-angle end to a telephoto end, the second lens group includes at least one aspheric surface, and the variable-power optical system satisfies the following conditional expressions (1) through (4):

$$0.2<T1/(fw \times ft)^{1/2}<1.2 \qquad (1)$$

$$\Delta N2>0.15 \qquad (2)$$

$$\Delta v2>20 \qquad (3)$$

$$N1 \geq 1.8 \qquad (4)$$

In the expressions, T1 is an axial thickness from a front lens surface of the first lens group to a rear lens surface of the first lens group, fw is a composite focal length of a total optical system at the wide-angle end, ft is a composite focal length of the total optical system at the telephoto end, $\Delta N2$ is a difference between a mean refractive index of a positive lens or lenses and a mean refractive index of a negative lens or lenses, among lenses in the second lens group, $\Delta v2$ is a difference between a mean Abbe number of a positive lens or lenses and a mean Abbe number of a negative lens or lenses, among lenses in the second lens group, and N1 is a maximum refractive index of lenses in the first lens group.

This configuration is provided as a so-called negative-lead optical system, in which the first lens group located closest to the object has a negative optical power. This ensures that a quick reduction in angle of light coming from the object side at a large angle is provided by the negative optical power of the first lens group, and the overall optical length and the front lens diameter are reduced in terms of size, which are advantageous. Further, in the negative-lead configuration, an increase in error sensitivity can be reduced even when a compact configuration of the optical system is achieved. These advantages are conspicuous in a zoom lens having a variable-power ratio of about 2 to 4 times. Further, use of a negative-positive-negative-positive four-component arrangement ensures compact configuration of the variable-power optical unit resulting from reduced traveling distance at the time of varying the power, excellent telecentricity, and satisfactory correction of spherical aberration, chromatic aberration and astigmatism. Further, at least one aspheric surface is included in the second lens group. This arrangement corrects a spherical aberration which increases as the optical power of the second lens group increases.

The aforementioned conditional expressions (1) through (4) are required to be satisfied in order to provide a compact configuration and excellent optical performances. If the upper limit of the conditional expression (1) is exceeded, a substantial traveling distance of the second lens group at the time of varying the power will be reduced when an attempt is made to ensure a compact configuration of the overall optical length. Then the optical power of the second lens group is increased, and a curvature radius of lenses has to be reduced. This results in an increased difficulty in manufacturing. In the meantime, if the lower limit of the conditional expression (1) cannot be reached, the optical power of the negative lens in the first lens group will be reduced and a rear principal point will move away from the image surface. Thus, if an attempt is made to maintain the same focal length, tendencies that the back focusing is hardly secured relatively and that the exit pupil away is hardly moved away from the image plane, will be conspicuous. If the $\Delta N2$ is below the lower limit of the conditional expression (2), there will be a marked astigmatism resulting from an increase in the Petzval's sum. If the $\Delta n2$ is below the lower limit of the conditional expression (3), there will be insufficient correction of the longitudinal chromatic aberration. If N1 is reduced below the lower limit of the conditional expression (4), the first lens group will be too thick. If an attempt is made to provide a compact configuration, sensitivity of the second lens group to errors will increase. This requires adjustment, and it causes an increase in production cost.

2. The variable-power optical system described in Item 1, wherein the first lens group comprises a meniscus lens with a positive optical power including a convex surface facing the object side, and the meniscus lens satisfies the following conditional expression (5):

$$N1p \geq 1.8 \qquad (5)$$

In the expression, N1p is a refractive index of the meniscus lens.

When the first lens group includes a meniscus lens with a convex surface facing the object side, satisfactory correction of astigmatism is provided. If N1p is reduced below the lower limit of the conditional expression (5), a curvature radius of the image side surface of the positive meniscus lens will be reduced and the effective space between the first lens group and second lens group will be reduced. This will cause easier interference of the lens tube, hence upsizing of the variable-power optical system.

3. The variable-power optical system described in Item 1 or 2, wherein the second lens group satisfies the conditional expression (6).

$$0.6<f2/fw<2.0 \qquad (6)$$

In the expression, f2 is a composite focal length of the second lens group.

A variable-power optical system meeting the conditional expression (6) provides a variable-power optical system with excellent optical performances and manufacturing ease. If the f2/fw exceeds the upper limit of the conditional expression (6), the optical power of the second lens group will be insufficient, and a variable-power ratio of two through four times is hardly obtained without sacrificing the compact configuration of the variable-power optical system. In the meantime, if the f2/fw is reduced below the lower limit of the conditional expression (6), the sensitivity to decentration errors of the second lens group will be excessively increased and the degree of manufacturing difficulty will increase.

4. The variable-power optical system described in any one of Items 1 through 3, wherein the second lens group comprises two positive lenses and one negative lens.

In this structure, the second lens group includes positive and negative lenses, and longitudinal chromatic aberration and spherical aberration can be corrected by the second lens group. If an attempt is made to ensure further compact configuration, the traveling distance of a lens group for varying the power has to be reduced, and therefore, the optical power of positive lenses in the second lens group has to be increased. However, by using two positive lenses in this structure, the optical power can be distributed to them. This arrangement reduces sensitivity to errors of the positive lenses.

5. The variable-power optical system described in any one of Items 1 through 4, wherein the second lens group consists of three lenses including a positive lens, a negative lens, and a positive lens, in order from the object side.

In this structure, positive, negative and positive lenses are arranged in that order as viewed from the object side. The sensitivity to errors can be kept at the optimum balance when lenses are aligned in the second lens group.

6. The variable-power optical system described in any one of Items 1 through 5, wherein the variable-power optical system adjusts a focal point from an object at a infinite distance to an object to a near distance by moving the third lens group toward an image side, and the variable-power optical system satisfies the following conditional expression (7).

$$1.5 < |f3/fw| < 6.0 \tag{7}$$

In the expression, f3 is a composite focal length of the third lens group.

Use of the third lens group for focusing ensures that a sharp image of the object at an area up to a near distance can be captured, without having to increase the overall optical length by movement of lenses or increase the front lens diameter. Further, if the conditional expression (7) is satisfied, a still excellent variable-power optical system can be provided in terms of the optical performance and manufacturing ease of the third lens group. If the f3/fw exceeds the upper limit of the conditional expression (7), the focusing movement of the third lens group will be increased. Thus, when a compact configuration is to be maintained, restriction will be imposed on the movement of a lens for varying the power, and a desired variable-power ratio is hardly obtained. In the meantime, if the f3/fw is below the lower limit of the conditional expression (7), the optical power of the third lens will be excessive and the sensitivity to the decentration error will be excessively high, which makes lens assembly difficult.

7. The variable-power optical system described in any one of Items 1 through 6, wherein the third lens group moves to form a locus in a convex shape projecting to the object side, when the power varies from the wide-angle end to the telephoto end, and the variable-power optical system satisfies the following conditional expression (8):

$$|D3/(fw \times ft)^{1/2}| < 1.5 \tag{8}$$

In the expression, D3 is a displacement amount of the third lens group when the power varies from the wide-angle end to the telephoto end.

When the power varies from the wide-angle end to the telephoto end, the third lens group moves so as to form a locus in a convex shape projecting to an object, whereby the load of the third lens group for varying the power is reduced. When the conditional expression (8) is satisfied, a sensitivity to the decentration error of the third lens group can be reduced. If the upper limit of the conditional expression (8) is exceeded, the sensitivity to the decentration error of the third lens group will be excessive. It makes manufacturing of lenses difficult.

8. The variable-power optical system described in any one of Items 1 through 7, wherein the first lens group is statically positioned when the power varies from the wide-angle end to the telephoto end, and the variable-power optical system satisfies the following conditional expression (9):

$$0.1 < h1/TLw \tag{9}$$

In the expression, h1 is a radius of an effective optical path of a lens surface arranged at a closest position to the object side, at the wide-angle end, and TLw is a distance on an optical axis from a tip of a lens surface arranged at a closest position to the object side to an image plane, at a wide-angle end, when an object is placed at an infinite distance.

According to the aforementioned structure, the first lens group is statically positioned. This permits a substantial reduction in a load on a drive apparatus of lens groups. When the first lens group is movable at the time of varying the power, the drive apparatus must be installed outside the first lens group. This causes the size to be increased in the direction of the outer diameter. Thus, statically positioning of the first lens group is very helpful in reducing the size in the direction of the outer diameter. Further, when the conditional expression (9) is satisfied, an optical performance of the first lens group is optimized. If h1/TLw is below the lower limit of the conditional expression (9), the optical power of the first lens will be excessive and the sensitivity to the decentration error will be excessively high. This requires adjustments to be made at the time of assembling, and results in an increase in production costs.

9. The variable-power optical system described in any one of Items 1 through 8, further comprising: an aperture stop arranged on the object side of the second lens group, wherein an aperture diameter of the aperture stop is fixed.

In this structure, an aperture stop is provided on the object side of the second lens group. This arrangement can minimize a radius of the front lens of the first lens group. In the meantime, the space between the first and second lens groups has a greater impact on the overall optical length. If an attempt is made to increase this space in order to insert a variable stop mechanism in position, the overall optical length will have to be increased by two or three times, for example. To solve this problem, the aperture stop diameter is fixed so that the stop structure will be simplified. This arrangement allows the thickness to be reduced in the direction of the optical axis.

10. The variable-power optical system described in any one of Items 1 through 9, further comprising: a device adjusting a light amount arranged on an image side of the second lens group, wherein the variable-power optical system satisfies the following conditional expression (10):

$$T12/(fw \times ft)^{1/2} < 0.3 \tag{10}$$

In the expression, T12 is an axial interval between the first lens group and the second lens group at the telephoto end.

When the light-amount adjusting device is to be installed, it is preferably installed at the stop position wherein all light fluxes pass through one and the same position, in order to avoid irregularity of light amount between the center of the image plane and the periphery. In the meantime, the space between the first and second lens groups has a greater impact on the overall optical length. If an attempt is made to increase this space, the overall optical length may be increased by two or three times. This makes it difficult to install a thicker light-amount adjusting device at the stop position. To solve this problem, the light-amount adjusting device is installed on the image side of the second lens group. This arrangement ensures the irregularity of light amount to be reduced to almost the same level as that at the stop position, and provides satisfactory compact configuration. An ND filter or mechanical shutter that reduces the impact of diffraction due to a stop can be used as the light-amount adjusting device. If the upper limit of the conditional expression (10) is exceeded, the substantial traveling distance of the second lens group at the time of varying the power will be reduced. This increases the optical power of the second lens group and the degree of manufacturing difficulty tends to increase. This is not preferable.

11. The variable-power optical system described in any one of Items 1 through 10, wherein the fourth lens group is statically positioned when the power varies from the wide-angle end to the telephoto end, and the variable-power optical system satisfies the following conditional expression (11) is satisfied.

$$1.0 < |EPw/fw| < 8.0 \qquad (11)$$

In the expression, EPw is a distance from an exit pupil position of a principal ray of a maximum angle of view to the image plane, at the wide-angle end.

If the fourth lens group is statically positioned when the power varies, the mechanical device (lens tube mechanism) for varying the power can be simplified. Further, the position accuracy can also be improved. If the conditional expression (11) is satisfied, the optical characteristics can be enhanced in the optical system wherein the fourth lens group is positioned to be fixed at the time of varying the power. If the upper limit of the conditional expression (11) is exceeded, the optical power of the first lens group will be increased when compact optical overall length is to be maintained. Thus, there will be a remarkable increase in the sensitivity to errors. In the meantime, if the lower limit of the conditional expression (11) cannot be reached, the incident angle of the light to the image plane will be less telecentricity. Even if a lens array corresponding to pixels is arranged before an image-pickup plane of an image pickup element, it will be difficult to prevent the peripheral illuminance from being reduced.

12. The variable-power optical system described in any one of Items 1 through 11, wherein the variable-power optical system consists of four lens groups.

When the variable-power optical system is to be designed in an extremely compact configuration, lenses necessarily occupy a certain space due to manufacturing limitations, and there will be a relative increase in the space occupancy rate of lenses with respect to the overall space of the lens unit. This makes it necessary to minimize the number of the lens groups and the number of lenses by giving higher priority to the improvement of the accuracy of the lens as a single product at the sacrifice of manufacturing ease. Adoption of a four-component variable-power optical system configuration will provide a structure that is helpful for designing an extremely compact configuration. Use of the negative-positive-negative-positive four-component variable-power optical system, in particular, optimizes a balance between compact configuration and high performances, i.e., balance between compact configuration and focusing performance, sensitivity to the manufacturing error or telecentricity of the incident angle to the image plane, as compared to other zoom types.

13. The variable-power optical system described in any one of Items 1 through 12, wherein only two lens groups including a lens group for varying the power and a lens group for correcting a shift of the image plane due to zooming, are movable when the power varies.

If lens groups for varying the power include a movable lens group, an image plane shift resulting from zooming cannot be corrected, depending on the type of the configuration, with the result that discontinuous varying the power may occur. However, adoption of the aforementioned structure ensures continuous varying the power to be performed in any configuration. Further, the volume of the drive apparatus of lens groups can be reduced, as compared to the case wherein there are three or more movable lens groups. This provides a more compact configuration of the variable-power optical unit.

14. The variable-power optical system described in any one of 1 through 13, wherein the first lens group consists of a negative lens and a positive lens in order from the object side, and the variable-power optical system satisfies the following conditional expression (12).

$$0.15 < |fln/flp| < 0.50 \qquad (12)$$

In the expression, flp is a focal length of the positive lens in the first lens group, and fln is a focal length of the negative lens in the first lens group.

If the lenses of the first lens group are arranged in the order of negative and positive lenses as viewed from the object, back focus at the wide-angle end can be easily ensured, and satisfactory correction of the astigmatism and chromatic aberration of magnification of the off-axis light of a wider angle of view can be achieved. It should be noted that, if |fln/flp| exceeds the upper limit of the conditional expression (12), astigmatism and distortion at the wide-angle end in particular is not sufficiently corrected. In the meantime, if the lower limit of the conditional expression (12) cannot be reached, the power of each lens of the first lens group will be extremely increased, and manufacturing difficulty will increase.

15. The variable-power optical system described in any one of Items 1 through 14, wherein the variable-power optical system includes at least one lens made of a resin material.

Use of a lens made of a resin material in this structure provides high-volume production with a stable quality, and it achieves substantial cost reduction.

16. The variable-power optical system described in Item 15, wherein the lens made of a resin material is a lens formed with a material in which particles with a maximum size of 30 nm or less are dispersed into a resin material.

Generally, when fine particles are mixed with a transparent resin material, light scattering will occur and the transmittance factor will be reduced. Thus, this is hardly used as an optical material. However, if the size of the fine particles is reduced below the wavelength of a transmitting light flux, scattering can be virtually blocked. The refractive index of a resin material is reduced with rise of temperature. However, the refractive index of inorganic particles, for example, rises with the rise of temperature. Thus, the temperature dependency can be utilized in such a way that mutual offset will be caused to ensure that there is almost no change in refractive index. To put it more specifically, dispersion of particles having a maximum size of 30 nm or less into the resin material as the base material will produce the resin material characterized by extremely low temperature dependency of refractive index. For example, dispersion of niobium oxide ($Nb_2O_5$) into acrylic resin can reduce a change in refractive index resulting from temperature change. Thus, at least one lens in the variable-power optical system relating to the present invention is made of the resin material in which such particles are dispersed. This structure minimizes shift of back focus resulting from the environmental temperature change of all the systems in the variable-power optical system relating to the present invention.

17. The variable-power optical system described in Items 15 or 16, wherein a positive lens in the fourth lens group or in a lens group arranged at a closer position to an image side than the fourth lens group, is made of a resin material.

This structure including the positive lens made of resin ensures a cost reduction without sacrificing the compact configuration. If this positive lens is subjected to temperature change, the back focus will be adversely affected. This adverse effect can be drastically reduced by using a material in which particles with a maximum size of 30 nm are dispersed.

18. An image pickup device, comprising: a variable-power optical system described in any one of Items 1 to 17, and an image pickup element converting an optical image to electric signal, wherein the variable-power optical system is capable of forming an optical image of an object onto a light receiving surface of the image pickup element. This structure provides a variable-power image pickup device with high-precision performance and extremely compact configuration that can be mounted on a mobile phone or a mobile information terminal.

19. A digital apparatus comprising: an image pickup device described in Item 18, and a controller for capturing at least one of a still image and a moving image, wherein a variable-power optical system in the image pickup device is mounted thereto so as to be capable of forming an optical image of an object onto a light receiving surface of an image pickup element.

20. The digital apparatus described in Item 19 and 20, wherein the digital apparatus is a mobile terminal.

The structures of Items 19 and 20 provide a digital apparatus provided with an image pickup device capable of varying the power with keeping high-precision performances. It should be noted that the aforementioned mobile terminal refers to the digital apparatus normally carried by a user, as typically represented by a mobile phone or a mobile information terminal.

ADVANTAGEOUS EFFECTS OF INVENTION

The present invention provides a variable-power optical system of sufficiently compact configuration exhibiting effective correction of aberrations over the overall variable-power range. It provides, in particular, a variable-power optical system having a variable-power ratio of about 2 to 4 times, and an image pickup device or digital apparatus carrying the same at reduced costs with sufficiently miniaturized configuration.

BRIEF DESCRIPTION OF DRAWINGS

Each of FIGS. 2a and 2b is a schematic diagram representing the external view of a camera-equipped mobile phone carrying the variable-power optical system relating to the present invention; wherein FIG. 2a is a schematic diagram representing the external view of the operation surface thereof, and FIG. 2b is a schematic diagram representing the rear of the operation surface thereof;

Figure 1:
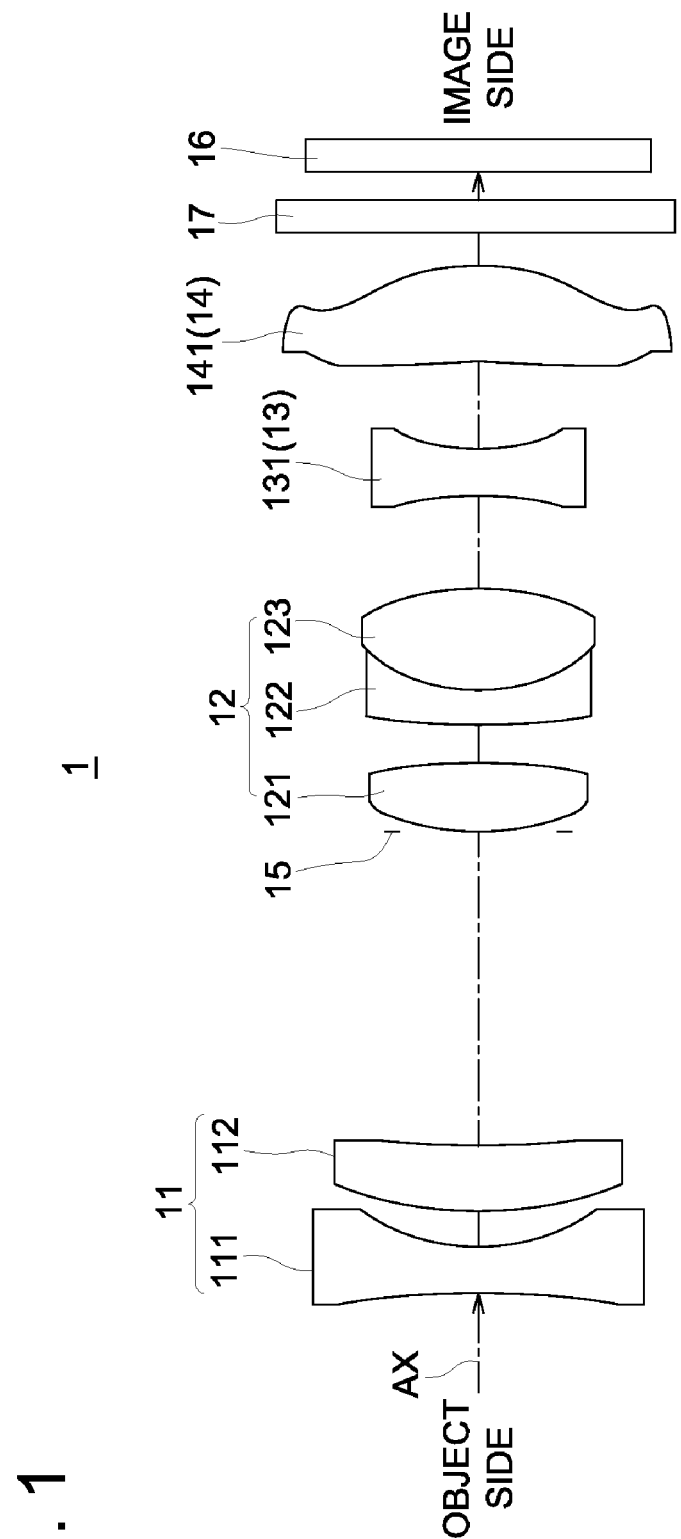
FIG. 1 is a diagram schematically representing the structure of a variable-power optical system relating to the present invention.

REFERENCE SIGNS LIST 1, 1A through 1L Variable-power optical system
11, Gr1 First lens group
12, Gr2 Second lens group
13, Gr3 Third lens group
14, Gr4 Fourth lens group
15, ST Optical stop
16, SR Image pickup element
AX Optical axis
2 Mobile phone (digital apparatus)
27 Image pickup device

BEST MODE FOR CARRYING OUT THE INVENTION

Referring to drawings, the following describes the embodiments of the present invention:
<Description of Variable-Power Optical System Structure>

FIG. 1 is an optical path diagram (an optical path diagram at the wide-angle end) representing the structure of a variable-power optical system 1 relating to the present invention. The variable-power optical system 1 forms the optical image of a subject on the light receiving surface (image plane) of an image pickup element 16 which converts an optical image into an electric signal, and includes a first lens group 11 with negative optical power, a second lens group 12 with positive optical power, a third lens group 13 with negative optical power, and a fourth lens group 14 with positive optical power in that order as viewed from the object. In the variable-power optical system, the space between the first lens group 11 and second lens group 12 decreases when the power varies from the wide-angle end to the telephoto end. The variable-power optical system 1 illustrated in FIG. 1 has the same structure as the variable-power optical system 1A (FIG. 4) of Example 1 to be described later.

In the example shown here, the first lens group 11 is composed of a biconcave negative lens 111 and a positive meniscus lens 112 with a convex surface facing the object side. The second lens group 12 is composed of a biconvex positive lens 121 and a cemented lens including a negative meniscus lens 122 with a convex surface facing the object side and a biconvex positive lens 123. The third lens group 13 is composed of a biconcave negative lens 131 alone. The fourth lens group 14 is composed of a positive meniscus lens 141 alone with a convex surface facing the image side. An optical stop 15 is provided on the object side of the second lens group 12. An image pickup element 16 is arranged on the image side of the aforementioned variable-power optical system 1 through a low-pass filter 17. This arrangement allows an optical image of the subject on the object side to be led onto the light receiving surface of the image pickup element 16 along the optical axis AX at an appropriate variable-power ratio by the variable-power optical system 1. Then the optical image of the subject is captured by the image pickup element 16.

This variable-power optical system 1 is a four-component variable-power optical system with negative-positive-negative-positive components, which is a negative-lead optical system wherein the first lens group 11 located closest to the object has negative optical power. Thus, the negative optical power of the first lens group 11 can quickly reduce the light entering thereto at a greater angle from the object side in terms of angle. This arrangement is advantageous for reducing the overall optical length and reducing the front lens diameter. Further, in the negative-lead configuration, an increase in the sensitivity to error can be suppressed even when a more compact configuration of the optical system is intended. Further, use of a negative-positive-negative-positive four-component arrangement ensures compact configuration of the variable-power optical unit resulting from reduced traveling distance at the time of varying the power, excellent telecentricity, and satisfactory correction of spherical aberration, chromatic aberration and astigmatism.

The first lens group 11 preferably includes at least one negative lens (negative lens 111) and at least one positive lens (positive meniscus lens 112). This arrangement ensures satisfactory correction of the chromatic aberration of magnification. In this example, the first lens group 11 includes one negative lens and one positive lens. However, a plurality of negative lenses and positive lenses can be contained. Also a prism that bends the optical axis AX at right angles, for example, can be included. In this case, however, the first lens group 11 is preferably made of four or less lenses including the prism. This arrangement achieves a cost cutdown by reducing the number of lenses. Further, instead of the biconcave negative lens 111, a negative meniscus lens with a convex surface facing the object side can be preferably employed, too.

As shown in FIG. 1, the second lens group 12 preferably includes at least two positive lenses (biconvex positive lens 121 and biconvex positive lens 123) and at least one negative lens (negative meniscus lens 122). This arrangement allows the second lens group 12 to correct longitudinal chromatic aberration and spherical aberration. If an attempt is made to ensure further compact configuration, the traveling distance of lens groups for varying the power has to be reduced, and therefore, the optical power of positive lenses in the second lens group 12 has to be increased. In this example, however, the optical power can be distributed to the biconvex positive lens 121 and biconvex positive lens 123. This arrangement reduces the sensitivity to errors of the positive lenses.

Particularly, the second lens group 12 is preferably made of three lenses: a positive lens, a negative lens and a positive lens arranged in that order as viewed from the object side. The second lens group 12 of FIG. 1 includes three lenses: a biconvex positive lens 121, a negative meniscus lens 122 and a biconvex positive lens 123 arranged in that order as viewed from the object side, which correspond to the above preferable lens arrangement. This arrangement of a positive lens, a negative lens and a positive lens in that order as viewed from the object side ensure the sensitivity to errors to be kept at the optimum balance when lenses are aligned in the second lens group 12.

Especially in the second lens group 12, a biconvex single lens, and a cemented lens of a negative lens and positive lens are preferably arranged in that order as viewed from the object side. Incidentally, the second lens group 12 of FIG. 1 meets the aforementioned lens requirements. This arrangement permits an adequate distribution of the loads of varying the power over the entire second lens group 12, and promotes a further reduction of the sensitivity to errors. Further, the sufficient correction of the longitudinal chromatic aberration is also ensured.

Further, the second lens group 12 includes at least one aspheric surface. In the example of FIG. 1, there is provided at least one aspheric surface among four surfaces: both surfaces of the biconvex positive lens 121, the surface on the object side of the negative meniscus lens 122 and the surface on the image side of the biconvex positive lens 123. It goes without saying that a plurality of surfaces can be made aspherical. All the surfaces can be made aspherical. Presence of the aspheric surface ensures satisfactory correction of spherical aberration to be increased by the increase in the optical power of the second lens group 12. Among others, a positive lens in the second lens group 12, i.e., biconvex positive lens 121 and/or biconvex positive lens 123 is preferably provided with an aspheric surface. This arrangement ensures effective correction of spherical aberration and comatic aberration caused by an increase in power of the second lens group 12 resulting from an attempt for compact configuration.

It should be noted that, in addition to the second lens group 12, other lens groups are preferably provided with an aspheric surface. Especially, all lens surfaces in contact with air are preferably aspherical. To be more specific, aspheric surfaces are preferably provided on the object and images sides of all the negative lens 111, positive meniscus lens 112, biconvex positive lens 121, cemented lens of negative meniscus lens 122 and biconvex positive lens 123, biconcave negative lens 131, and positive meniscus lens 141. This arrangement ensures both of an extremely compact configuration and high image quality.

FIG. 1 shows the example wherein the second lens group 12 includes a cemented lens, but another lens group can includes a cemented lens. As described above, when the variable-power optical system 1 contains at least one cemented lens, both of compact configuration and high image quality can be ensured.

Further, the variable-power optical system 1 satisfies the following conditional expressions (1) through (4), where T1 denotes a thickness on the optical axis AX from the foremost lens surface (the surface on the object side of the negative lens 111) of the first lens group 11 to the rearmost lens surface of the first lens group 11 (the surface on the image side of the positive meniscus lens 112); fw and ft denote composite focal lengths of the overall optical system at the wide-angle end and telephoto end, respectively; ΔN2 indicates a difference in refractive indexes between positive and negative lenses, i.e., a difference of a mean refractive index of the biconvex positive lens 121 and biconvex positive lens 123, and the refractive index of the negative meniscus lens 122; Δv2 represents a difference in Abbe numbers of positive and negative lenses, i.e., Δn2 indicates a difference between a mean Abbe number of the biconvex positive lens 121 and biconvex positive lens 123 and a Abbe number of the negative meniscus lens 122; and N1 indicates the maximum refractive index of lenses in the first lens group 11:

$$0.2 < T1/(fw \times ft)^{1/2} < 1.2 \qquad (1)$$

$$\Delta N2 > 0.15 \qquad (2)$$

$$\Delta v2 > 20 \qquad (3)$$

$$N1 \geq 1.8 \qquad (4)$$

If the upper limit of the conditional expression (1) is exceeded, the substantial traveling distance of the second lens group 12 at the time of varying the power will be reduced when an attempt is made to reduce the overall optical length to maintain compact configuration. This increases the optical power of the second lens group 12 and requires a curvature radius of lenses to be increased. Accordingly, the degree of manufacturing difficulty will increase. In the meantime, if the lower limit of the conditional expression (1) cannot be reached, the optical power of the negative lens 111 of the first lens group 11 will be reduced and the rear principal point will move away from the image plane. Thus, if an attempt is made to maintain the same focal length, there will be a relative increase in the back focusing difficulty. This makes it difficult to move the exit pupil away from the image surface. Such disadvantages will be conspicuous. If the ΔN2 is below the lower limit of the conditional expression (2), there will be a marked astigmatism resulting from an increase in the Petzval's sum. If the Δv2 is below the lower limit of the conditional expression (3), there will be insufficient correction of the longitudinal chromatic aberration. If N1 is reduced below the lower limit of the conditional expression (4), the first lens group 11 will be too thick. If an attempt is made to provide a compact configuration, sensitivity of the second lens group 12 to errors will increase. This requires adjustment, hence an increase in production cost.

In this case, the following conditional expression (1)' is preferably satisfied in the conditional expression (1):

$$0.3 < T1/(fw \times ft)^{1/2} < 0.8 \qquad (1)'$$

If the conditional expression (1)' is satisfied, the sensitivity to errors of the second lens group 12 is not increased by a substantial reduction of the traveling distance of the second lens group 12 at the time of varying the power. This eliminates the need of alignment of lenses. Further, there is no reduction in core thickness of each lens of the first lens group 11 having a large lens outer diameter, and the degree of manufacturing difficulty will not be increased.

The ΔN2 indicating the difference in (mean) refractive index preferably satisfies the following conditional expression (2)':

$$\Delta N2 > 0.20 \qquad (2)'$$

If the conditional expression (2)' is satisfied, satisfactory correction of astigmatism of the second lens group 12 can be maintained. There is no marked tendency toward increasing variation in performances due to the lens group assembling error.

Further, the Δv2 indicating the difference in (mean) Abbe number of the conditional expression (3) preferably satisfies the following conditional expression (3)':

$$\Delta v2 > 25 \qquad (3)'$$

If the conditional expression (3)' is satisfied, there is no reduction in the on-axis contrast at the telephoto end as compared to the limit of diffraction. Thus, there is no increase in the degree of difficulty of capturing a sharp image along with reduction in the F-value at the telephoto end.

Further, the following conditional expression (4)' is preferably satisfied in the conditional expression (4):

$$N1 \geq 1.85 \qquad (4)'$$

If the conditional expression (4)' is satisfied, curvature radius of lenses in the first lens group is not reduced, and the degree of manufacturing difficulty will not be increased.

The first lens group 11 includes a meniscus lens (positive meniscus lens 112 shown in FIG. 1 as an example) with a positive power having a convex surface facing the object side. When the refractive index of this positive meniscus lens 112 is assumed as N1p, the following conditional expression (5) is preferably satisfied:

$$N1p \geq 1.8 \qquad (5)$$

The first lens group 11 includes the positive meniscus lens 112 with a convex surface facing the object side. This structure ensures satisfactory correction of astigmatism. If the lower limit of the conditional expression (5) cannot be reached, the curvature radius on the image side of the positive meniscus lens 112 will be reduced and the substantial spacing between the first lens group 11 and second lens group 12 will be reduced. This will cause easier interference of the lens tube, hence upsizing of the variable-power optical system 1.

In this case, the N1p of the conditional expression (5) preferably satisfies the following conditional expression (5)':

$$N1p \geq 1.85 \tag{5}'$$

If the conditional expression (5)' is satisfied, the curvature radius of the positive meniscus lens 112 is not reduced, and the degree of manufacturing difficulty will not be increased.

In the variable-power optical system 1, the composite focal length of the second lens group 12 is assumed as "f2", the second lens group 12 preferably satisfies the following conditional expression (6).

$$0.6 < f2/fw < 2.0 \tag{6}$$

If the f2/fw exceeds the upper limit of the conditional expression (6), the optical power of the second lens group 12 will be insufficient, and it will be difficult to obtain a variable-power ratio of about 2 to 4 times while maintaining the compact configuration. If the lower limit of the conditional expression (6) cannot be reached, the sensitivity to the decentration error of the second lens group 12 will be extremely high, and the level of manufacturing difficulty will rise.

The relationship of the f2/fw in the aforementioned conditional expression (6) preferably satisfies the following conditional expression (6)'.

$$0.8 < f2/fw < 1.8 \tag{6}'$$

If the conditional expression (6)' is satisfied, the optical power of the second lens group 12 is not reduced, and there is no increase in the traveling distance of the second lens group 12 required at the time of varying the power, or in the overall optical length. Further, there is no further increase in the sensitivity of the second lens group 12 to decentration error. Accordingly, production cost can be reduced.

As for a focusing configuration of the variable-power optical system 1, it is preferable that focusing from an object at the infinity distance to an object at a near distance is performed by moving the third lens group 13 (biconcave negative lens 131) toward the image side. In this case, if the composite focal length of the third lens group 13 is assumed as "f3", the following conditional expression (7) is preferably satisfied.

$$1.5 < |f3/fw| < 6.0 \tag{7}$$

Focusing can be performed by moving the first lens group 11 for example. However, when the third lens group 13 is used for focusing, it is possible to capture a sharp image of an object at a near distance, without allowing an increase in the overall optical length or front lens diameter to be caused by movement of lenses. When the conditional expression (7) is satisfied, the optical performance of the third lens group 13 and the degree of manufacturing ease will be improved. If the f3/fw exceeds the upper limit of the conditional expression (7), there will be an increase in the traveling distance of the third lens group 13. Thus, when an attempt is made to maintain a compact configuration, restriction will be imposed on the movement of the lens for varying the power, and a variable-power ratio is hardly obtained. In the meantime, if the f3/fw is below the lower limit of the conditional expression (7), the optical power of the third lens group 13 will be excessive and sensitivity to a decentration error will be excessively high. Thus, the lens is hardly assembled.

In the variable-power optical system 1, a lens group to be moved for varying the power can be selected as appropriate. In this case, assume that the third lens group 13 moves to form a locus in a convex shape projecting to the object when the power varies from the wide-angle end to the telephoto end.

Assuming that "D3" is the displacement amount of the third lens group 13 when the power varies from the wide-angle end to the telephoto end, the conditional expression (8) is preferably satisfied.

$$|D3/(fw \times ft)^{1/2}| < 1.5 \tag{8}$$

The third lens group 13 moves to form a convex shape projecting to the object when the power varies from the wide-angle end to the telephoto end. This procedure reduces the load for varying the power of the third lens group 13. When the conditional expression (8) is satisfied, sensitivity to a decentration error of the third lens group 13 can be suppressed. If the upper limit of the conditional expression (8) is exceeded, there will be an excessive increase in sensitivity to a decentration error of the third lens group 13, with the result that a degree of manufacturing difficulty will increase.

The relationship of the aforementioned conditional expression (8) preferably satisfies the following conditional expression (8)'.

$$D3/(fw \times ft)^{1/2} < 1.0 \tag{8}'$$

If the conditional expression (8)' is satisfied, variations in the off-axis performance due to the rise in sensitivity to a decentration error will not increase. This eliminates need of adjusting the variations, hence reduces the production cost.

By contrast, the first lens group 11 is preferably positioned statically when the power varies from the wide-angle end to the telephoto end. Fixing of the first lens group 11 provides a substantial reduction in the load of the lens group drive apparatus. If the first lens group 11 is made movable at the time of varying the power, the drive apparatus has to be installed outside the first lens group 11 and this causes an increase in the size in the direction of the outer diameter. Thus, fixing of the first lens group 11 is very helpful for reducing the size in the direction of the outer diameter.

When the first lens group 11 is statically positioned, the conditional expression (9) is preferably satisfied, where "h1" is a radius of an effective optical path of a lens surface arranged at a closest position to the object side i.e., the surface of the negative lens 111 facing the object side, at the wide-angle end, and "TLw" is a distance on the optical axis AX from a tip of the negative lens 111 facing the object side to an image plane, at a wide-angle end, when an object is placed at an infinite distance.

$$0.1 < h1/TLw \tag{9}$$

If h1/TLw is below the lower limit of the conditional expression (9), the optical power of the first lens group 11 will be excessive and sensitivity to a decentration error will increase. This requires adjustment work at the time of assembling, and will raise the production cost.

The movable lens groups for varying the power are preferably restricted to two lens groups, i.e., a lens group for varying power and a lens group for correcting a shift of the image plane due to zooming. The variable-power optical system 1 of FIG. 1 is preferably configured in such a way that only the second lens group 12 and third lens group 13, for example, are moved when the power varies. If the number of the movable groups is one, image plane shift resulting from zooming may not be corrected, depending on the type of configuration and this may result in discontinuous varying power. However, use of the aforementioned structure permits continuous varying power to be achieved, independently of any configuration. Further, the percentage of the volume of the lens group drive apparatus with reference to the overall volume can be reduced, as compared with the case of three or more movable lens groups. This ensures compact configuration of the variable-power optical system 1.

In the present invention, there is no particular restriction to the position of the optical stop (aperture stop) 15. As shown in FIG. 1, the optical stop 15 is preferably provided on the object side of the second lens group 12. The aperture diameter of the optical stop 15 is preferably fixed.

The arrangement of the optical stop 15 on the object side of the second lens group allows the front lens diameter of the first lens group 11 to be minimized. In the meantime, the space between the first lens group 11 and second lens group 12 has a greater impact on the overall optical length. If an attempt is made to increase this space in order to insert a variable diaphragm mechanism in position, there will be a need to extend the overall optical length by about two or three times. To solve this problem, the aperture diameter is fixed so that an aperture member is simplified. This arrangement eliminates the need of excessively increasing the space between the first lens group 11 and second lens group 12, and permits the thickness to be reduced in the direction of the optical axis.

A light-amount adjusting device is preferably arranged on the image side of the second lens group 12, although this is not illustrated in FIG. 1. For example, an ND filter or mechanical shutter to avoid the adverse effects of diffraction due to the stop can be used as the light amount-adjusting device. Generally, to avoid irregularity in the light amount between the center of the image plane and the periphery thereof, the light-amount adjusting device is preferably installed at such an stop position that all the light fluxes pass through one and the same position. In the example of FIG. 1, the light-amount adjusting device is preferably installed on the object side of the second lens group 12. However, the space between the first lens group 11 and second lens group 12 has a great impact on the overall optical length. If this space is increased, the overall optical length may be extended by about two or three times. This makes it difficult to install a thicker light-amount adjusting device at the stop position. To solve this problem, the light-amount adjusting device is mounted on the image side of the second lens group 12 close to the optical stop 15, whereby the irregularity of light amount can be reduced approximately to the same level as that at the stop position, without sacrificing the compact configuration.

If the light-amount adjusting device is to be installed on the image side of the second lens group 12, the following conditional expression (10) is preferably satisfied, when T12 represents a distance on the optical axis AX between the first lens group 11 and second lens group 12 at the telephoto end:

$$T12/(fw \times ft)^{1/2} < 0.3 \tag{10}$$

If the upper limit of the conditional expression (10) is exceeded, the substantial traveling distance of the second lens group 12 at the time of varying the power will be reduced when an attempt is made to reduce the overall optical length to maintain compact configuration. This increases the optical power of the second lens group 12 and the degree of manufacturing difficulty tends to increase. This is not preferable.

In the variable-power optical system 1 of the present embodiment, a fourth lens group 14 with a positive optical power (positive meniscus lens 141) is provided on the image side of the third lens group 13. By arranging the fourth lens group 14, incident angle of an off-axis ray to the light-receiving surface of the image pickup element 16 is brought into a telecentric condition.

When the fourth lens group 14 is arranged, the fourth lens group 14 is preferably arranged statically at the time of varying the power from the wide-angle end to the telephoto end. This procedure simplifies the structure of a mechanical device (lens tube mechanism) for variable power, and enhances positioning accuracy.

Further, assume that "EPw" stands for the distance from the position of the exit pupil of the principal ray of the maximum angle of view to the image plane at the wide-angle end. Then the following conditional expression (11) is preferably satisfied.

$$1.0 < |EPw/fw| < 8.0 \tag{11}$$

If the conditional expression (11) is exceeded, the optical power of the first lens group 11 is increased when an attempt is made to maintain the compact overall optical length. This causes a drastic increase in the sensitivity to errors. In the meantime, if the lower limit of the conditional expression (11) cannot be reached, the incident angle of the light to the image plane will be less telecentricity. Even if a lens array corresponding to pixels is arranged before an image-pickup plane of an image pickup element 16, it will be difficult to prevent the peripheral illuminance from being reduced.

The relationship of |EPw/fw| in the aforementioned conditional expression (11) preferably satisfies the following conditional expression (11)'.

$$1.5 < |EPw/fw| < 6.0 \tag{11)'}$$

If the conditional expression (11)' is satisfied, the difference in the incident angles of off-axis light onto the light receiving surface of the image pickup element 16 at the wide-angle end and telephoto end is protected against becoming excessively small, and the reduction in peripheral illuminance is suppressed at the time of varying the power.

FIG. 1 shows the four-component variable-power optical system with negative-positive-negative-positive components. Another lens group can also be added thereto. However, the variable-power optical system 1 consisting of four lens groups alone is advantageous for designing an extremely compact configuration. Particularly, when the structure of four negative-positive-negative-positive components is provided, it is possible to optimize the balance between the compact configuration and high performance, i.e., balance between compact configuration and focusing performance, sensitivity to the manufacturing error or telecentricity of the incident angle to the image plane, as compared to other zoom types.

Among other things, the variable-power optical system preferably includes a first lens group composed of a negative lens and a positive meniscus lens with a convex surface facing the object side; a second lens composed of a biconvex lens and a cemented lens including a negative lens and positive lens; a third lens group composed of a negative lens; and a fourth lens group composed of a positive lens in that order as viewed from the object. By employing negative and positive order for the first lens group as viewed from the object, back focus at the wide-angle end can be easily ensured, and satisfactory correction of the astigmatism and chromatic aberration of magnification of the off-axis light of a wider angle of view can be achieved. Use of the positive, negative, and positive order for the second lens group is intended to reduce sensitivity to errors by using two positive lenses and to ensure a optimized balance of the sensitivity to errors when lenses are aligned. Use of a negative lens as the third lens group is designed to ensure a balance between reduction in the overall optical length and correction of astigmatism. Use of a positive lens as the fourth lens group is designed to allow the incident angle of the off-axis light onto the light receiving surface of the image pickup element to be brought close to a telecentric condition, as described above. Such requirements are met in the variable-power optical system 1 shown in FIG. 1. Thus, the variable-power optical system 1 has a preferable configuration in the sense in which it is shown here.

As shown in FIG. 1, the first lens group 11 is composed of one negative lens (negative lens 111) and one positive lens (positive meniscus lens 112) in that order as viewed from the object. Not only that, when "flp" is the focal length of the positive meniscus lens 112, and "fln" is the focal length of the negative lens 111, the following conditional expression (12) is preferably satisfied.

$$0.15 < |fln/flp| < 0.50 \quad (12)$$

If the |fln/flp| exceeds the upper limit of the conditional expression (12), astigmatism and distortion at the wide-angle end in particular is not corrected sufficiently. In the meantime, if the |fln/flp| is below the lower limit of the conditional expression (12), the power of the negative lens 111 and positive meniscus lens 112 constituting the first lens group will be extremely increased, and manufacturing difficulty will increase.

The variable-power optical system 1 preferably satisfies the following conditional expression (13), when Lb indicates a distance (length in terms of air) on the optical axis AX from a tip of a lens surface with a power arranged at a closest position i.e., the surface of the positive meniscus lens 141, to an image plane at the telephoto end, in the example of FIG. 1.

$$Lb/fw < 1.2 \quad (13)$$

If the Lb/fw exceeds the upper limit of the conditional expression (13), an incident angle of an off-axis ray to the light receiving surface of the image pickup element 16 at the telephoto end will be less telecentricity. This will cause a marked reduction in the intensity of surrounding illumination.

The second lens group 12 preferably satisfies the following conditional expression (14).

$$0.2 < f2/ft < 0.9 \quad (14)$$

If the upper limit of the conditional expression (14) is exceeded, the power of the second lens group 12 will be insufficient and the variable-power ratio of about 2 to 4 times cannot be easily obtained. In the meantime, if the lower limit of the conditional expression (14) cannot be reached, the sensitivity to errors of the second lens group 12 will be excessively high, and the degree of manufacturing difficulty will increase.

The relationship of the f2/ft in the aforementioned conditional expression (14) preferably satisfies the following conditional expression (14)'.

$$0.3 < f2/ft < 0.8 \quad (14)'$$

If the conditional expression (14)' is satisfied, optical power of the second lens group 12 is not reduced, and the overall optical length can be reduced without any increase in the traveling distance of the second lens group 12 required when the power varies. Further, there will be no excessive increase in sensitivity to a decentration error of the second lens group 12, and there is no need to adjust a space between lenses, with the result that production costs can be reduced.

The following describes the materials constituting the variable-power optical system 1. There is no particular restriction to the materials of the lenses constituting the first through fourth lens groups 11 through 14. Optical materials made of various forms of glasses and resins (plastics) can be utilized. When the resin material is used, it is characterized by light weight and can be used in high-volume production by injection molding. Thus, the production cost can be reduced and the weight of the variable-power optical system 1 can be reduced. In this sense, resin is superior to glass. Thus, the variable-power optical system 1 is preferably provided with at least one lens made of resin material. It goes without saying that two or more lenses made of resin material can be used.

When two or more lenses made of resin material are used, the negative lens (biconcave negative lens 131 in case of FIG. 1) of the third lens group 13 and positive lens (positive meniscus lens 141) of the fourth lens group 14 are preferably made of resin. This arrangement can reduce the shift of back focusing resulting from environmental temperature change.

This lens made of resin is preferably made of a material obtained by dispersing particles with a maximum size of 30 nm or less—the inorganic particles in particular—in a resin material. Use of such a lens minimizes a change in refractive index resulting from temperature change in the lens made of resin material.

The following describes the details of the refractive index change due to the temperature. The refractive index change A due to the temperature the can be represented by the following expression (15) by dividing the refractive index n by temperature t, based on the Lorentz-Lorenz equation.

[Mathematical Formula 1]

$$A = \frac{(n^2+2)(n^2-1)}{6n}\left\{(-3\alpha) + \frac{1\partial[R]}{[R]\partial t}\right\} \quad (15)$$

wherein α indicates a linear expansion coefficient, and [R] denotes molecular refraction.

For the resin material, the contribution of the second term is smaller than that of the first term of the conditional expression (15), and can be almost ignored. For example, the linear expansion coefficient α of the PMMA resin is $7 \times 10^{-5}$. When this is substituted into the aforementioned expression, $A = -1.2 \times 10^{-4}$ [/° C.]. Approximate agreement with the actual measurement can be found. To put it more specifically, the refractive index change A due to the temperature of about $-1.2 \times 10^{-4}$ [/° C.] in the conventional art is preferably kept below $8 \times 10^{-5}$ [/° C.] in terms of absolute value, more preferably below $6 \times 10^{-5}$ [/° C.] in terms of absolute value. If the change A due to the temperature is kept below $6 \times 10^{-5}$ [/° C.], the fluctuation of back focusing at the time of environmental temperature change can be reduced to about half. Table 1 shows the change in the refractive index due to the temperature A (=dn/dT) of the resin material applicable to the variable-power optical system 1.

TABLE 1

| Plastic material | A (approximate value) $[10^{-5}/° C.]$ |
|---|---|
| Polyolefin | −11 |
| Polycarbonate | −14 |

In the case of the fourth lens group 14, or in the case wherein a lens group is located on the image side of the fourth lens group 14, a positive lens of this lens group is preferably made of resin. This arrangement permits the cost to be reduced without sacrificing the compact configuration. Further, the positive lens has an adverse effect on the back focusing at the time of temperature change. A substantial reduction of this adverse effect can be achieved by dispersing the inorganic particles in particular having a diameter of 30 nm or less in the material.

When a aspheric glass lens is used in the variable-power optical system 1, the aspheric glass lens can be made by a molding operation. Alternatively, the aspheric glass lens can be formed with glass and resin as a complex type. Molded products can be manufactured in a high-volume production method, but there are restrictions on the type of lens materials. For the complex products, there are various glass materials that serve as substrates, and it provides high degree of freedom in terms of its design, which is advantageous. Generally, an aspheric lens made of a material with high refractive index is hardly produced by molding. For a lens with a single aspheric surface, the advantages of the complex type can be utilized to the maximum.

The variable-power optical system 1 can be provided with a mechanical shutter capable of cutting off light to the image pickup element 16, instead of the optical stop 15. Such a mechanical shutter is effective in preventing smear, when a CCD (Charge Coupled Device) or the like is employed, as the image pickup element 16.

The conventionally known cam mechanism and stepping motor can be used as a drive source for the lens groups, stop and shutter arranged on the variable-power optical system 1. Further, when there is not much traveling distance, or the driven group is less heavy, a piezoelectric actuator designed in an extremely compact configuration can be used. This actuator permits independent operation of each group while minimizing an increase in the volume of the drive section and power consumption. This arrangement provides a further compact configuration of the image pickup lens apparatus including the variable-power optical system 1.

In response to a light amount of an optical image of the subject whose image has been formed by the variable-power optical system 1, the image pickup element 16 photoelectrically converts it into image signal of each of red (R), green (G) and blue (B) components, and outputs the result into a predetermined image processing circuit. For example, the image pickup element 16 can use a single chip color area sensor, a so-called Bayer method, wherein the CCDs are arranged in a two-dimensional array and the color filters of red (R), green (G) and blue (B) are arranged in a checkered pattern on the surface of each CCD of the area sensor. In addition to such a CCD image sensor, a CMOS image sensor or VMIS image sensor can also be used.

The low-pass filter 17 is a parallel-flat optical component arranged on the light receiving surface of the image pickup element 16 to remove noise components. A birefringence type low-pass filter made of crystal or the like wherein a predetermined direction of crystal axis has been adjusted, or a phase type low-pass filter wherein the required optical cut-off frequency characteristics are implemented by diffraction effect is applicable to this low-pass filter 17. It should be noted that the low-pass filter 17 is not always required. Further, instead of the aforementioned optical low-pass filter 17, an infrared ray cut filter can be used to remove the noise included in the image signal of the image pickup element 16. Further, infrared reflection coating can be provided on the surface of the optical low-pass filter 17 so that both filter functions are performed by one arrangement.

<Description of Digital Apparatus Incorporating a Variable-power Optical System>

The following describes a digital apparatus incorporating the aforementioned variable-power optical system 1. Each of FIGS. 2a and 2b is a schematic diagram representing an external view of a camera-equipped mobile phone as an embodiment of the digital apparatus of the present invention. In this invention, the digital apparatus includes a digital still camera, video camera, digital video unit, mobile information terminal (PDA (Personal Digital Assistant)), personal computer, mobile computer or the peripheral equipment thereof (mouse, scanner, printer, etc.).

FIG. 2a shows an operation surface of the mobile phone 2, and FIG. 2b shows a back side of the operation surface, i.e., a rear of the mobile phone. An antenna 21 is mounted on the top of the mobile phone 2. The operation side thereof is provided with a rectangle display 22, an image switching button 23 for starting an image pickup mode, and switching between a still image and moving image, and a zooming button 24 for controlling varying-power (zooming) operation, a shutter button 25, and a dial button 26. The zoom button 24 has a letter "T" standing for "telephoto" printed on the top end, and a letter "W" standing for "wide angle" printed on the bottom end, and includes a two-contact switch capable of instructing each varying-power operation when the printed position is depressed. Further, image pickup device 27 constituted by the above-described variable-power optical system 1 is mounted in the mobile phone 2.

Figure 3:
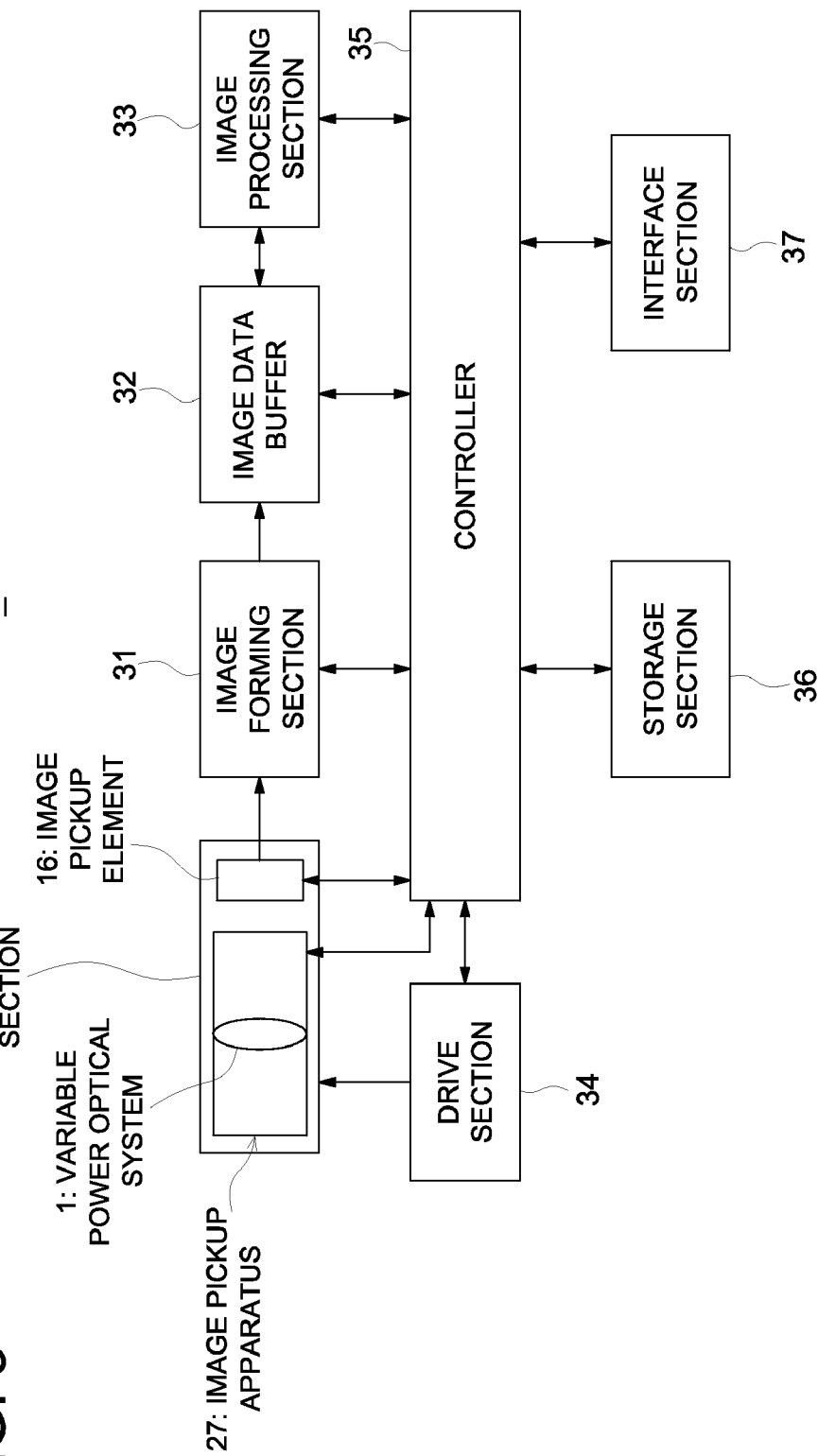
FIG. 3 is a functional block diagram showing the structure of the functional section of image pickup as an example of the digital apparatus equipped with the variable-power optical system relating to the present invention.

FIG. 3 is a functional block diagram showing an electrical functional structure related to an image-pickup operation of the mobile phone 2. To provide image-pickup functions, the mobile phone 2 includes an image pickup section 30, image generating section 31, image data buffer 32, image processing section 33, drive section 34, control section 35, storage section 36, and interface section 37.

The image pickup section 30 includes an image pickup device 27 and image pickup element 16. The image pickup device 27 is provided with a variable-power optical system 1 (illustrated in FIG. 1), and a lens drive apparatus (not illustrated) for varying the power and focusing by driving lenses in the direction of optical axis. Light from a subject forms an image on the light receiving surface of the image pickup element 16 by means of the variable-power optical system 1, and the optical image of the subject is generated.

The image pickup element 16 converts the optical image of the subject formed by the variable-power optical system 1, into electric signal (image signal) of each of color components, R (red), G (green) and B (blue). Each signal as the image signal of each of R, G and B colors is outputted to the image generating section 31. The image pickup element 16 controls such image pickup operations as capturing of either still or moving image, or reading the output signal of each image in the image pickup element 16 (horizontal synchronization, vertical synchronization and transfer) under the control of the control section 35.

The image generating section 31 applies processing of amplification and digital processing to the analog output signal from the image pickup element 16, and performs a conventionally known image processing such as determination of the adequate black level for the overall image, gamma correction, white balance adjustment (WB adjustment), contour correction and uneven color adjustment, whereby the image data of each image is generated from the image signal. The image data generated by the image generating section 31 is outputted to the image data buffer 32.

The image data buffer 32 stores image data on a temporary basis and constitutes a memory used as a work area wherein the processing (to be described later) is applied to this image data by the image processing section 33. It is made up, for example, of a RAM (Random Access Memory).

The image processing section 33 is a circuit that applies such image processing as resolution conversion to the image data of the image data buffer 32. If required, arrangement can be made to ensure that the image processing section 33 corrects the aberration that has not been corrected by the variable-power optical system 1.

The drive section 34 drives a plurality of lens groups of the variable-power optical system 1 so that desired varying power and focusing operations are performed by the control signal outputted from the control section 35.

The control section 35 is provided with a micro processor, for example, and controls the operations of the image pickup section 30, image generating section 31, image data buffer 32, image processing section 33, drive section 34, storage section 36 and interface section 37. To put it another way, the control section 35 provides control in such a way that at least one of the still and moving images of a subject will be captured by the image pickup device 27 and image pickup element 16.

The storage section 36 is a storage circuit for storing image data generated by a still or moving image of the subject, and is provided with a ROM (Read Only Memory) and RAM (Random Access Memory), for example. To be more specific, the storage section 36 performs the function of storing the still or moving image.

The interface section 37 is an interface for exchanging image data with an external equipment. It is an interface conforming to the USB or IEEE 1394 standards, for example.

The following describes an image pickup operation of the mobile phone 2 having the aforementioned configuration. To capture a still image, the image pickup mode is started by pressing the image switching button 23. In this case, the still image pickup mode is started by pressing the image switching button 23 once. If the image switching button 23 is pressed again in this state, the moving image pickup mode is selected. To be more specific, the control section 35 of the mobile phone 2 having received the instruction from the image switching button 23 allows the image pickup device 27 and image pickup element 16 to perform the operation of capturing at least one of the still and moving images of the subject on the object side.

When a still image pickup mode has started, the control section 35 provides control in such a way that the operation of capturing the still image is performed by the image pickup device 27 and image pickup element 16. At the same time, the lens drive apparatus (not illustrated) of the image pickup device 27 is driven to perform an operation of focusing. This procedure allows a well-focused optical image to be formed on the light receiving surface of the image pickup element 16 repeatedly on a predetermined cycle. After having been converted into image signal of each of R, G and B components, the signal is outputted to the image generating section 31. The image signal is stored in the image data buffer 32 on a temporary basis, and image processing is performed by the image processing section 33. After that, the signal is transferred to the display memory (not illustrated) and are led to the display 22. By watching the display 22, an operator is allowed to make adjustments in such a way that the subject will be located within a desired position on the screen. A still image can be obtained by pressing the shutter button 25 in this state. To be more specific, image data is stored in the storage section 36 as a memory of the still image.

In this case, to perform a zooming operation in order to capture the image of a subject located away from the operator or to enlarge the subject near the operator, the "T"-marked portion on the top end of the zooming button 24 is pressed. Then the current condition is detected. In response to the time of pressing the button, the control section 35 provides control to perform the lens drive operation for varying the power. Then zooming operation is performed by the variable-power optical system 1 on a continuous basis. When the magnification rate is to be reduced, for example, in the case of excessive zooming, the "W"-marked position on the bottom end of the zooming button 24 is pressed. Then the current condition is detected and the control section 35 controls the variable-power optical system 1, whereby zooming operation is performed on a continuous basis in conformance to the time of pressing. In the manner described above, the magnification rate for a subject located away from the operator can be adjusted using the zooming button 24. Similarly to the case of the normal operation of capturing a life-size image, adjustment is made so that the main subject is placed at a desired position on the screen, and the shutter button 25 is pressed. This procedure provides an enlarged still image.

To capture a moving image, the image switching button 23 is pressed once to start a still image pickup mode. Then the image switching button 23 is pressed again to select the moving image pickup mode. This procedure allows the control section 35 to control the image pickup device 27 and image pickup element 16 to capture a moving image. After that, similar to the case of the operations for capturing a still image, the operator watches the display 22 and makes adjustments to ensure that the image of the subject gained through the image pickup device 27 is located at a desired position on the screen. Here, similar to the case of the operations for capturing a still image, the magnification rate of the subject can be adjusted using the zooming button 24. The shutter button 25 is pressed in this state. This starts the operation of capturing a moving image. The magnification rate of the subject can be changed as desired during image pickup operation by pressing the zoom button 24.

While a moving image is captured, the control section 35 allows the image pickup device 27 and image pickup element 16 to capture the moving image. At the same time, the control section 35 drives the lens drive apparatus (not illustrated) of the image pickup device 27 so that the focusing operation is performed. This procedure allows a well-focused optical image to be formed on the light receiving surface of the image pickup element 16 repeatedly on a predetermined cycle. After having been converted into image signal of each of R, G and B components, each signal is outputted to the image generating section 31. Each image signal is stored in the image data buffer 32 on a temporary basis, and image processing is performed by the image processing section 33. After that, these signals are transferred to the display memory and are led to the display 22. When the shutter button 25 is pressed again, the moving image pickup operation terminates. The moving image having been captured is led to the storage section 36 as a moving image memory, and is stored therein.

<Description of a More Specific Embodiment of the Variable-power Optical System>

Referring to the drawings, the following describes the variable-power optical system 1 of FIG. 1, i.e., the variable-power optical system 1 constituting the image pickup device 27 mounted on the mobile phone 2 of FIGS. 2a and 2b.

EXAMPLES

Example 1

Figure 4:
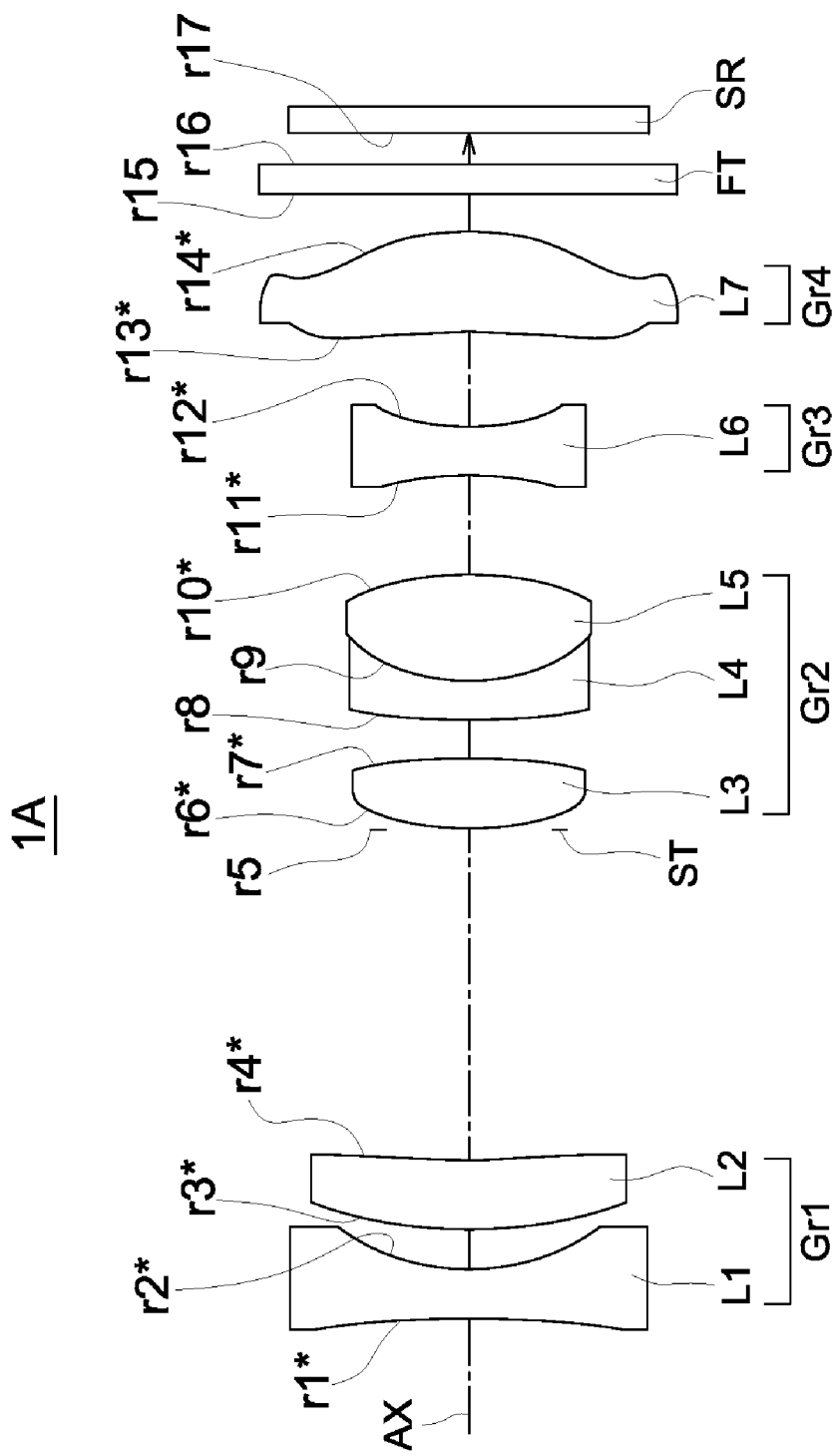
FIG. 4 is a cross sectional view showing the optical path at the wide-angle end of the variable-power optical system relating to Example 1 of the present invention.

FIG. 4 is a cross sectional view (optical path diagram) traversing the optical axis AX, representing the arrangement of lens groups in the variable-power optical system 1A of Example 1. The optical path diagrams of FIG. 4 and FIG. 5 through 15 show the lens arrangement at the wide-angle end (W). Throughout Example 1 and Examples 2 through 12 to be described below, these lens groups include a first lens group (Gr1) having a negative optical power as a whole, a second lens group (Gr2) having a positive optical power, a third lens group (Gr3) having a negative optical power, and a fourth lens group (Gr4) having a positive optical power, in that order as viewed from the object side in the drawings (the left side in FIG. 4). To put it another way, the lens groups are aligned in a negative-lead configuration wherein the first lens (Gr1) closest to the object has a negative optical power and are provided as a four-component variable-power optical system with negative, positive, negative, and positive components.

In the variable-power optical system 1A of Example 1 in FIG. 4, lens groups are configured in the following order as viewed from the object side: The first lens group (Gr1) has a negative optical power as a whole, and is composed of a biconcave negative lens (first lens L1) and a positive meniscus lens (second lens L2) with a convex surface facing the object side. The second lens group (Gr2) has the positive optical power as a whole, and is composed of a biconvex positive lens (third lens L3) and a cemented lens formed of a negative meniscus lens (fourth lens L4) with a convex surface facing the object side and a biconvex positive lens (fifth lens L5). The object side of this second lens group (Gr2) is provided with an optical stop (ST) that moves together with the second lens group (Gr2) at the time of varying the power. The third lens group (Gr3) is composed of one biconcave negative lens (sixth lens L6) having a negative optical power. The fourth lens group (Gr4) is composed of one positive meniscus lens (seventh lens L7) with a convex surface facing the image side having a positive optical power. The light-receiving surface of an image pickup element (SR) is provided on the image side of this fourth lens group (Gr4) through the parallel flat plate (FT). The parallel flat plate (FT) corresponds to an optical low-pass filter, a infrared cutoff filter or a cover glass of the image pickup element 16.

Instead of the aforementioned optical stop (ST), a mechanical shutter can be arranged. FIG. 4 shows a continuous variable-power optical system. However, to achieve a more compact configuration, it is possible to configure a two-focus switching type variable-power optical system using the same optical configuration. Especially, as for the occasion that the traveling locus of the first lens group (Gr1) runs to make a U-turn (moves to form a locus in a convex shape projecting to the image side) when the power varies from the wide-angle end to the telephoto end, resulting in the approximately the same overall optical lengths at the wide-angle end and telephoto end, use of the two-focus switching type variable-power optical system allows the first lens group (Gr1) to be statically arranged at the time of varying the power. This arrangement provides a great advantage in reducing the size of the units including the drive mechanism. These points also apply to Examples 2 through 12 to be discussed below (which is omitted in the following descriptions).

The number ri (i=1, 2, 3, . . . ) labeled to the lens surfaces in FIG. 4 indicates i-th lens when counted from the object side (wherein a cemented lens surface is counted as one surface). The surface showing "ri" followed by "*" is an aspheric surface. Each of the aforementioned optical stops (ST), each of opposing surfaces of the parallel flat plate (FT) and the light receiving surface of the image pickup element (SR) are treated as constituting one surface. This method of handling is also applicable to the optical path diagrams (FIGS. 5 through 15) for the other examples to be described later. The reference numerals of the diagram have basically the same references as those of FIG. 4. However, this does not mean that they are strictly identical. For example, throughout the diagrams, the lens surfaces closest to the object have the same number (r1), but this does not mean that these curvatures are the same throughout the embodiments.

In the aforementioned configuration, light coming from the object side travels along the optical axis AX to pass throughout the first lens group, second lens group, third lens group and fourth lens group (Gr1, Gr2, Gr3 and Gr4) and parallel flat plate (FT). Then the optical image of an object is formed on the light-receiving surface of the image pickup element (SR). In the image pickup element (SR), the optical image corrected by the parallel flat plate (FT) is converted into electric signal. This electric signal is subjected to predetermined digital image processing and image compression processing, as required, and is recorded in the memory of a mobile phone or mobile information terminal as a digital video signal, which is then transmitted to other digital equipment by wired or wireless means.

Figure 28A:
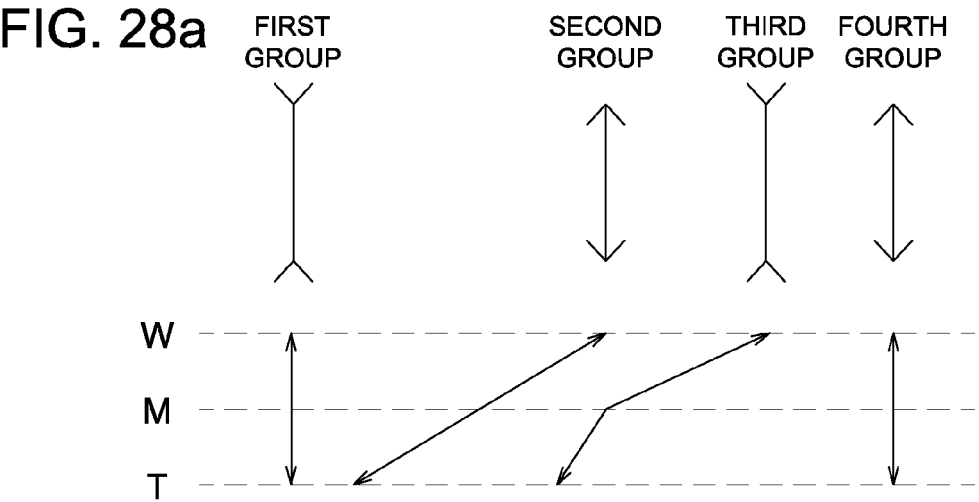
Figure 28B:
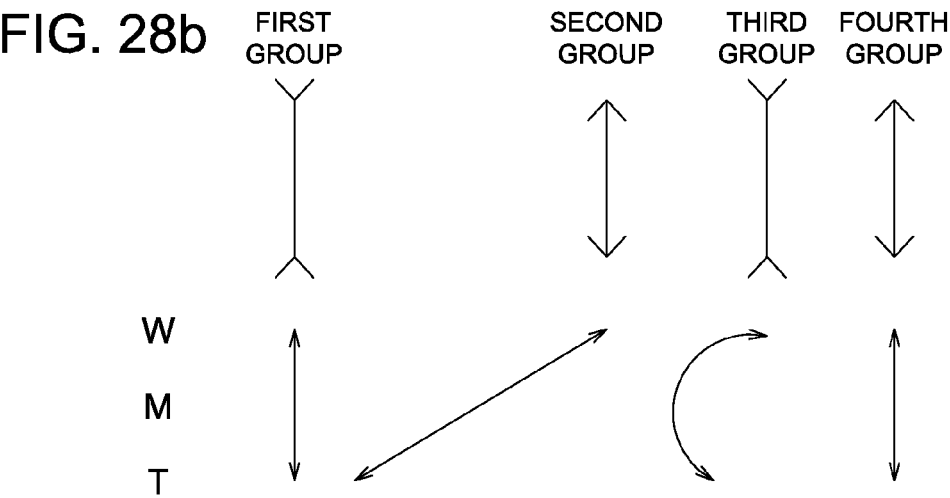
Figure 28C:
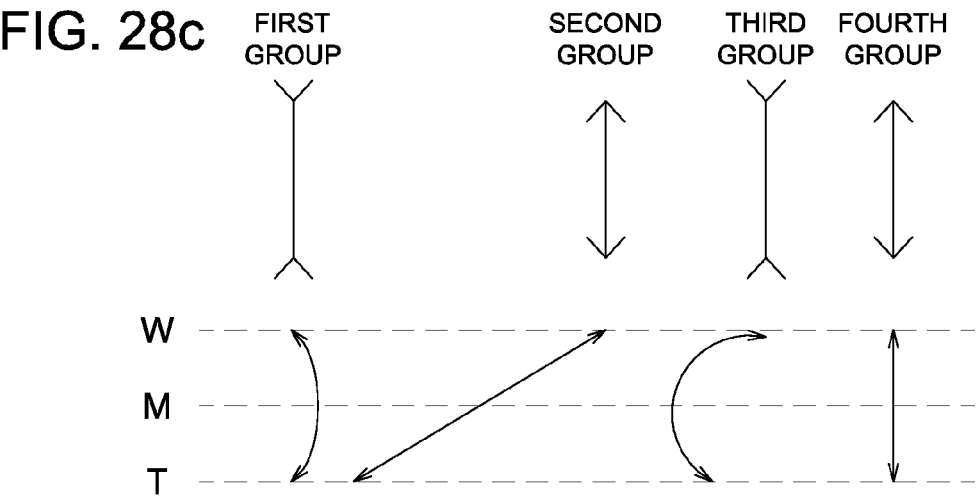

Each of FIGS. 28a, 28b, and 28c is a schematic diagram representing traveling directions of these lens groups at the time of varying the power. Each of FIGS. 28a, 28b, and 28c shows not only the traveling directions of lens groups in Example 1, but also the traveling directions in Example 2 and succeeding examples. In FIGS. 28a, 28b, and 28c, the left corresponds to the object side. Similarly to the previously described cases, the first lens group (Gr1), second lens group (Gr2), third lens group (Gr3) and fourth lens group (Gr4) are arranged in that order as viewed from the object side. In the drawings, the reference letter W indicates the wide-angle end having the minimum focal length and the maximum angle of view. The reference letter T denotes the telephoto end having the maximum focal length and the minimum angle of view. The reference letter M shows that the focal length is intermediate between the wide-angle end (W) and telephoto end (T). The actual lens group moves on a straight line along the optical axis. In this diagram, the positions of the lens groups at the wide-angle end (W), intermediate point (M) and telephoto end (T) are arranged from top to bottom in the diagram.

As shown in FIG. 28a, in the Example 1, the second lens group (Gr2) linearly moves toward the object, and the third lens group (Gr3) linearly moves toward the object in the manner of shifting the traveling speed at the intermediate point (M). In the meantime, the first lens group (Gr1) and fourth lens group (Gr4) are statically positioned. The optical stop (ST) travels together with the second lens group (Gr2) at the time of varying the power. It should be noted, however, that the traveling directions of these lens groups and the distances of traveling may change depending on the optical power of the lens group and lens configuration, in this Example as well as the following Examples. For example, As for a lens group which is shown to linearly moves as in the case of the second lens group (Gr2) in FIGS. 28a, 28b, and 28c, it can include the cases wherein the lens group moves to form a convex curve projecting to the object side or image side, as well as the cases wherein it moves along a U-turn shape.

Tables 2 and 3 show construction data of each lens in the variable-power optical system 1A of Example 1. In this variable-power optical system 1A, the first, second, third, sixth and seventh lenses (L1, L2, L3, L6 and L7) are designed as bi-aspheric surface lenses and the fifth lens (L5) is a lens with one aspheric surface. The seventh lens (L7) a resin lens and other lenses are glass lenses. Table (to be given later) shows the relevant numerals when the aforementioned conditional expressions (1) through (14) are applied to the optical system of Example 1.

TABLE 2

| Lens surface | Curvature radius (mm) | On-axis distance between surfaces (mm) | | | Refractive index | Abbe number |
|---|---|---|---|---|---|---|
| | | W | M | T | | |
| r1* | −32.527 | | | | | |
| | | 0.800 | | | 1.75379 | 51.59 |
| r2* | 3.592 | | | | | |
| | | 0.626 | | | | |
| r3* | 6.805 | | | | | |
| | | 1.146 | | | 1.80000 | 22.60 |
| r4* | 18.041 | | | | | |
| | | 5.478 | 2.922 | 0.600 | | |
| r5 (Stop) | ∞ | | | | | |
| | | 0.000 | | | | |
| r6* | 4.810 | | | | | |
| | | 1.186 | | | 1.58913 | 61.11 |
| r7* | −9.400 | | | | | |
| | | 0.644 | | | | |
| r8 | 13.186 | | | | | |
| | | 0.600 | | | 1.84823 | 29.41 |
| r9 | 3.238 | | | | | |
| | | 1.769 | | | 1.58913 | 61.11 |
| r10* | −5.384 | | | | | |
| | | 1.642 | 1.800 | 2.607 | | |
| r11* | −7.393 | | | | | |
| | | 0.800 | | | 1.61602 | 57.94 |
| r12* | 4.051 | | | | | |
| | | 1.546 | 3.944 | 5.459 | | |
| r13* | −21.492 | | | | | |
| | | 1.663 | | | 1.58340 | 30.23 |
| r14* | −4.132 | | | | | |
| | | 0.600 | | | | |
| r15 | ∞ | | | | | |
| | | 0.500 | | | 1.51680 | 64.20 |
| r16 | ∞ | | | | | |
| | | 0.500 | | | | |
| r17 (Image plane) | ∞ | | | | | | surface when counted from the object side on the optical path, as shown in FIG. 4. The surface with "ri" affixed with "*" is an aspheric surface (i.e., a refractive optical surface in an aspheric shape or a surface with a refractive action equivalent to an aspheric surface). The optical stop (ST), both surfaces of the parallel flat plate (FT) and the light-receiving surface of the image pickup element (SR) are flat and the radius thereof is infinite.

The aspheric shape of the optical surface can be defined by the following formula (16) using the local orthogonal coordinates (x, y and z) wherein the tip of the surface is an origin, and the direction from the object to the image pickup element is the positive direction on the z-axis.

[Mathematical Formula 2]

$$Z = \frac{ch^2}{1 + SQRT\{1 - (1+k)c^2h^2\}} + Ah^4 + Bh^6 + Ch^8 + Dh^{10} + Eh^{12} + Fh^{14} + Gh^{16} \qquad (16)$$

In the expression, z is the amount of displacement in the z-axis direction at height h (measured from the surface tip), h is the height perpendicular to the z axis ($h^2=x^2+y^2$), c is a paraxial curvature (=1/curvature radius), A, B, C, D, E, F and G are the fourth, sixth, tenth, twelfth, fourteenth and sixteenth order aspheric surface coefficients, respectively, and k is a conic constant.

As will be apparent from the formula (16), a curvature radius for an aspheric surface of Table 2 shows a value at a position around the tip of the lens surface. Table 3 shows conic constant k of a surface defined as an aspheric surface (a surface labeled "ri" affixed with "*" in Table 2), and values for aspherical surface coefficients A, B, C, D, E, F and G.

Figure 16:
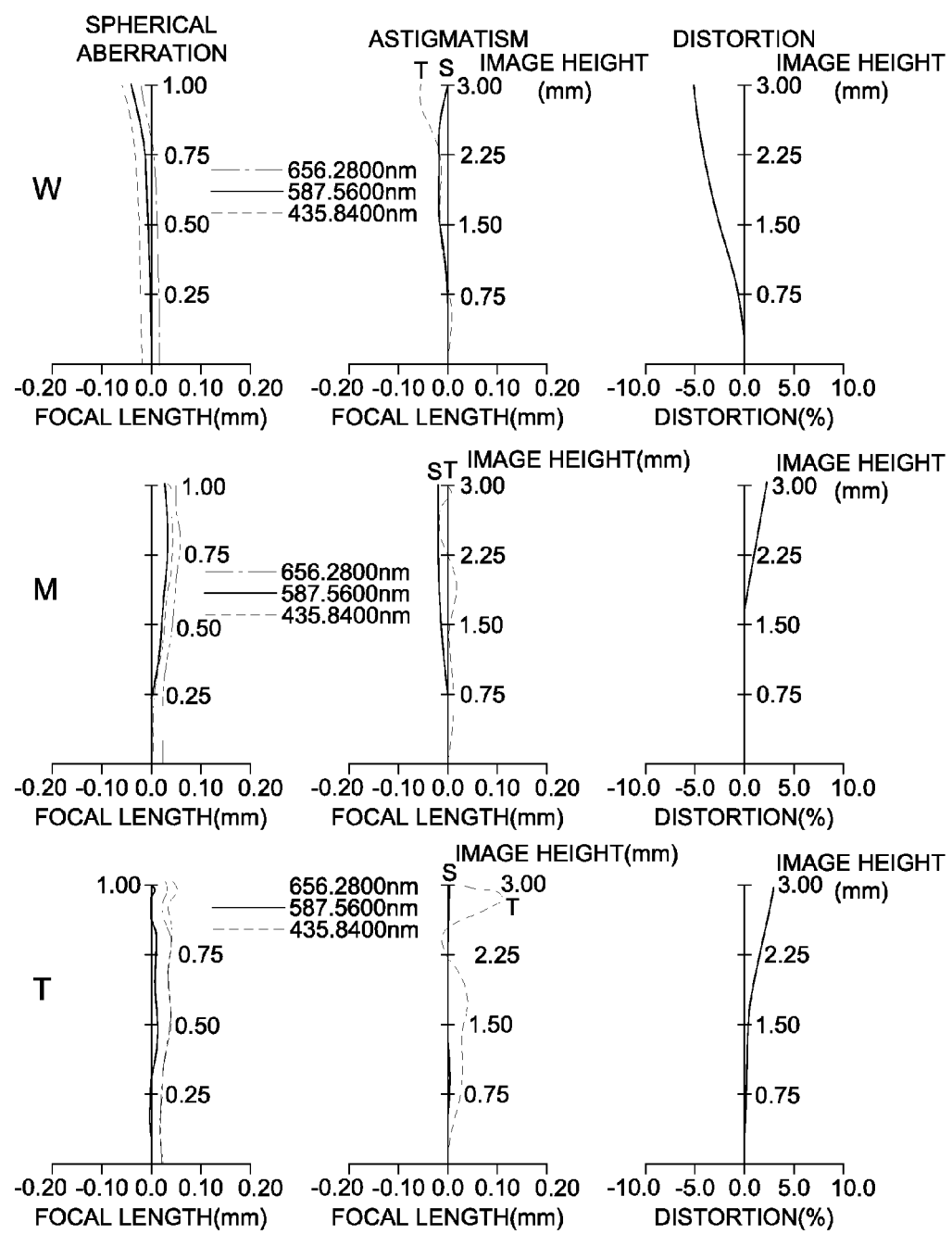
FIG. 16 is an aberration diagram representing spherical aberration, astigmatism and distortion of lens groups in Example 1.
Figure 17:
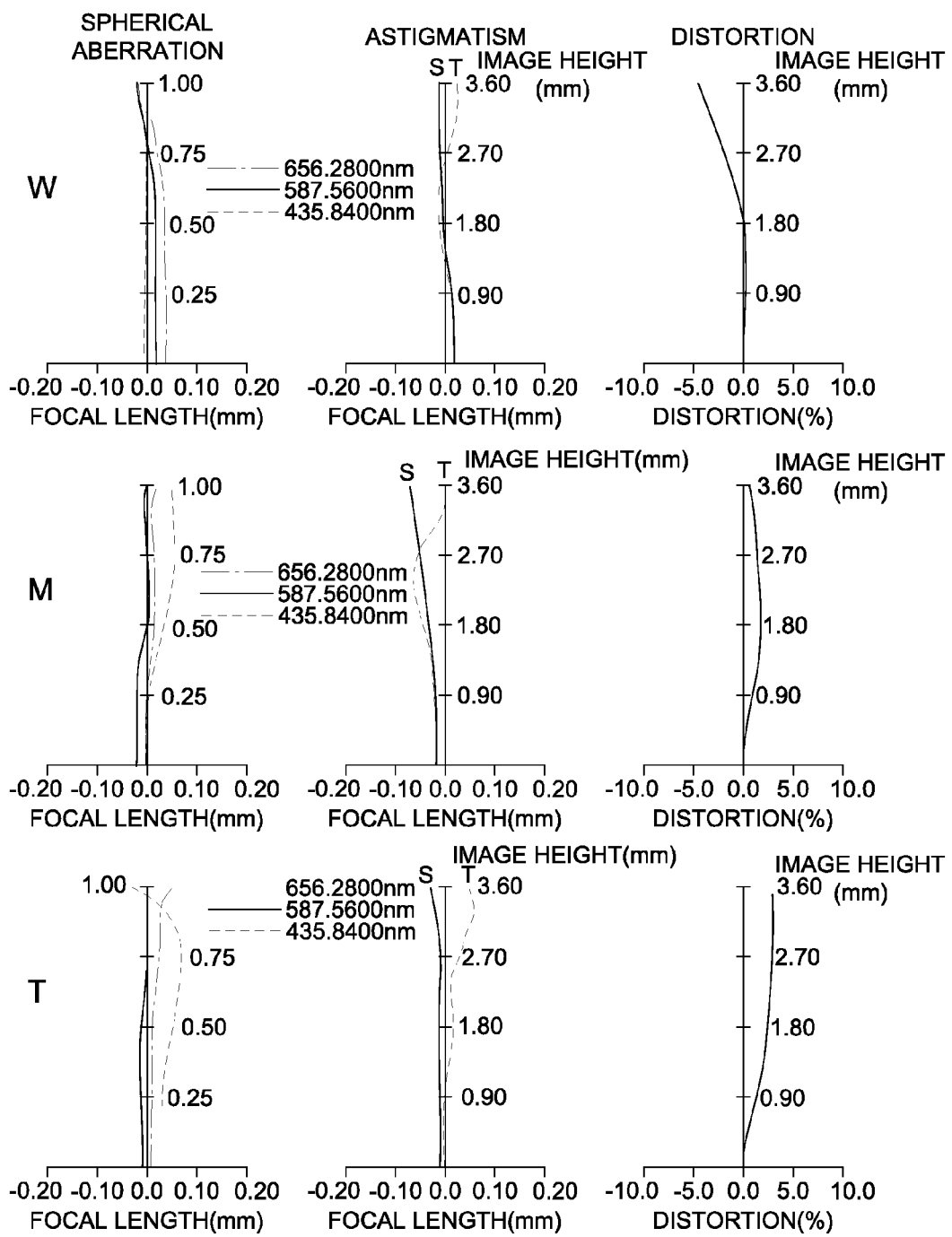
FIG. 17 is an aberration diagram representing spherical aberration, astigmatism and distortion of lens groups in Example 2.
Figure 18:
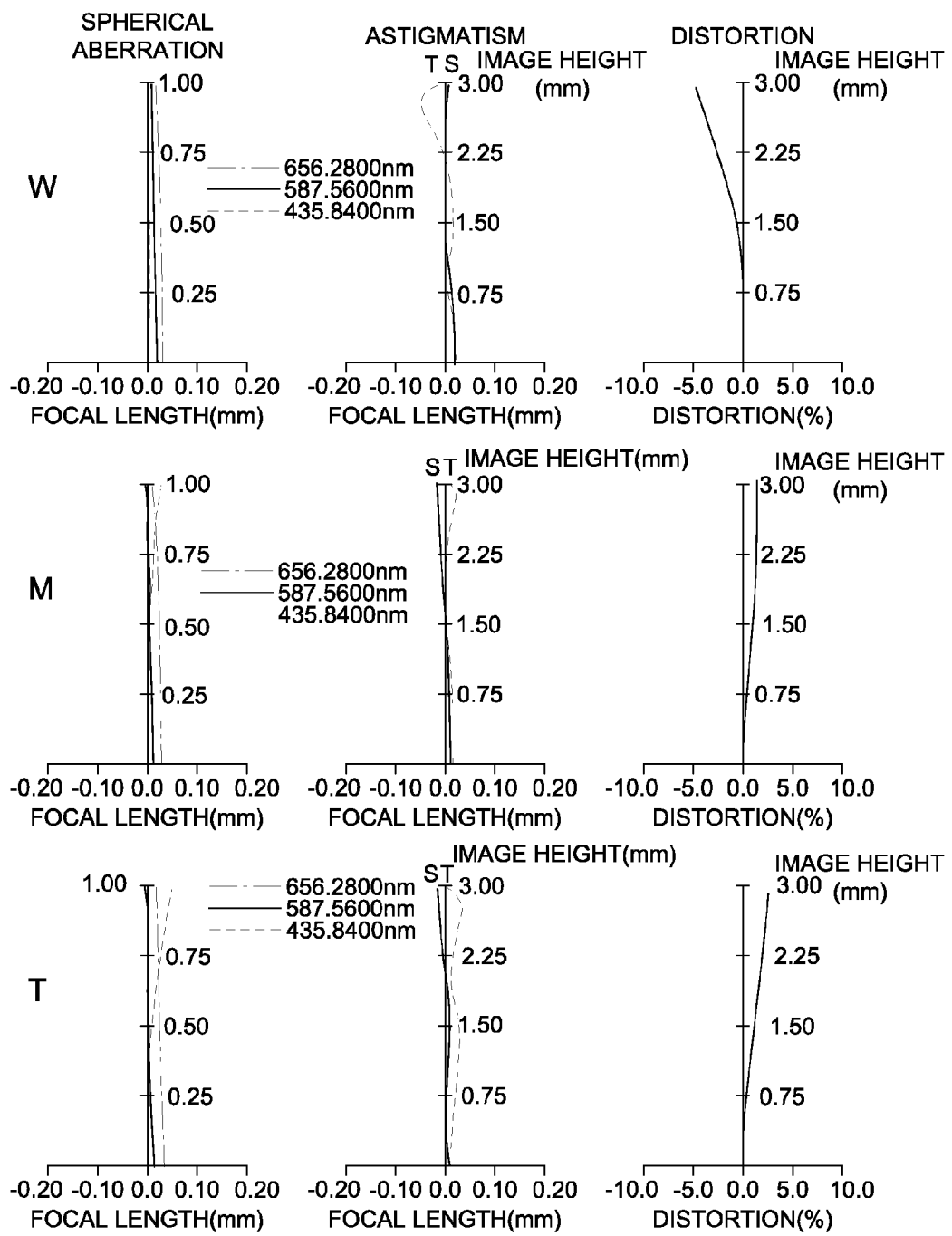
FIG. 18 is an aberration diagram representing spherical aberration, astigmatism and distortion of lens groups in Example 3.
Figure 19:
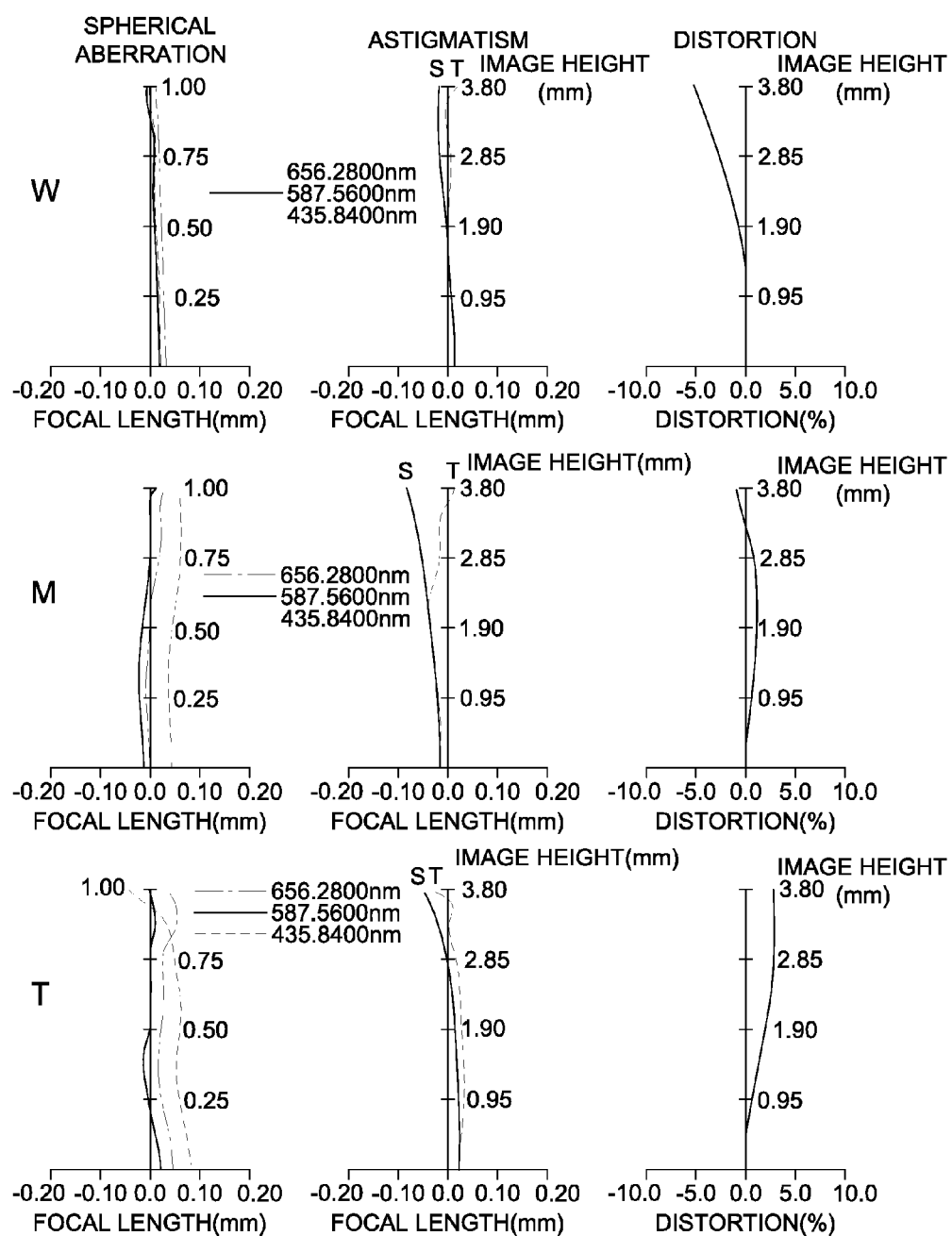
FIG. 19 is an aberration diagram representing spherical aberration, astigmatism and distortion of lens groups in Example 4.
Figure 20:
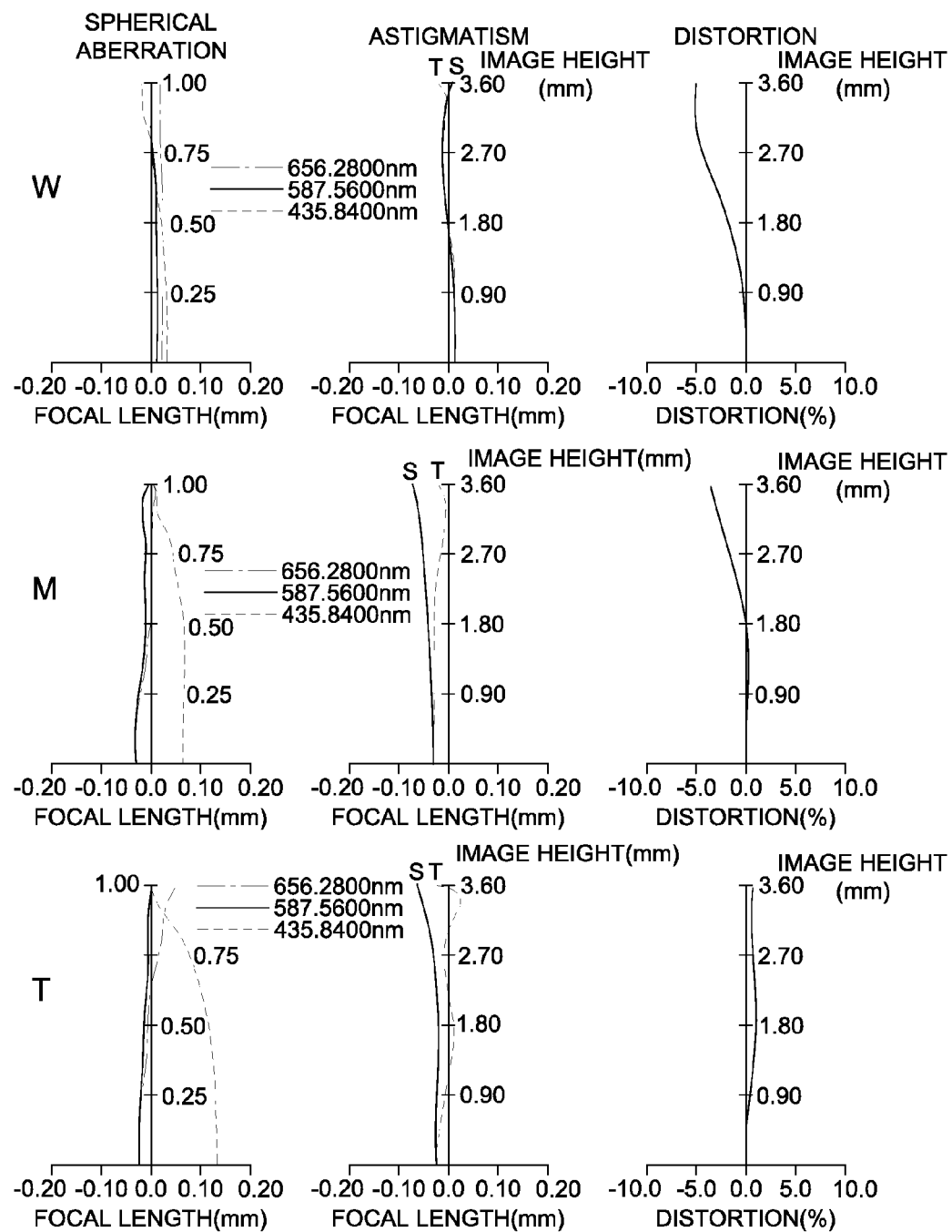
FIG. 20 is an aberration diagram representing spherical aberration, astigmatism and distortion of lens groups in Example 5.
Figure 21:
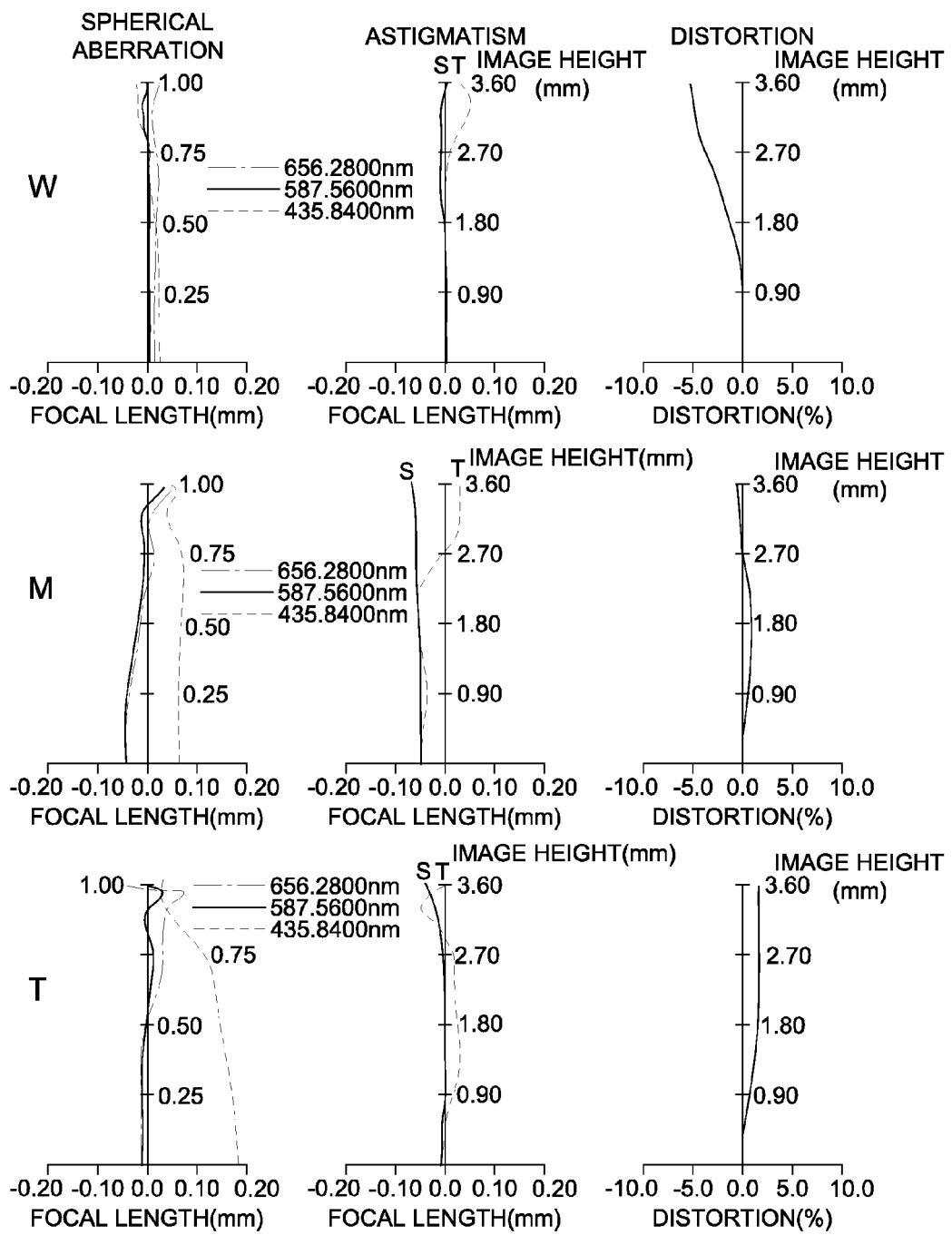
FIG. 21 is an aberration diagram representing spherical aberration, astigmatism and distortion of lens groups in Example 6.
Figure 22:
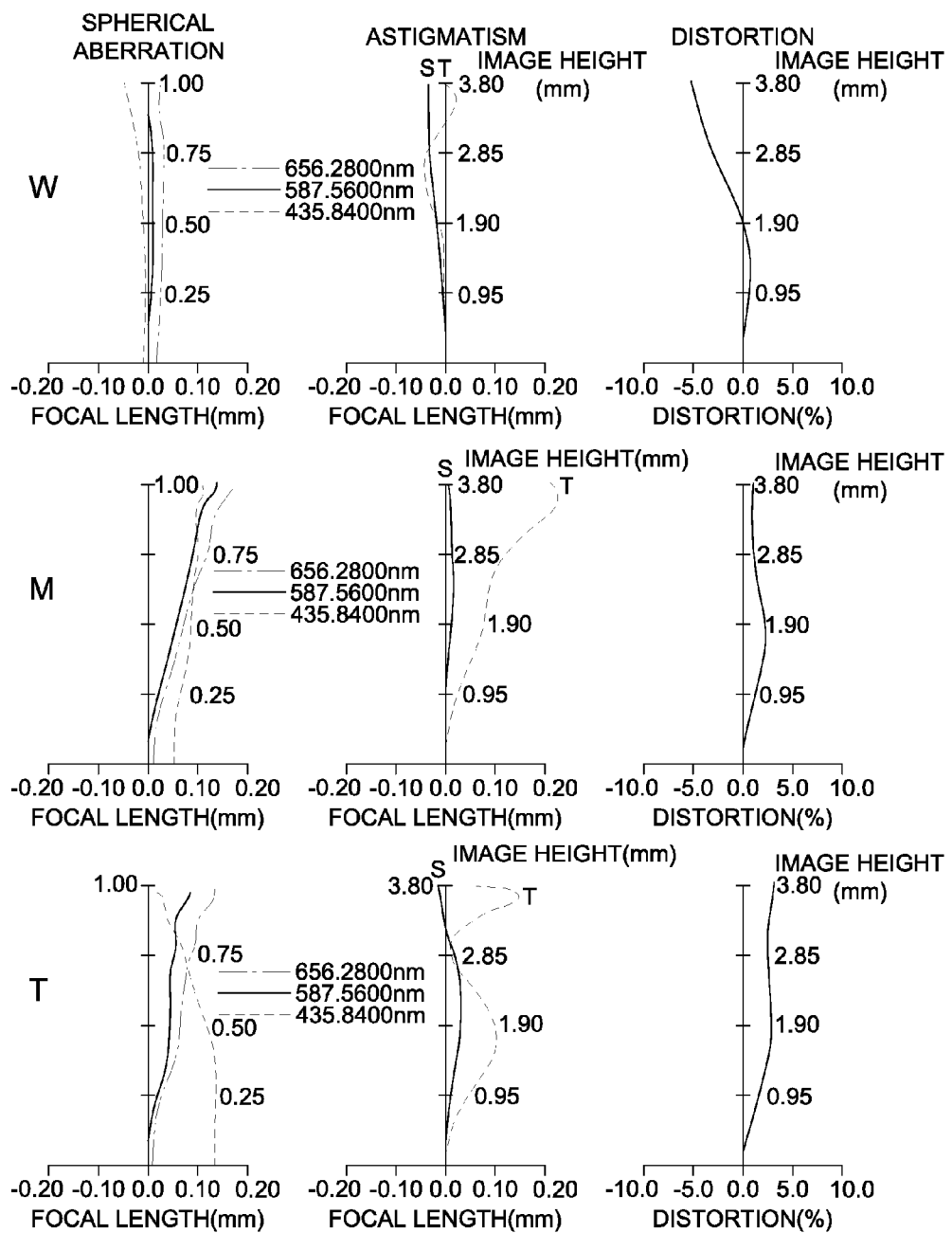
FIG. 22 is an aberration diagram representing spherical aberration, astigmatism and distortion of lens groups in Example 7.
Figure 23:
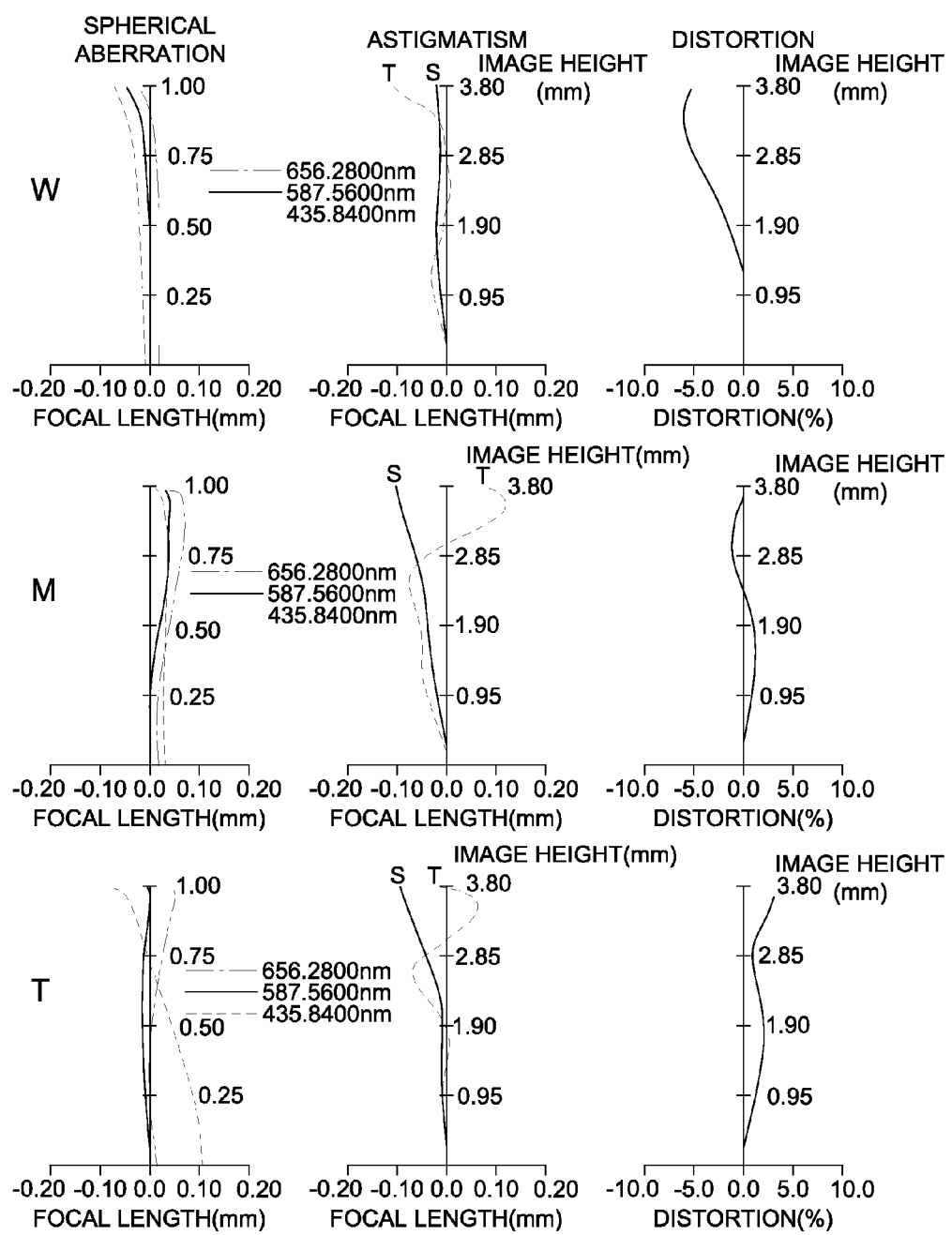
FIG. 23 is an aberration diagram representing spherical aberration, astigmatism and distortion of lens groups in Example 8.
Figure 24:
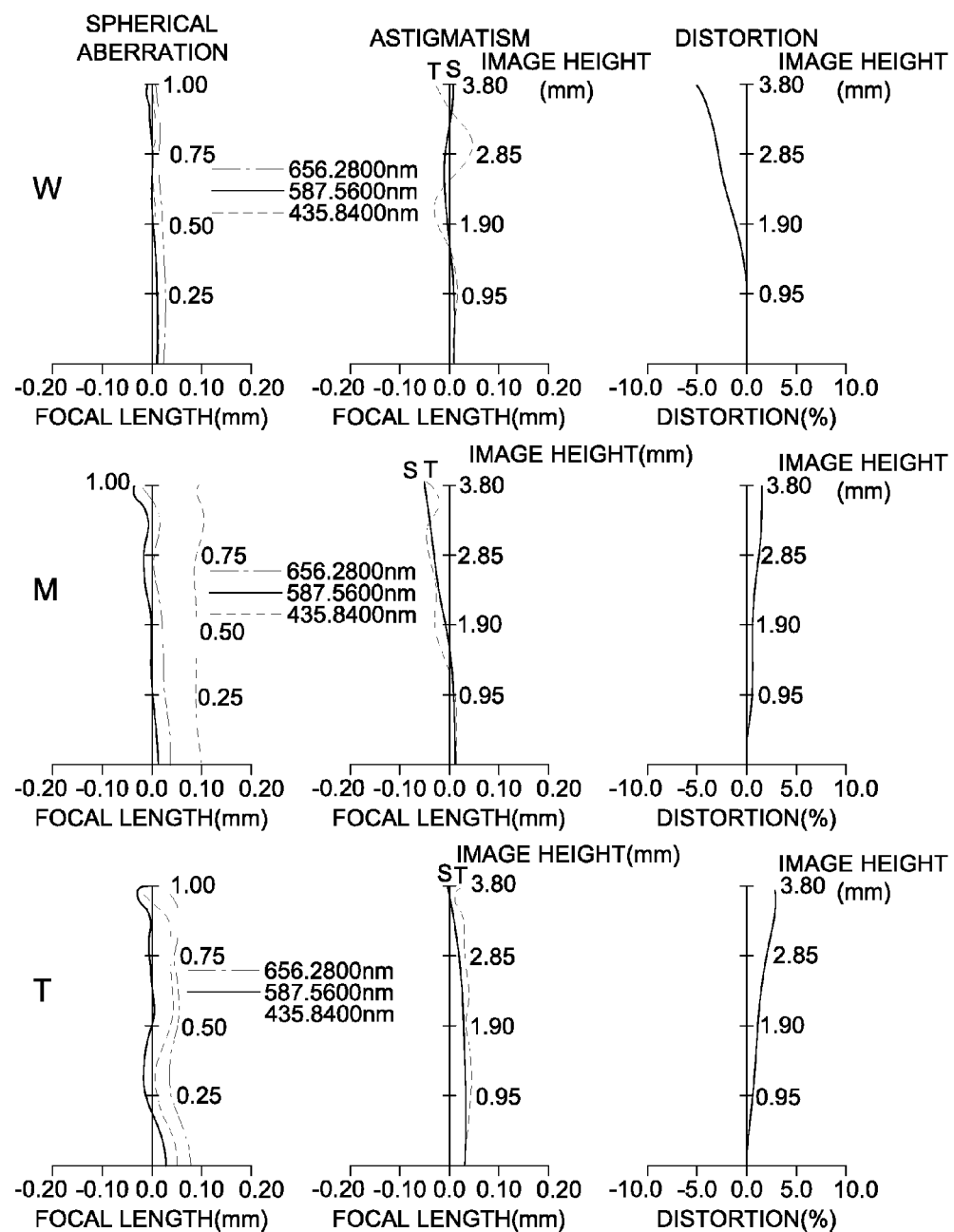
FIG. 24 is an aberration diagram representing spherical aberration, astigmatism and distortion of lens groups in Example 9.
Figure 25:
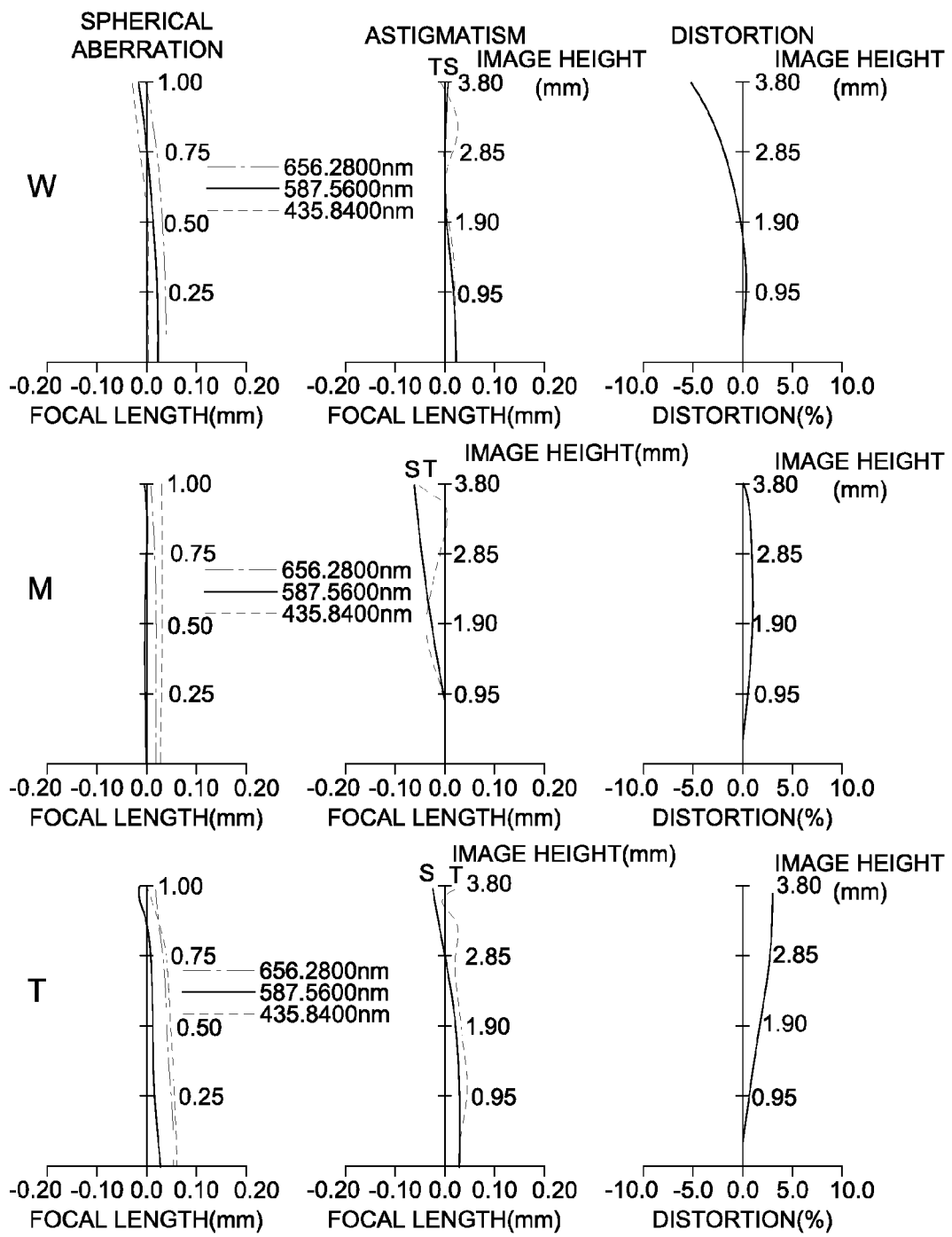
FIG. 25 is an aberration diagram representing spherical aberration, astigmatism and distortion of lens groups in Example 10.
Figure 26:
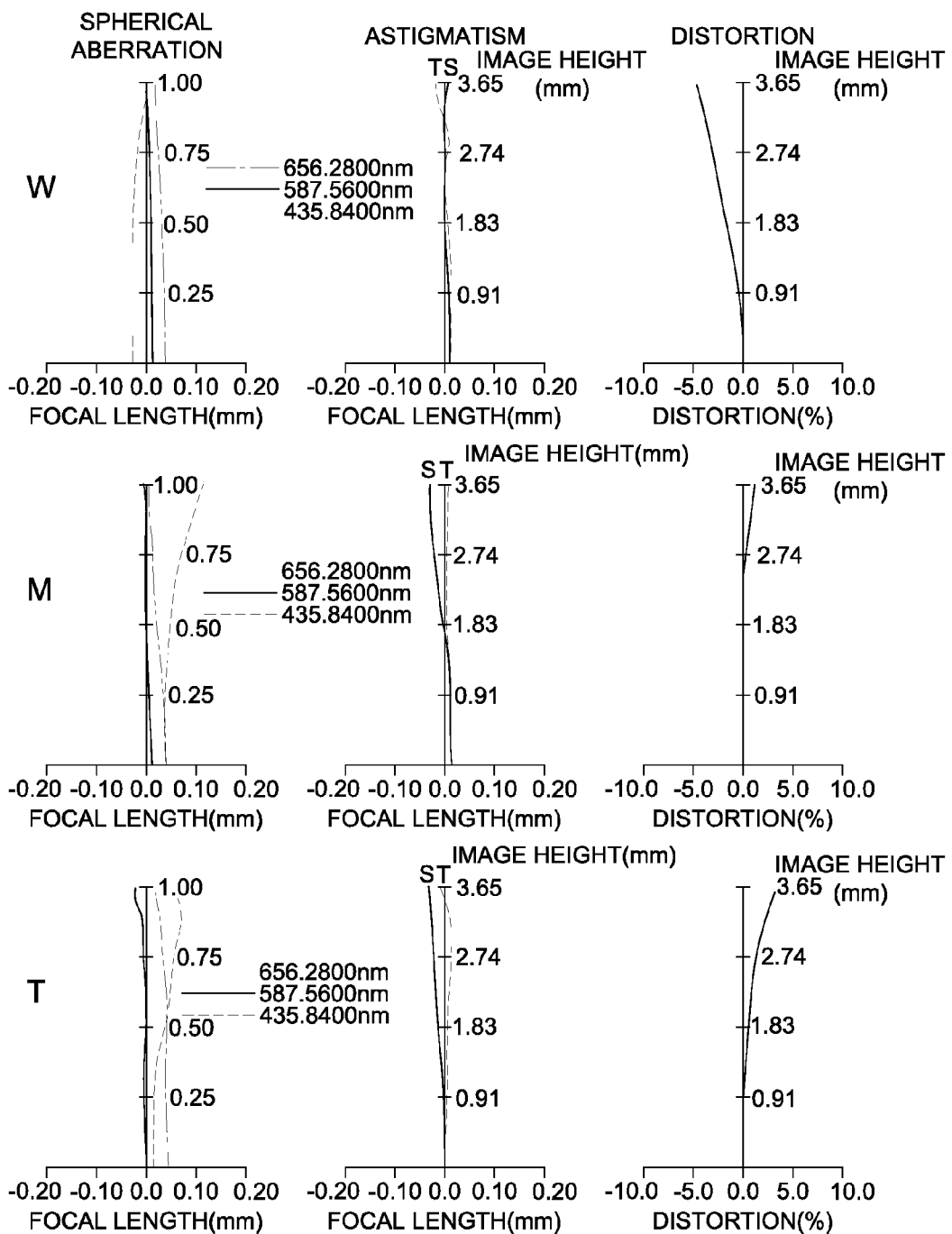
FIG. 26 is an aberration diagram representing spherical aberration, astigmatism and distortion of lens groups in Example 11.
Figure 27:
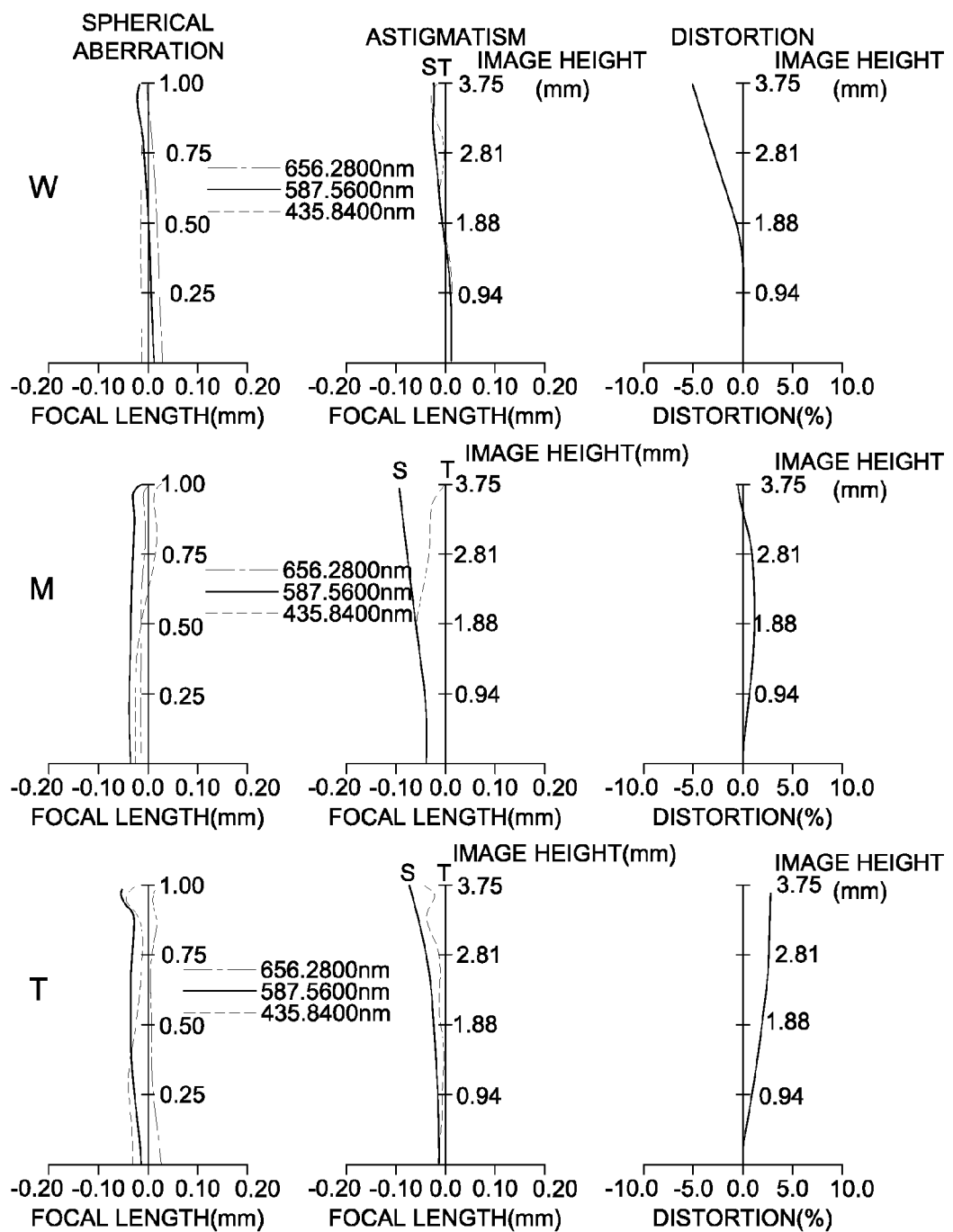
FIG. 27 is an aberration diagram representing spherical aberration, astigmatism and distortion of lens groups in Example 12; and Each of FIGS. 28a, 28b and 28c is a schematic diagram representing moving direction of the lens groups in the Examples.

FIG. 16 shows spherical aberration (LONGITUDINAL SPHERICAL ABERRATION), astigmatism (ASTIGMA-

TABLE 3

| Lens surface | Conic constant | Aspheric surface coefficient | | | | | | |
|---|---|---|---|---|---|---|---|---|
| | | A | B | C | D | E | F | G |
| r1 | 0 | −5.36E−03 | 1.10E−03 | −1.28E−04 | 6.28E−06 | −2.52E−07 | 2.65E−08 | 0.00E+00 |
| r2 | 0 | −7.46E−03 | 9.34E−04 | 2.91E−05 | −2.87E−05 | −1.03E−06 | 4.59E−07 | 0.00E+00 |
| r3 | 0 | −1.05E−03 | −2.99E−04 | 7.94E−05 | 1.47E−06 | −4.10E−06 | 3.82E−07 | 0.00E+00 |
| r4 | 0 | −1.04E−03 | −2.75E−04 | 5.93E−05 | 1.67E−07 | −3.58E−06 | 5.87E−07 | −2.63E−08 |
| r6 | 0 | −1.94E−03 | 2.00E−05 | 1.73E−04 | −6.39E−04 | 5.57E−04 | −2.04E−04 | 2.72E−05 |
| r7 | 0 | 1.68E−03 | 1.22E−03 | −2.24E−03 | 1.81E−03 | −7.76E−04 | 1.65E−04 | −1.38E−05 |
| r10 | 0 | −1.30E−03 | 3.13E−04 | −6.77E−05 | 9.86E−06 | 0.00E+00 | 0.00E+00 | 0.00E+00 |
| r11 | −1 | −9.09E−03 | 5.74E−03 | −3.39E−03 | 9.33E−04 | −7.73E−05 | 0.00E+00 | 0.00E+00 |
| r12 | −1 | −1.03E−03 | 4.84E−03 | −2.25E−03 | 4.00E−04 | −3.23E−06 | 0.00E+00 | 0.00E+00 |
| r13 | −1 | −2.11E−03 | −1.00E−05 | 2.54E−04 | −3.73E−05 | 2.49E−06 | −6.71E−08 | 0.00E+00 |
| r14 | −1 | −1.43E−03 | −1.96E−03 | 8.04E−04 | −1.29E−04 | 1.06E−05 | −3.46E−07 | 0.00E+00 |

Table 2 shows the number of each lens surface; curvature radius of each surface (in terms of mm); distances on the optical axis between lens surfaces (on-axis distance between surfaces in terms of mm) when the focal position is adjusted to the infinity, at the wide-angle end (W), intermediate point (M) and telephoto end (T); refractive index of each lens, and Abbe number, in that order as viewed from the left. The blank field of the on-axis distance between surfaces M and T shows the same value as that in the "W" column. Further, the on-axis distance between surfaces indicates the distance calculated on the assumption that air is present as a medium in the area between a pair of opposed surfaces. Here, the numbers ri (i=1, 2, 3, . . . ) labeled to the lens surfaces indicates i-th optical TISM) and distortion (DISTORTION) of the entire optical system in Example 1 in that order as viewed from the left, based on the aforementioned lens arrangement and configuration. In this diagram, the upper level shows aberrations at the wide-angle end (W), the intermediate level shows aberrations at the intermediate point (M), and the lower level shows aberrations at the telephoto end (T). The horizontal axis for the spherical aberration and astigmatism indicates the shift of the focal position in terms of "mm", and the horizontal axis for distortion shows the amount of distortion in terms of percentage with respect to the total amount. The vertical axis for the spherical aberration represents a value normalized with respect to the height of incidence. The vertical axis for astigmatism and distortion shows the values in terms of the image height (in mm).

In the diagram illustrating the spherical aberration, aberrations at the time of using three beams of light having different wavelengths are shown: the one-dot chain line indicates a red color (with a wavelength of 656.28 nm), the solid line denotes a yellow color (so-called d-line with a wavelength of 587.56 nm), and the broken line represents a blue color (with a wavelength of 435.84 nm). In the astigmatism diagram, reference letters s and t indicate the results on the sagittal (radial) surface and tangential (meridional) surface, respectively. Further, the astigmatism and distortion diagram show the results of using the aforementioned yellow line (d-line). As will be apparent, FIG. 16 suggests excellent optical characteristics wherein the distortion of the lens groups in Example 1 is kept at 5% or less at any of the wide-angle end (W), intermediate point (M) and telephoto end (T). Tables 14 and 15 show the focal length (in mm) and F value at the wide-angle end (W), intermediate point (M) and telephoto end (T) in Example 1, respectively. These Tables demonstrate that an optical system with a short focal length and excellent performance in terms of speed is realized in the present invention.

Example 2

Figure 5:
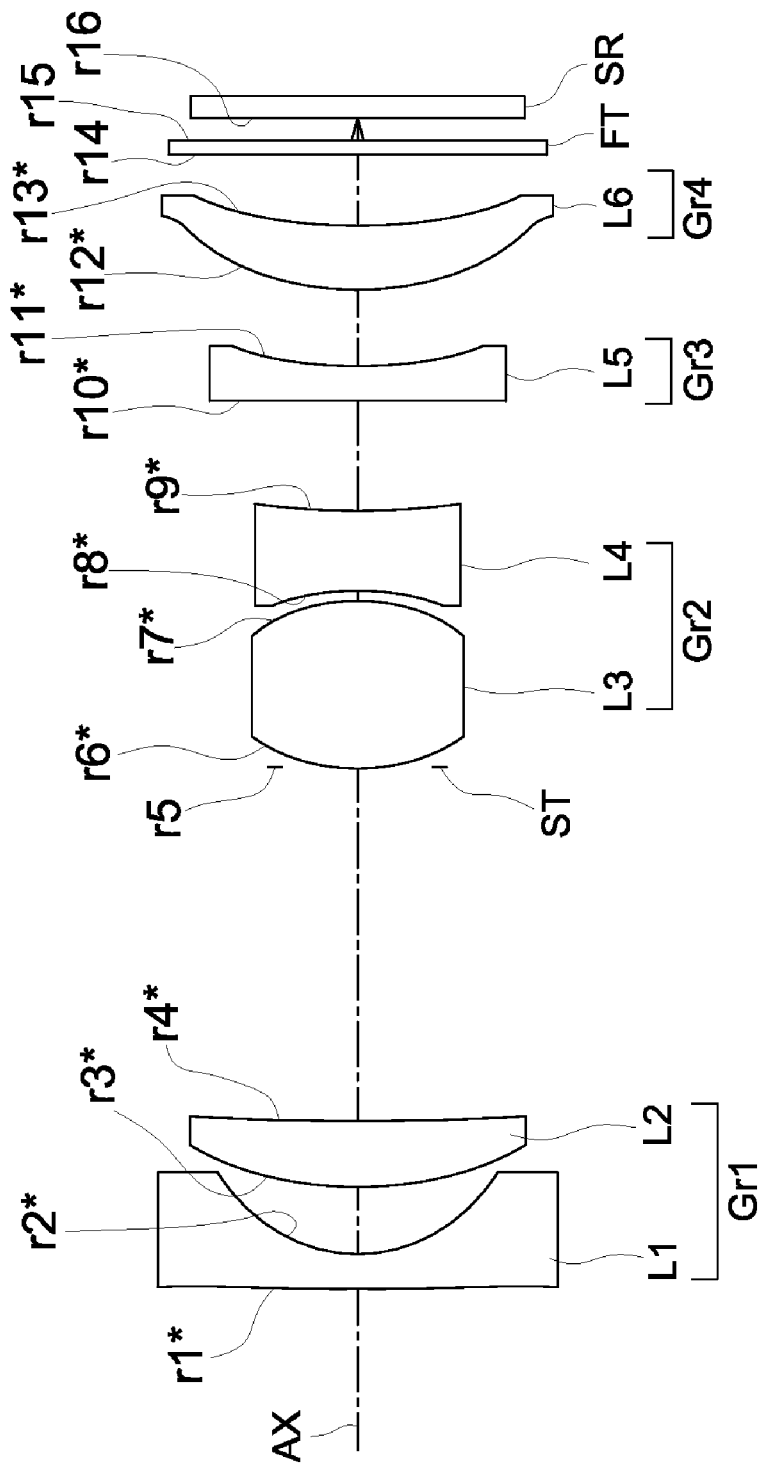
FIG. 5 is a cross sectional view showing the optical path at the wide-angle end of the variable-power optical system relating to Example 2.

FIG. 5 is a cross sectional view traversing the optical axis (AX), representing the arrangement of the lens groups in the variable-power optical system 1B in Example 2. The variable-power optical system 1B in Example 2 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) arranged in that order as viewed from the object side. The third lens group (Gr3) is composed of one negative meniscus lens (L5) with a convex surface facing the object side. The fourth lens group (Gr4) is composed of one positive meniscus lens (L6) with a convex surface facing the object side.

In the variable-power optical system 1B with the above lens configuration in the Example 2, at the time of varying the power from the wide-angle end (W) to the telephoto end (T), the second lens group (Gr2) linearly moves toward the object and the third lens group (Gr3) makes a U-turn to form a convex shape projecting to the object side, as shown in FIG. 28b. The first lens group (Gr1) and fourth lens group (Gr4) are statically positioned. The optical stop (ST) travels together with the second lens group (Gr2) at the time of varying the power.

Tables 4 and 5 show the construction data of each lens in the variable-power optical system 1B in Example 2. As shown in these Tables and FIG. 5, all the lenses (L1 through L6) are designed as bi-aspheric lenses in Example 2. The fifth and sixth lenses (L5 and L6) are resin lenses and the other lenses are glass lenses.

TABLE 4

| Lens surface | Curvature radius (mm) | On-axis distance between surfaces (mm) | | | Refractive index | Abbe number |
|---|---|---|---|---|---|---|
| | | W | M | T | | |
| r1* | −38.691 | | | | | |
| | | 0.800 | | | 1.68980 | 52.82 |
| r2* | 4.146 | | | | | |
| | | 1.485 | | | | |
| r3* | 9.218 | | | | | |
| | | 1.495 | | | 1.80542 | 26.13 |
| r4* | 29.545 | | | | | |
| | | 8.035 | 4.066 | 0.600 | | |
| r5 (Stop) | ∞ | | | | | |
| | | 0.000 | | | | |
| r6* | 4.353 | | | | | |
| | | 3.809 | | | 1.58913 | 61.24 |
| r7* | −4.607 | | | | | |
| | | 0.178 | | | | |
| r8* | −6.980 | | | | | |
| | | 1.837 | | | 1.80542 | 26.13 |
| r9* | 42.756 | | | | | |
| | | 2.471 | 1.889 | 6.138 | | |
| r10* | 49.486 | | | | | |
| | | 0.761 | | | 1.53048 | 55.72 |
| r11* | 9.245 | | | | | |
| | | 1.775 | 6.327 | 5.543 | | |
| r12* | 8.760 | | | | | |
| | | 1.419 | | | 1.58340 | 30.23 |
| r13* | 27.515 | | | | | |
| | | 1.634 | | | | |
| r14 | ∞ | | | | | |
| | | 0.300 | | | 1.51680 | 64.20 |
| r15 | ∞ | | | | | |
| | | 0.500 | | | | |
| r16 (Image plane) | ∞ | | | | | |

TABLE 5

| Lens surface | Conic constant | Aspheric surface coefficient | | | | | | |
|---|---|---|---|---|---|---|---|---|
| | | A | B | C | D | E | F | G |
| r1 | 0 | 3.04E−03 | −1.45E−04 | −4.69E−06 | 6.56E−07 | −2.39E−08 | 3.00E−10 | 0.00E+00 |
| r2 | 0 | 1.26E−03 | 3.64E−04 | −2.57E−05 | −1.78E−07 | −1.91E−07 | 9.40E−09 | 0.00E+00 |
| r3 | 0 | −2.36E−03 | 3.47E−04 | −3.67E−06 | −8.01E−07 | −3.46E−08 | 3.10E−09 | 0.00E+00 |
| r4 | 0 | −2.16E−03 | 1.88E−04 | −7.73E−06 | 9.97E−07 | −2.59E−07 | 2.03E−08 | −4.00E−10 |
| r6 | 0 | −1.15E−03 | −5.40E−05 | −1.25E−05 | −2.28E−06 | 4.86E−07 | −1.52E−07 | 0.00E+00 |
| r7 | 0 | 5.62E−04 | −3.66E−04 | −4.37E−05 | 3.63E−07 | 9.39E−07 | 7.50E−09 | 0.00E+00 |
| r8 | 0 | −1.64E−03 | −3.69E−04 | −2.49E−05 | −8.14E−06 | −9.25E−07 | 5.52E−07 | 0.00E+00 |
| r9 | 0 | 1.42E−03 | 1.48E−04 | −5.23E−06 | −4.17E−07 | 0.00E+00 | 0.00E+00 | 0.00E+00 |
| r10 | 0 | −3.81E−03 | 8.40E−04 | −1.51E−04 | 2.20E−05 | −1.85E−06 | 6.06E−08 | 0.00E+00 |
| r11 | 0 | −3.89E−03 | 9.22E−04 | −1.54E−04 | 1.93E−05 | −1.33E−06 | 3.47E−08 | 0.00E+00 |
| r12 | −1 | 3.36E−03 | −7.17E−04 | 8.48E−05 | −5.18E−06 | 1.77E−07 | −2.80E−09 | 0.00E+00 |
| r13 | 0 | 7.38E−03 | −1.50E−03 | 1.55E−04 | −8.30E−06 | 2.48E−07 | −3.80E−09 | 0.00E+00 |

Example 3

Figure 6:
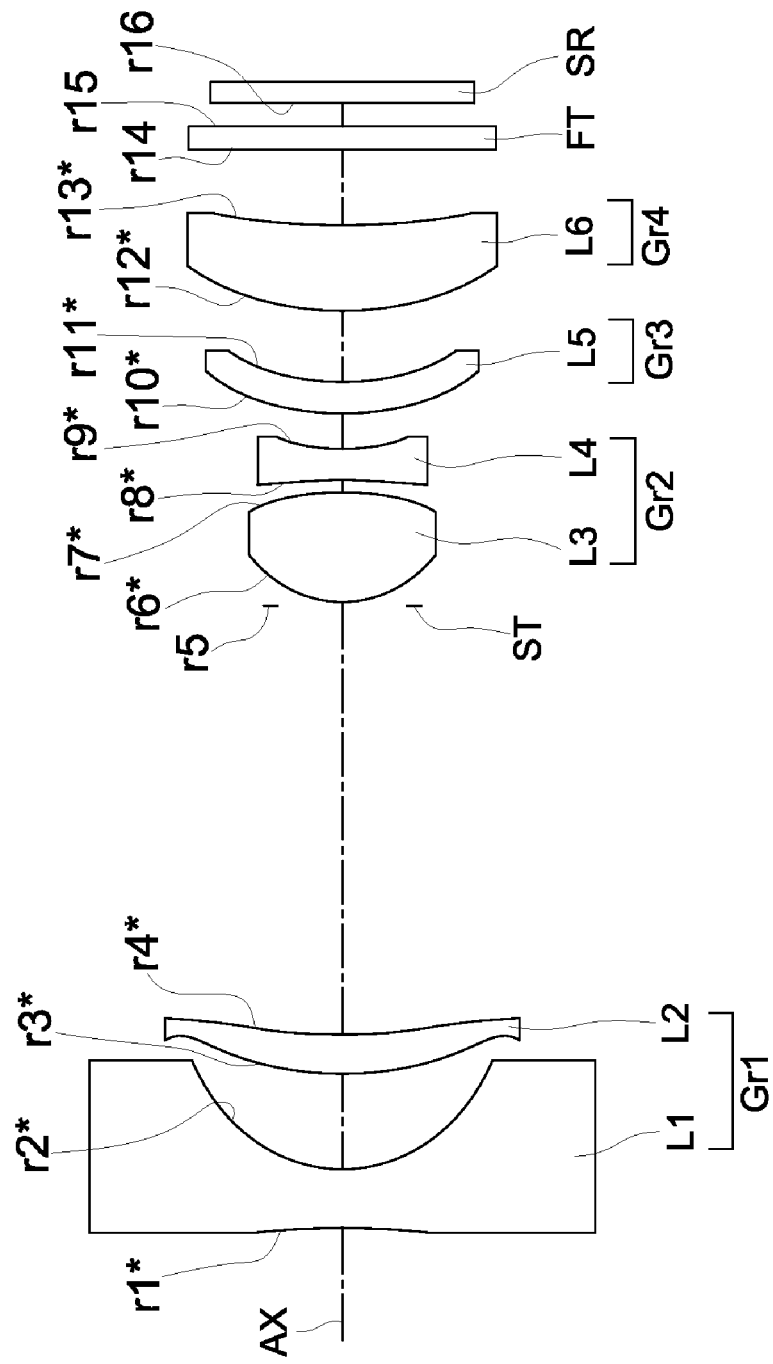
FIG. 6 is a cross sectional view showing the optical path at the wide-angle end relating to the variable-power optical system in Example 3.

FIG. 6 is a cross sectional view traversing the optical axis (AX), representing the arrangement of the lens group in the variable-power optical system 1C of Example 3. The variable-power optical system 1C of Example 3 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface with the object side, in that order as viewed from the object side. The second lens group (Gr2) is composed of a biconvex positive lens (L3) and a biconcave negative lens (L4), in that order as viewed from the object side. The third lens group (Gr3) is composed of one negative meniscus lens (L5) with a convex surface facing the object side. The fourth lens group (Gr4) is composed of one positive meniscus lens (L6) with a convex surface facing the object side.

In the variable-power optical system 1C having the aforementioned lens configuration in Example 3, at the time of varying the power from the wide-angle end (W) to the telephoto end (T), the first lens group moves to form a locus in a convex shape projecting to the image side, the second lens group (Gr2) linearly moves toward the object, and the third lens group (Gr3) moves to form a locus in a convex shape projecting to the object side, as shown in FIG. 28c. In the meantime, the fourth lens group (Gr4) is statically positioned. The optical stop (ST) travels together with the second lens group (Gr2) at the time of varying the power.

Tables 6 and 7 show the construction data of each lens in the variable-power optical system 1C of Example 3. As shown in these Tables and FIG. 6, all of lenses (L1 through L6) are designed as bi-aspheric lenses in Example 3. The first, fifth, and sixth lenses (L1, L5, and L6) are resin lenses, and other lenses are glass lenses.

TABLE 6

| Lens surface | Curvature radius (mm) | On-axis distance between surfaces (mm) | | | Refractive index | Abbe number |
|---|---|---|---|---|---|---|
| | | W | M | T | | |
| r1* | −13.790 | | | | | |
| | | 1.334 | | | 1.53048 | 55.72 |
| r2* | 3.963 | | | | | |
| | | 2.073 | | | | |
| r3* | 6.138 | | | | | |
| | | 0.850 | | | 2.00170 | 20.60 |
| r4* | 7.922 | | | | | |
| | | 9.608 | 3.507 | 1.500 | | |
| r5 (Stop) | ∞ | | | | | |
| | | 0.100 | | | | |
| r6* | 2.787 | | | | | |
| | | 2.429 | | | 1.49700 | 81.61 |
| r7* | −6.471 | | | | | |
| | | 0.279 | | | | |
| r8* | −20.212 | | | | | |
| | | 0.700 | | | 1.75103 | 30.58 |
| r9* | 6.494 | | | | | |
| | | 0.799 | 0.526 | 6.088 | | |
| r10* | 7.039 | | | | | |
| | | 0.700 | | | 1.53048 | 55.72 |
| r11* | 6.200 | | | | | |
| | | 1.557 | 5.662 | 3.298 | | |

TABLE 6-continued

| Lens surface | Curvature radius (mm) | On-axis distance between surfaces (mm) | | | Refractive index | Abbe number |
|---|---|---|---|---|---|---|
| | | W | M | T | | |
| r12* | 9.043 | | | | | |
| | | 1.906 | | | 1.53048 | 55.72 |
| r13* | 97.539 | | | | | |
| | | 1.665 | | | | |
| r14 | ∞ | | | | | |
| | | 0.500 | | | 1.51680 | 64.20 |
| r15 | ∞ | | | | | |
| | | 0.500 | | | | |
| r16 (Image plane) | ∞ | | | | | |

TABLE 7

| Lens surface | Conic constant | Aspheric surface coefficient | | | |
|---|---|---|---|---|---|
| | | A | B | C | D |
| r1 | 0 | 3.90E−03 | −1.86E−04 | 4.54E−06 | −4.67E−08 |
| r2 | 0 | 7.10E−04 | 4.70E−04 | −2.50E−05 | −7.93E−07 |
| r3 | 0 | −4.03E−03 | 2.90E−04 | −3.62E−06 | −5.40E−07 |
| r4 | 0 | −4.00E−03 | 2.52E−04 | −3.87E−06 | −4.58E−07 |
| r6 | 0 | −1.65E−03 | −1.71E−04 | 9.67E−06 | −1.35E−05 |
| r7 | 0 | 6.15E−03 | −1.96E−03 | 8.28E−05 | 1.74E−06 |
| r8 | 0 | 3.73E−04 | −2.79E−03 | 1.41E−04 | −1.62E−06 |
| r9 | 0 | 5.68E−03 | −2.89E−04 | 1.43E−04 | 5.10E−05 |
| r10 | 0 | −9.21E−04 | 4.51E−04 | −1.74E−05 | −5.14E−07 |
| r11 | 0 | −1.02E−03 | 4.17E−04 | 1.08E−05 | −2.44E−06 |
| r12 | 0 | 1.80E−03 | −3.09E−04 | 3.38E−05 | −8.11E−07 |
| r13 | 0 | 4.73E−03 | −7.19E−04 | 6.08E−05 | −1.10E−06 |

Example 4

Figure 7:
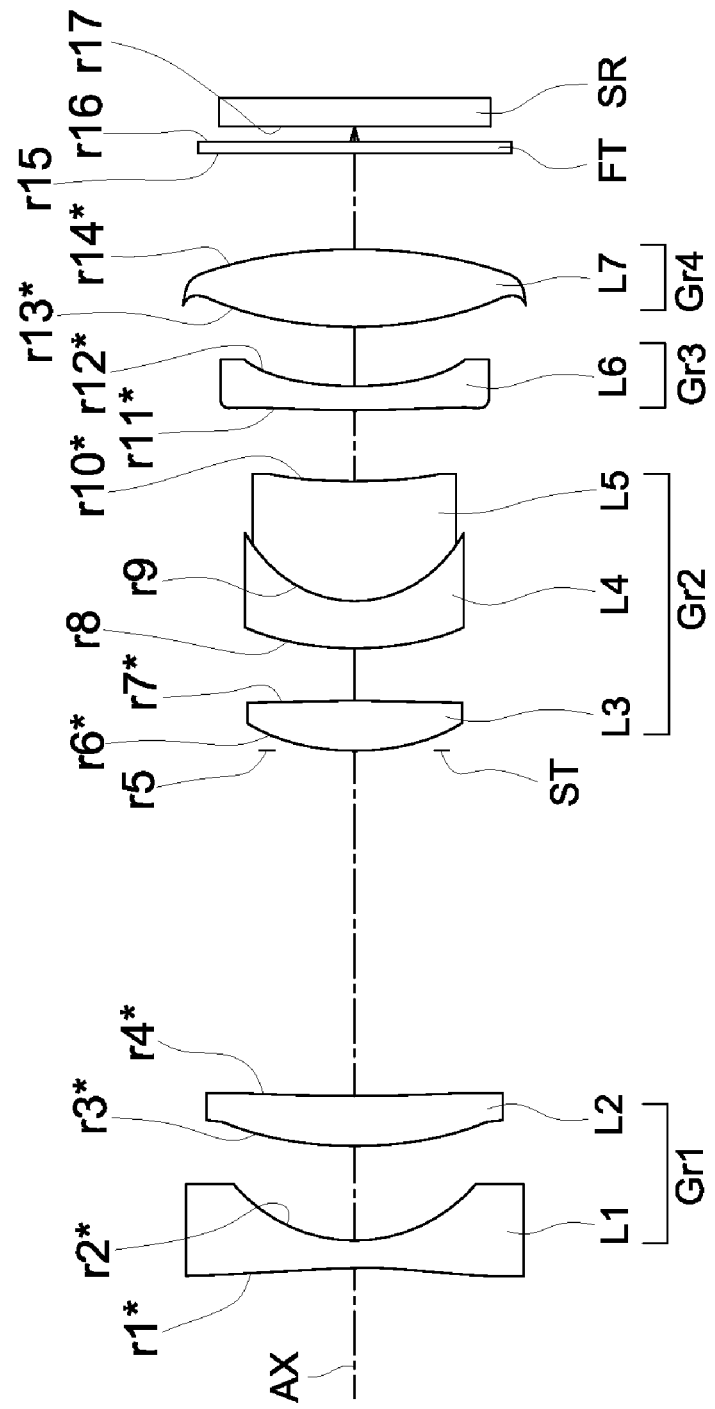
FIG. 7 is a cross sectional view showing the optical path at the wide-angle end of the variable-power optical system relating to Example 4.

FIG. 7 is a cross sectional view traversing the optical axis (AX), representing the arrangement of the lens group in the variable-power optical system 1D of Example 4. The variable-power optical system 1D of Example 4 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a cemented lens formed of a negative meniscus lens (L4) with a convex surface facing the object side and a positive meniscus lens (L5) with a convex surface facing the object side, in that order as viewed from the object side. The third lens group (Gr3) is composed of one negative meniscus lens (L6) with a convex surface facing the object side. The fourth lens group (Gr4) is composed of one biconvex positive lens (L7).

In the variable-power optical system 1D having the aforementioned lens configuration, at the time of varying the power from the wide-angle end (W) to the telephoto end (T), the second lens group (Gr2) linearly moves toward the object, and the third lens group (Gr3) makes a U-turn to form a convex shape projecting to the object side, as shown in FIG. 28b. In the meantime, the first lens group (Gr1) and the fourth lens group (Gr4) are statically positioned. The optical stop (ST) travels together with the second lens group (Gr2) at the time of varying the power.

Tables 8 and 9 show the construction data of each lens in the variable-power optical system 1D of Example 4. As shown in these Tables and FIG. 7, the first, second, third, sixth, and seventh lenses (L1, L2, L3, L6, and L7) are designed as bi-aspheric lenses and the fifth lens (L5) is designed as a lens with one aspheric surface. The sixth and seventh lenses (L6 and L7) are resin lenses and other lenses are glass lenses.

TABLE 8

| Lens surface | Curvature radius (mm) | On-axis distance between surfaces (mm) | | | Refractive index | Abbe number |
|---|---|---|---|---|---|---|
| | | W | M | T | | |
| r1* | −43.618 | | | | | |
| | | 0.800 | | | 1.68980 | 52.82 |
| r2* | 4.315 | | | | | |
| | | 2.682 | | | | |
| r3* | 12.244 | | | | | |
| | | 1.369 | | | 1.80542 | 26.13 |
| r4* | 53.152 | | | | | |
| | | 9.652 | 4.805 | 0.600 | | |
| r5 (Stop) | ∞ | | | | | |
| | | 0.000 | | | | |
| r6* | 6.297 | | | | | |
| | | 1.381 | | | 1.58913 | 61.24 |
| r7* | −267.084 | | | | | |
| | | 1.468 | | | | |
| r8 | 9.427 | | | | | |
| | | 1.346 | | | 1.80518 | 26.13 |
| r9 | 3.731 | | | | | |
| | | 3.351 | | | 1.58913 | |
| r10* | 26.013 | | | | | |
| | | 1.950 | 2.365 | 7.679 | | 55.72 |
| r11* | 27.258 | | | | | |
| | | 0.700 | | | 1.53048 | |
| r12* | 7.522 | | | | | |
| | | 1.659 | 6.090 | 4.981 | | 64.20 |
| r13* | 13.295 | | | | | |
| | | 2.185 | | | 1.53048 | |
| r14* | −13.673 | | | | | |
| | | 2.657 | | | | |
| r15 | ∞ | | | | | |
| | | 0.300 | | | 1.51680 | |
| r16 | ∞ | | | | | |
| | | 0.500 | | | | |
| r17 (Image plane) | ∞ | | | | | |

Example 5

Figure 8:
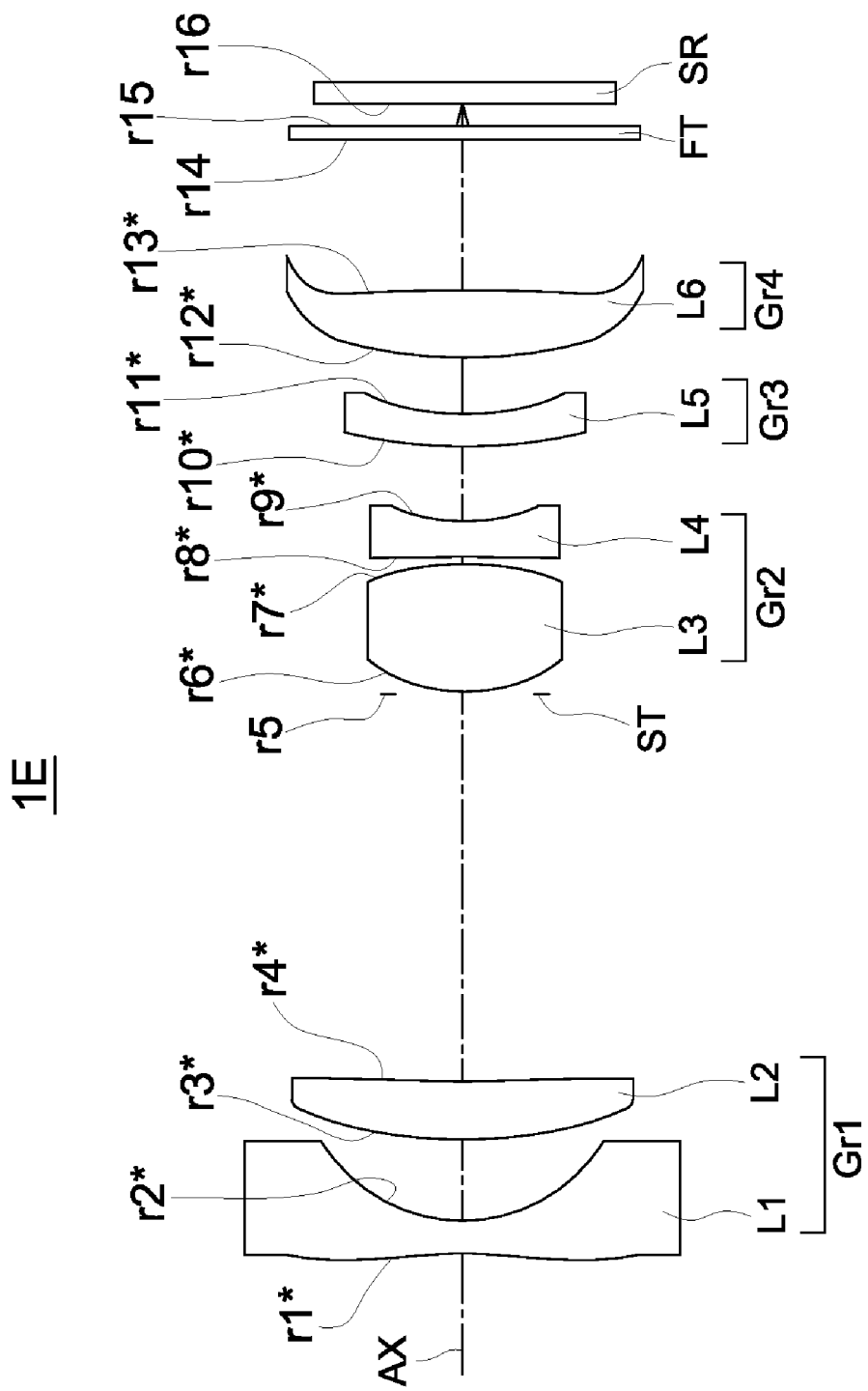
FIG. 8 is a cross sectional view showing the optical path at the wide-angle end of the variable-power optical system relating to Example 5.

FIG. 8 is a cross sectional view traversing the optical axis (AX), representing the arrangement of the lens group in the variable-power optical system 1E of Example 5. The variable-power optical system 1E of Example 5 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) in that order as viewed from the object side. The third lens group (Gr3) is composed of one negative meniscus lens (L5) with a convex surface facing the object side. The fourth lens group (Gr4) is composed of one biconvex positive lens (L6).

In the variable-power optical system 1E having the aforementioned lens configuration in Example 5, at the time of varying the power from the wide-angle end (W) to the telephoto end (T), the second lens group (Gr2) linearly moves toward the object, and the third lens group (Gr3) makes a U-turn to form a convex shape projecting to the object side, as shown in FIG. 28b. In the meantime, the first lens group (Gr1) and fourth lens group (Gr4) are statically positioned. The optical stop (ST) travels together with the second lens group (Gr2) at the time of varying the power.

Tables 10 and 11 show the construction data of each lens in the variable-power optical system 1E of Example 5. As shown in these Tables and FIG. 8, all the lenses (L1 through L6) are designed as bi-aspheric lenses in Example 5. The fifth and sixth lens (L5 and L6) are resin lenses and the other lenses are glass lenses.

TABLE 10

| Lens surface | Curvature radius (mm) | On-axis distance between surfaces (mm) | | | Refractive index | Abbe number |
|---|---|---|---|---|---|---|
| | | W | M | T | | |
| r1* | −14.038 | | | | | |
| | | 0.800 | | | 1.68980 | 52.82 |
| r2* | 5.182 | | | | | |
| | | 1.815 | | | | |

TABLE 9

| Lens surface | Conic constant | Aspheric surface coefficient | | | | | | |
|---|---|---|---|---|---|---|---|---|
| | | A | B | C | D | E | F | G |
| r1 | 0 | −1.60E−03 | 2.72E−04 | −1.59E−05 | 3.75E−07 | −2.30E−09 | −2.67E−11 | 0.00E+00 |
| r2 | 0 | −3.99E−04 | 3.29E−04 | −1.53E−05 | 2.60E−06 | −3.29E−07 | 1.01E−08 | 0.00E+00 |
| r3 | 0 | −6.89E−04 | −4.93E−05 | 1.51E−05 | 5.70E−08 | −7.46E−08 | 2.00E−09 | 0.00E+00 |
| r4 | 0 | −5.39E−04 | −2.85E−05 | 1.96E−06 | 2.05E−06 | −2.60E−07 | 1.15E−08 | −2.00E−10 |
| r6 | 0 | −6.78E−04 | 9.27E−06 | 6.51E−06 | −3.96E−06 | 6.03E−07 | −3.28E−08 | 0.00E+00 |
| r7 | 0 | −5.47E−04 | 8.69E−05 | −2.25E−05 | 2.27E−06 | −7.33E−08 | −3.80E−09 | 0.00E+00 |
| r10 | 0 | 1.56E−03 | 4.88E−05 | −1.94E−06 | 1.32E−07 | 0.00E+00 | 0.00E+00 | 0.00E+00 |
| r11 | 0 | −2.21E−03 | 6.28E−04 | −1.12E−04 | 1.30E−05 | −9.33E−07 | 2.75E−08 | 0.00E+00 |
| r12 | 0 | −2.25E−03 | 6.87E−04 | −1.16E−04 | 1.30E−05 | −8.86E−07 | 2.49E−08 | 0.00E+00 |
| r13 | −1 | 1.22E−03 | −2.97E−04 | 4.74E−05 | −4.03E−06 | 1.68E−07 | −2.70E−09 | 0.00E+00 |
| r14 | 0 | 2.92E−03 | −6.29E−04 | 8.75E−05 | −6.89E−06 | 2.72E−07 | −4.20E−09 | 0.00E+00 |

TABLE 10-continued

| Lens surface | Curvature radius (mm) | On-axis distance between surfaces (mm) W | M | T | Refractive index | Abbe number |
|---|---|---|---|---|---|---|
| r3* | 8.942 | | | | | |
| | | 1.283 | | | 1.80542 | 26.13 |
| r4* | 25.383 | | | | | |
| | | 8.756 | 4.411 | 0.845 | | |
| r5 (Stop) | ∞ | | | | | |
| | | 0.000 | | | | |
| r6* | 3.907 | | | | | |
| | | 3.000 | | | 1.58913 | 61.24 |
| r7* | −4.921 | | | | | |
| | | 0.117 | | | | |
| r8* | −28.362 | | | | | |
| | | 0.807 | | | 1.80542 | 26.13 |
| r9* | 5.704 | | | | | |
| | | 1.676 | 1.165 | 6.359 | | |
| r10* | 13.652 | | | | | |
| | | 0.750 | | | 1.53048 | 55.72 |
| r11* | 7.022 | | | | | |
| | | 1.270 | 6.126 | 4.498 | | |
| r12* | 13.805 | | | | | |
| | | 1.545 | | | 1.53048 | 55.72 |
| r13* | −29.891 | | | | | |
| | | 3.381 | | | | |
| r14 | ∞ | | | | | |
| | | 0.300 | | | 1.51680 | 64.20 |
| r15 | ∞ | | | | | |
| | | 0.500 | | | | |
| r16 (Image plane) | ∞ | | | | | |

TABLE 11

| Lens surface | Conic constant | Aspheric surface coefficient A | B | C | D | E | F | G |
|---|---|---|---|---|---|---|---|---|
| r1 | 0 | 1.57E−03 | 1.95E−04 | −1.93E−05 | 7.17E−07 | −9.70E−09 | −3.17E−11 | 0.00E+00 |
| r2 | 0 | −1.50E−03 | 5.81E−04 | −9.46E−06 | 2.13E−06 | −2.41E−07 | 3.60E−09 | 0.00E+00 |
| r3 | 0 | −2.83E−03 | 5.73E−05 | 3.97E−05 | −2.88E−06 | −6.76E−08 | 7.00E−09 | 0.00E+00 |
| r4 | 0 | −1.93E−03 | −5.78E−06 | 2.23E−05 | −5.71E−07 | −3.36E−07 | 3.02E−08 | −8.00E−10 |
| r6 | 0 | −1.44E−03 | −1.02E−04 | 7.38E−05 | −9.07E−05 | 4.11E−05 | −8.85E−06 | 7.42E−07 |
| r7 | 0 | 7.00E−03 | −2.87E−04 | −3.61E−04 | 2.00E−04 | −5.26E−05 | 8.08E−06 | −5.22E−07 |
| r8 | 0 | 4.88E−04 | 9.04E−04 | −2.83E−04 | 6.00E−05 | 3.37E−06 | −1.16E−06 | 0.00E+00 |
| r9 | 0 | −1.29E−04 | 1.57E−03 | −1.34E−04 | 3.28E−05 | 0.00E+00 | 0.00E+00 | 0.00E+00 |
| r10 | 0 | −2.28E−03 | 1.26E−03 | −2.46E−04 | 2.63E−05 | −1.52E−06 | 2.90E−08 | 0.00E+00 |
| r11 | 0 | −2.29E−03 | 1.16E−03 | −1.72E−04 | 1.19E−05 | −2.52E−07 | −1.45E−08 | 0.00E+00 |
| r12 | −1 | 3.05E−03 | −7.69E−04 | 9.55E−05 | −5.26E−06 | 1.48E−07 | −1.30E−09 | 0.00E+00 |
| r13 | 0 | 4.33E−03 | −1.04E−03 | 1.13E−04 | −5.71E−06 | 1.56E−07 | −1.00E−09 | 0.00E+00 |

Example 6

Figure 9:
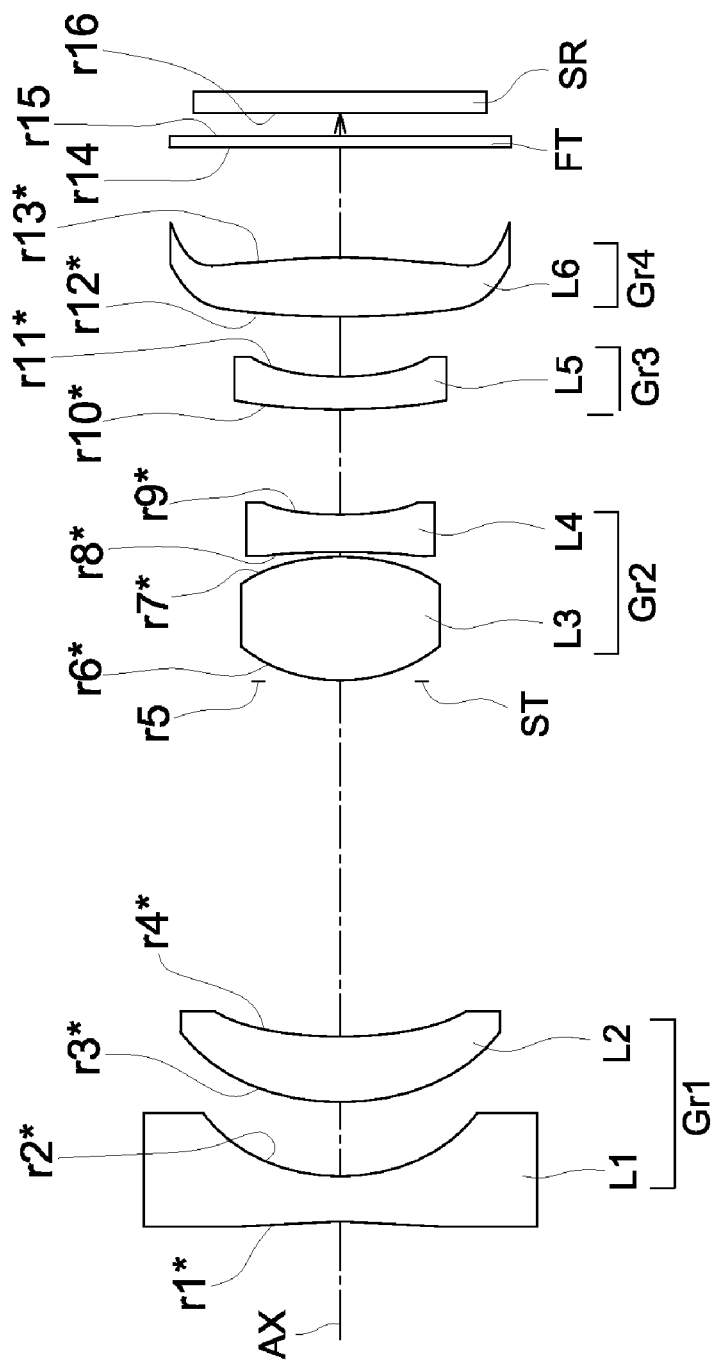
FIG. 9 is a cross sectional view showing the optical path at the wide-angle end of the variable-power optical system relating to Example 6.

FIG. 9 is a cross sectional view traversing the optical axis (AX), representing the arrangement of the lens group in the variable-power optical system 1F of Example 6. The variable-power optical system 1F of Example 6 includes a first lens group (Gr1) having a negative optical power as a whole, an optical stop (ST), a second lens group (Gr2) having a positive optical power as a whole, a third lens group (Gr3) having a negative optical power, and a fourth lens group (Gr4) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) in that order as viewed from the object side. The third lens group (Gr3) is composed of one negative meniscus lens (L5) with a convex surface facing the object side. The fourth lens group (Gr4) is composed of one biconvex positive lens (L6).

In the variable-power optical system 1F having the aforementioned lens configuration in Example 6, at the time of varying the power from the wide-angle end (W) to the telephoto end (T), the second lens group (Gr2) linearly moves toward the object, and the third lens group (Gr3) linearly moves toward the object in the manner of shifting the traveling speed at the intermediate point (M), as shown in FIG. 28a. In the meantime, the first lens group (Gr1) and fourth lens group (Gr4) are statically positioned. The optical stop (ST) travels together with the second lens group (Gr2) at the time of varying the power.

Tables 12 and 13 show the construction data of each lens in the variable-power optical system 1F of Example 6. As shown in these Tables and FIG. 9, all the lenses (L1 through L6) are designed as bi-aspheric lenses. The fifth and sixth lens (L5 and L6) are resin lenses and other lenses are glass lenses.

TABLE 12

| Lens surface | Curvature radius (mm) | On-axis distance between surfaces (mm) W | M | T | Refractive index | Abbe number |
|---|---|---|---|---|---|---|
| r1* | −29.689 | | | | | |
| | | 1.092 | | | 1.68980 | 52.82 |
| r2* | 4.633 | | | | | |
| | | 1.709 | | | | |
| r3* | 5.820 | | | | | |
| | | 1.565 | | | 1.80542 | 26.13 |
| r4* | 9.460 | | | | | |
| | | 8.320 | 4.371 | 0.977 | | |
| r5 (Stop) | ∞ | | | | | |
| | | 0.000 | | | | |

TABLE 12-continued

| Lens surface | Curvature radius (mm) | On-axis distance between surfaces (mm) W | M | T | Refractive index | Abbe number |
|---|---|---|---|---|---|---|
| r6* | 3.951 | | | | | |
| | | 2.970 | | | 1.58913 | 61.24 |
| r7* | −4.279 | | | | | |
| | | 0.100 | | | | |
| r8* | −15.078 | | | | | |
| | | 0.848 | | | 1.80542 | 26.13 |
| r9* | 7.215 | | | | | |
| | | 2.511 | 2.105 | 4.795 | | |
| r10* | 14.185 | | | | | |
| | | 0.750 | | | 1.53048 | 55.72 |
| r11* | 5.364 | | | | | |
| | | 1.371 | 5.726 | 6.430 | | |
| r12* | 39.646 | | | | | |
| | | 1.408 | | | 1.58340 | 30.23 |
| r13* | −14.946 | | | | | |
| | | 2.557 | | | | |
| r14 | ∞ | | | | | |
| | | 0.300 | | | 1.51680 | 64.20 |
| r15 | ∞ | | | | | |
| | | 0.500 | | | | |
| r16 (Image plane) | ∞ | | | | | |

TABLE 13

| Lens surface | Conic constant | Aspheric surface coefficient A | B | C | D | E | F | G |
|---|---|---|---|---|---|---|---|---|
| r1 | 0 | −2.98E−04 | 2.29E−04 | −1.96E−05 | 7.12E−07 | −7.70E−09 | −1.00E−10 | 0.00E+00 |
| r2 | 0 | −3.24E−03 | 6.17E−04 | −2.46E−05 | 2.56E−07 | −1.59E−07 | 8.30E−09 | 0.00E+00 |
| r3 | 0 | −2.34E−03 | 2.03E−04 | 1.56E−05 | −2.21E−06 | −3.67E−08 | 7.00E−09 | 0.00E+00 |
| r4 | 0 | −1.33E−03 | 1.35E−04 | 2.05E−05 | −2.39E−06 | −2.79E−07 | 4.47E−08 | −1.40E−09 |
| r6 | 0 | −1.48E−03 | −1.51E−04 | 5.79E−05 | −8.79E−05 | 4.12E−05 | −9.19E−06 | 7.56E−07 |
| r7 | 0 | 7.48E−03 | −6.61E−04 | −4.21E−04 | 2.08E−04 | −5.40E−05 | 7.51E−06 | −3.99E−07 |
| r8 | 0 | −5.20E−04 | 7.05E−04 | −3.13E−04 | 2.64E−05 | 4.22E−06 | −1.78E−07 | 0.00E+00 |
| r9 | 0 | −1.30E−03 | 1.72E−03 | −2.37E−04 | 2.97E−05 | 0.00E+00 | 0.00E+00 | 0.00E+00 |
| r10 | 0 | −4.73E−03 | 1.43E−03 | −2.78E−04 | 2.37E−05 | −3.75E−07 | −1.26E−08 | 0.00E+00 |
| r11 | 0 | −5.13E−03 | 1.50E−03 | −2.43E−04 | 1.37E−05 | 2.62E−07 | 1.02E−06 | 0.00E+00 |
| r12 | −1 | 3.10E−03 | −7.94E−04 | 1.03E−04 | −5.19E−05 | 9.77E−08 | 5.00E−10 | 0.00E+00 |
| r13 | 0 | 5.07E−03 | −1.22E−03 | 1.40E−04 | −6.84E−06 | 1.30E−07 | 1.30E−09 | 0.00E+00 |

Example 7

Figure 10:
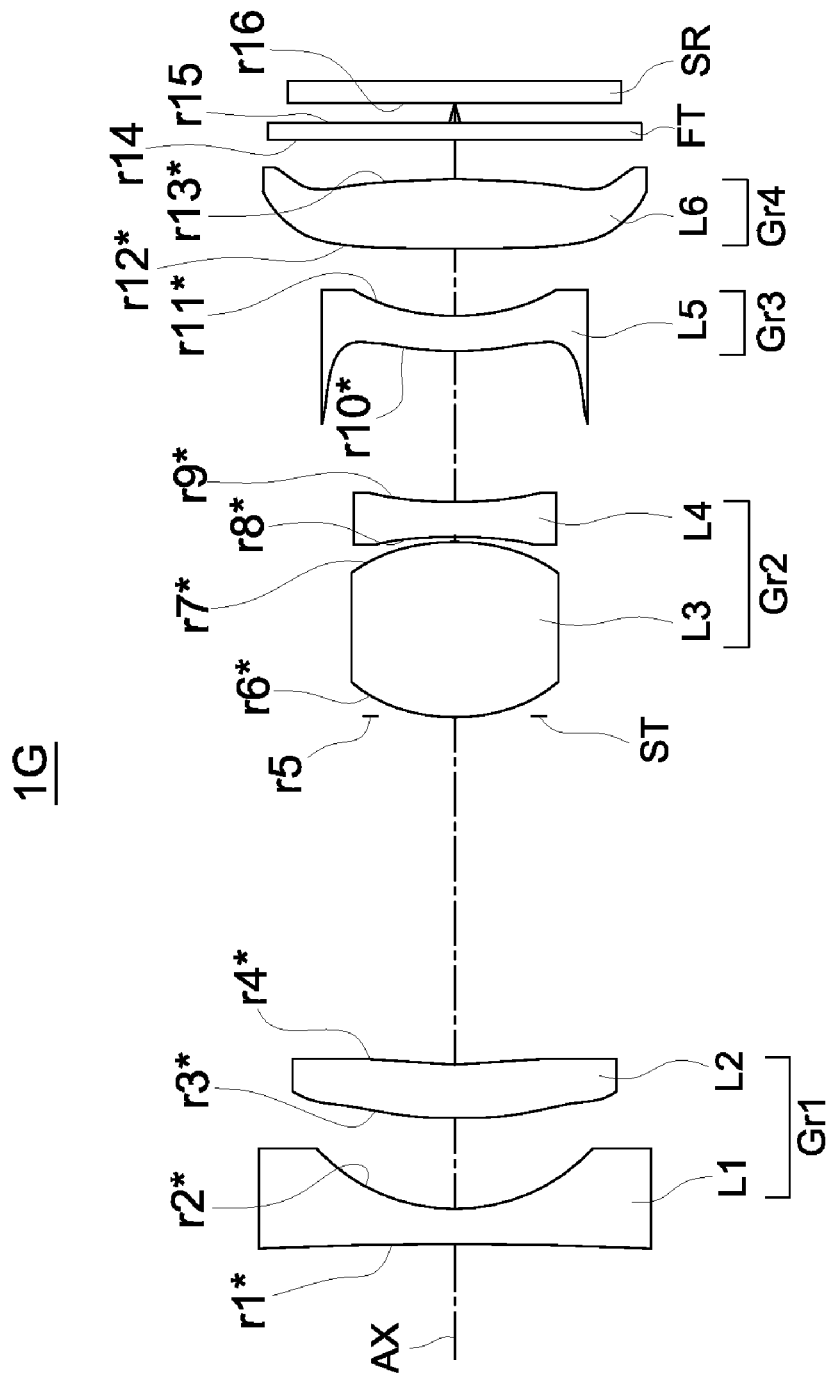
FIG. 10 is a cross sectional view showing the optical path at the wide-angle end of the variable-power optical system relating to Example 7.

FIG. 10 is a cross sectional view traversing the optical axis (AX), representing the arrangement of the lens group in the variable-power optical system 1G of Example 7. The variable-power optical system 1G of Example 7 includes a first lens group (Gr1) having the negative optical power as a whole, an optical stop (ST), a second lens group (Gr2) having the positive optical power as a whole, a third lens group (Gr3) having the negative optical power, and a fourth lens group (Gr4) having the positive optical power, arranged in that order as viewed from the object side. To put it in more detail, the first lens group (Gr1) is composed of a negative meniscus lens (L1) with a convex surface facing the object side, and a positive meniscus lens (L2) with a convex surface facing the object side, arranged in that order as viewed from the object side. The second lens group (Gr2) is composed of a biconvex positive lens (L3), and a biconcave negative lens (L4), arranged in that order as viewed from the object side. The third lens group (Gr3) is composed of one negative meniscus lens (L5) with a convex surface facing the object side. The fourth lens group (Gr4) is composed of one biconvex positive lens (L6).

In the variable-power optical system 1G with the above lens configuration in Example 7, at the time of zooming from the wide-angle end (W) to the telephoto end (T), as shown in FIG. 28a, the second lens group (Gr2) linearly moves toward the object, and the third lens group (Gr3) linearly moves toward the object in the manner of shifting the traveling speed at the intermediate point (M). In the meantime, the first lens group (Gr1) and fourth lens group (Gr4) are statically positioned. The optical stop (ST) travels together with the second lens group (Gr2) at the time of varying the power.

Tables 14 and 15 show the construction data of each lens in the variable-power optical system 1G of Example 7. As shown in these Tables and FIG. 10, all the lenses (L1 through L6) are designed as bi-aspheric surface lenses in this Example 7. The fifth and sixth lenses (L5 and L6) are resin lenses, and the other lenses are glass lenses.

TABLE 14

| Lens surface | Curvature radius (mm) | On-axis distance between surfaces (mm) W | M | T | Refractive index | Abbe number |
|---|---|---|---|---|---|---|
| r1* | 101.879 | | | | | |
| | | 0.800 | | | 1.68980 | 52.82 |

TABLE 14-continued

| Lens surface | Curvature radius (mm) | On-axis distance between surfaces (mm) W | M | T | Refractive index | Abbe number |
|---|---|---|---|---|---|---|
| r2* | 4.116 | | | | | |
| | | 2.066 | | | | |
| r3* | 9.350 | | | | | |
| | | 1.237 | | | 1.80542 | 26.13 |
| r4* | 20.416 | | | | | |
| | | 7.950 | 4.158 | 0.600 | | |
| r5 (Stop) | ∞ | | | | | |
| | | 0.000 | | | | |
| r6* | 4.532 | | | | | |
| | | 3.981 | | | 1.58913 | 61.24 |
| r7* | −4.199 | | | | | |
| | | 0.100 | | | | |
| r8* | −14.560 | | | | | |
| | | 0.800 | | | 1.80542 | 26.13 |
| r9* | 9.315 | | | | | |
| | | 3.479 | 1.789 | 3.664 | | |
| r10* | 8.579 | | | | | |
| | | 0.763 | | | 1.53048 | 55.72 |

TABLE 14-continued

| Lens surface | Curvature radius (mm) | On-axis distance between surfaces (mm) | | | Refractive index | Abbe number |
|---|---|---|---|---|---|---|
| | | W | M | T | | |
| r11* | 4.481 | | | | | |
| | | 1.522 | 7.005 | 8.687 | | |
| r12* | 84.475 | | | | | |
| | | 1.608 | | | 1.58340 | 30.23 |
| r13* | −11.206 | | | | | |
| | | 0.894 | | | | |
| r14 | ∞ | | | | | |
| | | 0.300 | | | 1.51680 | 64.20 |
| r15 | ∞ | | | | | |
| | | 0.500 | | | | |
| r16 (Image plane) | ∞ | | | | | |

TABLE 15

| Lens surface | Conic constant | Aspheric surface coefficient | | | | | | |
|---|---|---|---|---|---|---|---|---|
| | | A | B | C | D | E | F | G |
| r1 | 0 | −2.06E−03 | 2.59E−04 | −1.82E−05 | 6.73E−07 | −1.14E−08 | 3.45E−11 | 0.00E+00 |
| r2 | 0 | −4.31E−03 | 4.35E−04 | −2.98E−05 | 6.83E−07 | −1.05E−07 | 4.70E−09 | 0.00E+00 |
| r3 | 0 | −1.69E−03 | 1.37E−04 | 1.09E−05 | −2.35E−06 | −4.34E−08 | 8.20E−09 | 0.00E+00 |
| r4 | 0 | −1.56E−03 | 8.75E−05 | 1.61E−05 | −2.44E−06 | −2.71E−07 | 4.47E−08 | −1.50E−09 |
| r6 | 0 | −1.41E−03 | −1.10E−05 | 5.58E−05 | −9.31E−05 | 4.25E−05 | −8.80E−06 | 6.90E−07 |
| r7 | 0 | 6.68E−03 | −6.03E−04 | −4.34E−04 | 2.23E−04 | −5.41E−05 | 7.19E−06 | −3.86E−07 |
| r8 | 0 | −8.47E−04 | 3.45E−04 | −3.01E−04 | 2.86E−05 | 6.63E−06 | −6.31E−07 | 0.00E+00 |
| r9 | 0 | −2.10E−03 | 1.22E−03 | −2.91E−04 | 3.32E−05 | 0.00E+00 | 0.00E+00 | 0.00E+00 |
| r10 | 0 | −5.01E−03 | 9.40E−04 | −2.91E−04 | 2.50E−05 | 7.01E−07 | −2.56E−07 | 0.00E+00 |
| r11 | 0 | −5.56E−03 | 8.01E−04 | −2.10E−04 | 1.81E−05 | −5.33E−07 | −2.36E−08 | 0.00E+00 |
| r12 | −1 | 3.04E−03 | −8.39E−04 | 1.05E−04 | −5.05E−06 | 9.16E−08 | −3.12E−11 | 0.00E+00 |
| r13 | 0 | 9.37E−03 | −1.93E−03 | 1.82E−04 | −7.37E−06 | 1.57E−07 | −2.00E−09 | 0.00E+00 |

Example 8

Figure 11:
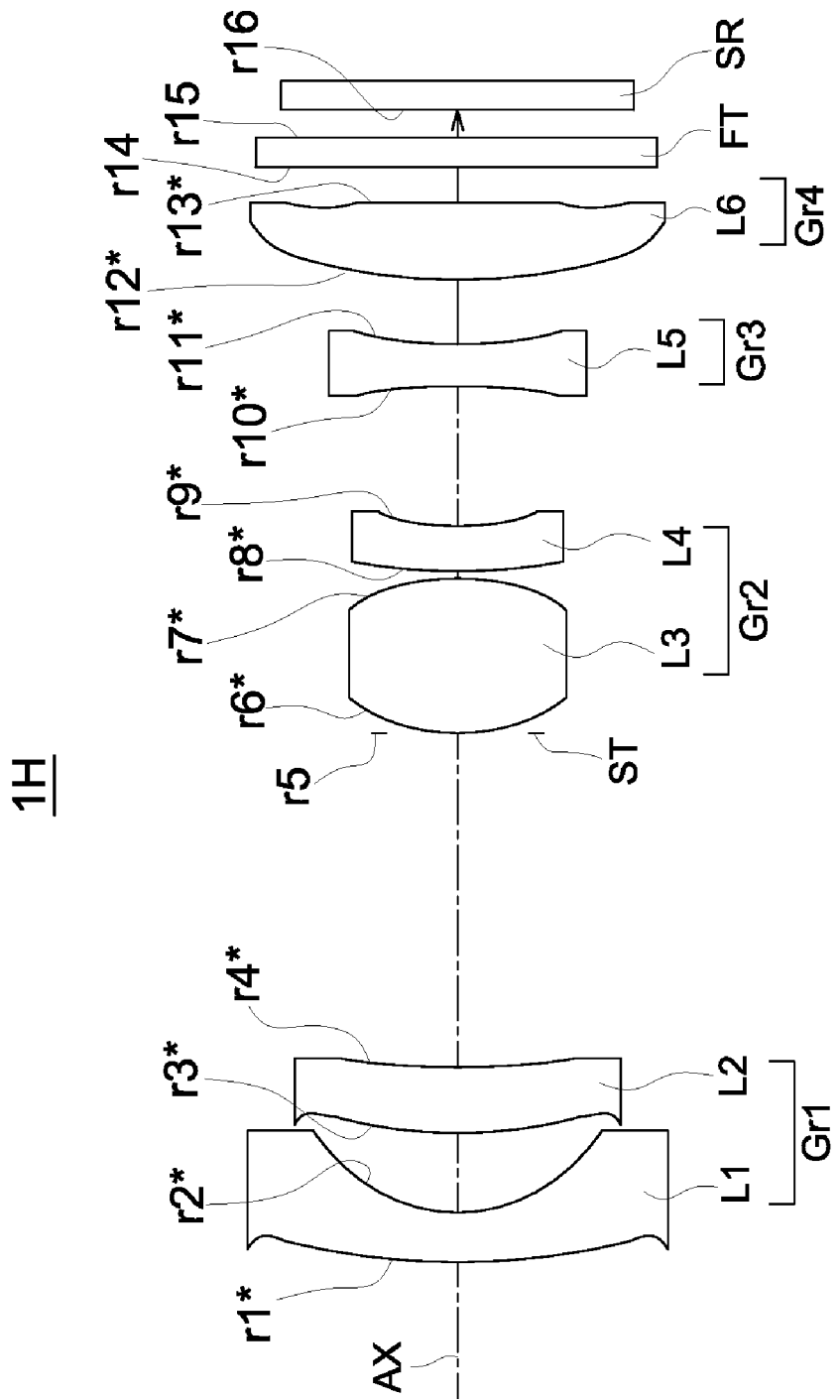
FIG. 11 is a cross sectional view showing the optical path at the wide-angle end of the variable-power optical system relating to Example 8.

FIG. 11 is a cross sectional view traversing the optical axis (AX), representing the arrangement of the lens group in the variable-power optical system 1H of Example 8. The variable-power optical system 1H of Example 8 includes a first lens group (Gr1) having the negative optical power as a whole, an optical stop (ST), a second lens group (Gr2) having the positive optical power as a whole, a third lens group (Gr3) having the negative optical power, and a fourth lens group (Gr4) having the positive optical power, arranged in that order as viewed from the object side. To put it in more detail, the first lens group (Gr1) is composed of a negative meniscus lens (L1) with a convex surface facing the object side, and a positive meniscus lens (L2) with a convex surface facing the object side, arranged in that order as viewed from the object side. The second lens group (Gr2) is composed of a biconvex positive lens (L3), and a negative meniscus lens (L4) with a convex surface facing the object side, arranged in that order as viewed from the object side. The third lens group (Gr3) is composed of one biconcave negative lens (L5). The fourth lens group (Gr4) is composed of one positive meniscus lens (L6) with a convex surface facing the object side.

In the variable-power optical system 1H with the above lens configuration in Example 8, at the time of zooming from the wide-angle end (W) to the telephoto end (T), as shown in FIG. 28*a*, the second lens group (Gr2) linearly moves toward the object, and the third lens group (Gr3) linearly moves toward the object in the manner of shifting the traveling speed at the intermediate point (M). In the meantime, the first lens group (Gr1) and fourth lens group (Gr4) are statically positioned. The optical stop (ST) travels together with the second lens group (Gr2) at the time of varying the power.

Tables 16 and 17 show the construction data of each lens in the variable-power optical system 1H of Example 8. As shown in these Tables and FIG. 11, all the lenses (L1 through L6) are designed as bi-aspheric surface lenses in this Example 8. Further, all the lenses (L1 through L6) are glass lenses.

TABLE 16

| Lens surface | Curvature radius (mm) | On-axis distance between surfaces (mm) | | | Refractive index | Abbe number |
|---|---|---|---|---|---|---|
| | | W | M | T | | |
| r1* | 18.649 | | | | | |
| | | 1.024 | | | 1.75359 | 51.61 |
| r2* | 3.581 | | | | | |
| | | 1.729 | | | | |

TABLE 16-continued

| Lens surface | Curvature radius (mm) | On-axis distance between surfaces (mm) | | | Refractive index | Abbe number |
|---|---|---|---|---|---|---|
| | | W | M | T | | |
| r3* | 10.113 | | | | | |
| | | 1.429 | | | 2.00170 | 20.60 |
| r4* | 16.095 | | | | | |
| | | 7.260 | 3.811 | 0.768 | | |
| r5 (Stop) | ∞ | | | | | |
| | | 0.000 | | | | |
| r6* | 4.205 | | | | | |
| | | 3.383 | | | 1.49700 | 81.51 |
| r7* | −4.760 | | | | | |
| | | 0.128 | | | | |
| r8* | 13.084 | | | | | |
| | | 1.024 | | | 1.88746 | 21.57 |
| r9* | 6.147 | | | | | |
| | | 2.999 | 2.723 | 5.250 | | |
| r10* | −15.751 | | | | | |
| | | 0.930 | | | 1.49739 | 81.17 |
| r11* | 12.256 | | | | | |
| | | 1.408 | 5.134 | 5.650 | | |
| r12* | 14.467 | | | | | |
| | | 1.593 | | | 1.83300 | 37.30 |
| r13* | 129.709 | | | | | |
| | | 0.773 | | | | |
| r14 | ∞ | | | | | |
| | | 0.640 | | | 1.51680 | 64.20 |

TABLE 16-continued

| Lens surface | Curvature radius (mm) | On-axis distance between surfaces (mm) | | | Refractive index | Abbe number |
|---|---|---|---|---|---|---|
| | | W | M | T | | |
| r15 | ∞ | | | | | |
| | | 0.640 | | | | |
| r16 (Image plane) | ∞ | | | | | |

TABLE 17

| Lens surface | Conic constant | Aspheric surface coefficient | | | | | | |
|---|---|---|---|---|---|---|---|---|
| | | A | B | C | D | E | F | G |
| r1 | 0 | −6.69E−04 | 2.13E−04 | −2.06E−05 | 7.63E−07 | −5.50E−09 | −2.00E−10 | 0.00E+00 |
| r2 | 0 | −2.34E−03 | 5.89E−04 | −3.30E−05 | −3.99E−07 | −1.65E−07 | −3.60E−09 | 0.00E+00 |
| r3 | 0 | −1.41E−03 | 2.24E−04 | 1.17E−06 | −1.34E−06 | −5.79E−08 | 2.50E−09 | 0.00E+00 |
| r4 | 0 | −1.82E−03 | 1.19E−04 | 1.34E−06 | −3.19E−06 | −2.14E−07 | 5.34E−08 | −2.30E−09 |
| r6 | 0 | −2.10E−03 | −9.20E−05 | 4.34E−05 | −7.29E−05 | 3.63E−05 | −8.61E−06 | 8.00E−07 |
| r7 | 0 | 4.30E−03 | −2.68E−04 | −4.23E−04 | 2.03E−04 | −5.25E−05 | 7.70E−06 | −4.49E−07 |
| r8 | 0 | −1.09E−03 | 2.87E−04 | −1.64E−04 | 3.25E−06 | 4.86E−06 | −2.74E−07 | 0.00E+00 |
| r9 | 0 | −2.10E−03 | 1.16E−03 | −2.63E−04 | 2.57E−05 | 0.00E+00 | 0.00E+00 | 0.00E+00 |
| r10 | 0 | −5.02E−03 | 2.08E−03 | −3.83E−04 | 2.49E−05 | 2.21E−06 | −3.10E−07 | 0.00E+00 |
| r11 | 0 | −4.12E−03 | 1.82E−03 | −2.45E−04 | 5.53E−06 | 2.10E−06 | −1.39E−07 | 0.00E+00 |
| r12 | −1 | 2.80E−03 | −1.04E−03 | 1.14E−04 | −5.28E−06 | 1.07E−07 | −7.00E−10 | 0.00E+00 |
| r13 | 0 | 5.85E−03 | −1.67E−03 | 1.38E−04 | −3.60E−06 | −1.82E−08 | 1.30E−09 | 0.00E+00 |

Example 9

Figure 12:
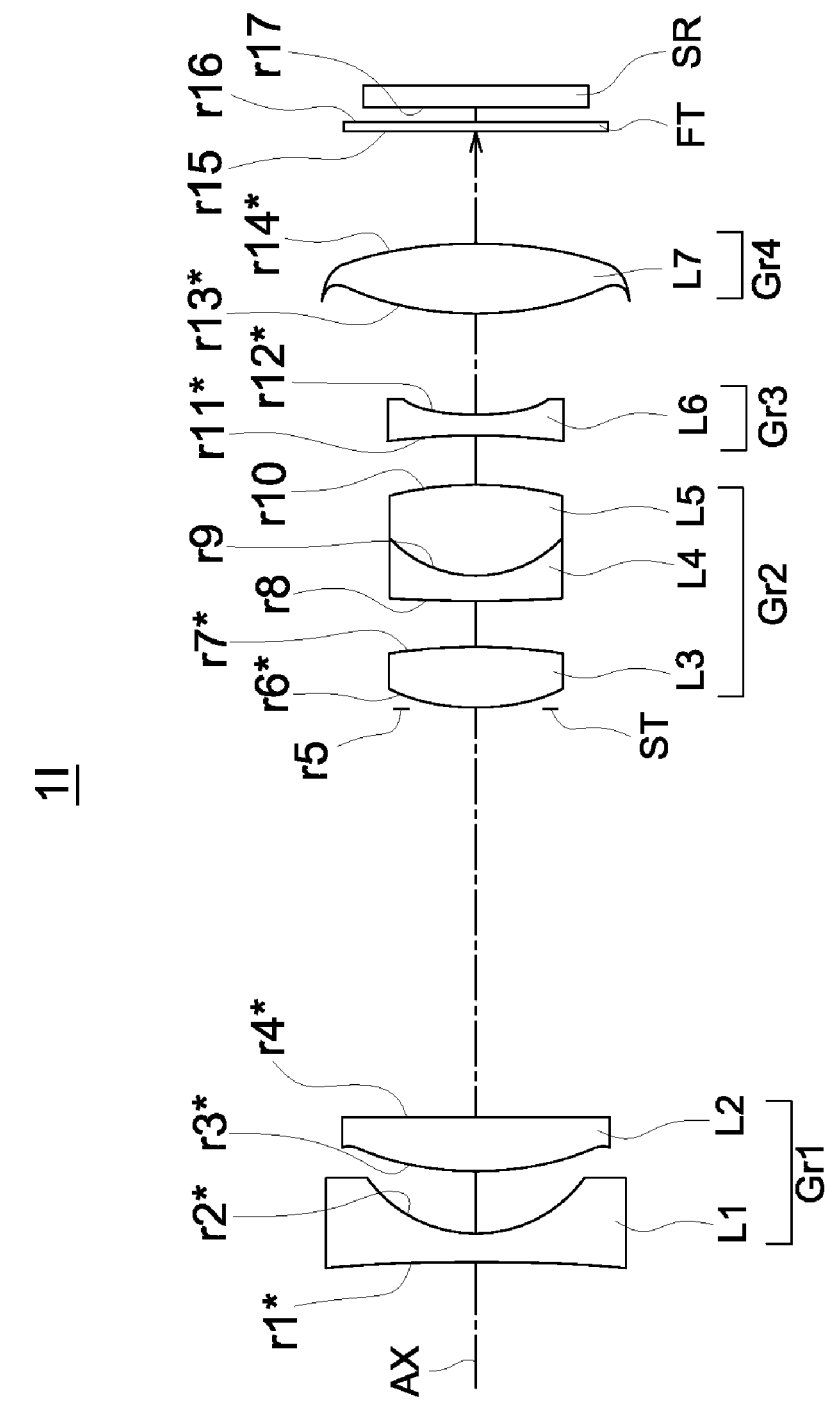
FIG. 12 is a cross sectional view showing the optical path at the wide-angle end of the variable-power optical system relating to Example 9.

FIG. 12 is a cross sectional view traversing the optical axis (AX), representing the arrangement of the lens group in the variable-power optical system 1I of Example 9. The variable-power optical system 1I of Example 9 includes a first lens group (Gr1) having the negative optical power as a whole, an optical stop (ST), a second lens group (Gr2) having the positive optical power as a whole, a third lens group (Gr3) having the negative optical power, and a fourth lens group (Gr4) having the positive optical power, arranged in that order as viewed from the object side. To put it in more detail, the first lens group (Gr1) is composed of a biconcave negative lens (L1), and a positive meniscus lens (L2) with a convex surface facing the object side, arranged in that order as viewed from the object side. The second lens group (Gr2) is composed of a biconvex positive lens (L3), and a cemented lens formed of a negative meniscus lens (L4) with a convex surface facing the object side and a biconvex positive lens (L5), arranged in that order as viewed from the object side. The third lens group (Gr3) is composed of one biconcave negative lens (L6). The fourth lens group (Gr4) is composed of one biconvex positive lens (L7).

In the variable-power optical system 1I with the above lens configuration in Example 9, at the time of zooming from the wide-angle end (W) to the telephoto end (T), as shown in FIG. 28a, the second lens group (Gr2) linearly moves toward the object, and the third lens group (Gr3) linearly moves toward the object in the manner of shifting the traveling speed at the intermediate point (M). In the meantime, the first lens group (Gr1) and fourth lens group (Gr4) are statically positioned. The optical stop (ST) travels together with the second lens group (Gr2) at the time of varying the power.

Tables 18 and 19 show the construction data of each lens in the variable-power optical system 1I of Example 9. As shown in these Tables and FIG. 12, in the Example 9, the first, second, third, sixth and seventh lenses (L1, L2, L3, L6 and L7) are designed as bi-aspheric surface lenses. The sixth and seventh lenses (L6 and L7) are resin lenses, and other lenses are glass lenses.

TABLE 18

| Lens surface | Curvature radius (mm) | On-axis distance between surfaces (mm) | | | Refractive index | Abbe number |
|---|---|---|---|---|---|---|
| | | W | M | T | | |
| r1* | −250.876 | | | | | |
| | | 0.917 | | | 1.68980 | 52.82 |
| r2* | 3.951 | | | | | |
| | | 2.057 | | | | |
| r3* | 12.458 | | | | | |
| | | 1.642 | | | 1.80542 | 26.13 |
| r4* | 74.980 | | | | | |
| | | 13.623 | 4.513 | 0.600 | | |
| r5 (Stop) | ∞ | | | | | |
| | | 0.000 | | | | |
| r6* | 6.610 | | | | | |
| | | 2.055 | | | 1.58913 | 61.24 |
| r7* | −16.539 | | | | | |
| | | 1.495 | | | | |
| r8* | 56.937 | | | | | |
| | | 0.807 | | | 1.84799 | 34.24 |
| r9 | 3.823 | | | | | |
| | | 3.000 | | | 1.62535 | 57.36 |
| r10 | −12.556 | | | | | |
| | | 1.597 | 3.354 | 6.822 | | |
| r11* | −25.901 | | | | | |
| | | 0.737 | | | 1.53048 | 55.72 |
| r12* | 7.179 | | | | | |
| | | 3.337 | 10.690 | 11.135 | | |
| r13* | 15.335 | | | | | |
| | | 2.214 | | | 1.53048 | 55.72 |
| r14* | −13.364 | | | | | |
| | | 3.720 | | | | |
| r15 | ∞ | | | | | |
| | | 0.300 | | | 1.51680 | 64.20 |
| r16 | ∞ | | | | | |
| | | 0.500 | | | | |
| r17 (Image plane) | ∞ | | | | | |

TABLE 19

| Lens surface | Conic constant | Aspheric surface coefficient | | | | | | |
|---|---|---|---|---|---|---|---|---|
| | | A | B | C | D | E | F | G |
| r1 | −1 | −1.95E−03 | 2.34E−04 | −1.27E−05 | 3.78E−07 | −8.20E−09 | 1.00E−10 | 0.00E+00 |
| r2 | −1 | −2.58E−03 | 3.30E−04 | −2.17E−05 | 3.19E−06 | −2.70E−07 | 7.00E−09 | 0.00E+00 |
| r3 | −1 | −5.93E−04 | −7.87E−06 | 3.46E−06 | 1.25E−07 | −1.50E−09 | −4.00E−10 | 0.00E+00 |
| r4 | 0 | −5.94E−04 | 2.41E−05 | −1.10E−05 | 2.36E−06 | −2.23E−07 | 1.13E−08 | −2.00E−10 |
| r6 | 0 | −6.53E−04 | 1.14E−05 | 4.67E−06 | −3.95E−06 | 6.35E−07 | −3.51E−08 | 0.00E+00 |
| r7 | 0 | −5.10E−05 | 5.98E−05 | −2.10E−05 | 2.36E−06 | −1.17E−07 | −9.00E−10 | 0.00E+00 |
| r11 | 0 | −1.36E−03 | 3.80E−04 | −1.15E−04 | 1.96E−05 | −1.34E−06 | 1.35E−08 | 0.00E+00 |
| r12 | 0 | −8.51E−04 | 3.14E−04 | −8.48E−05 | 1.18E−05 | −4.61E−07 | −2.22E−08 | 0.00E+00 |
| r13 | 0 | 9.85E−04 | −3.50E−04 | 5.62E−05 | −4.24E−06 | 1.55E−07 | −2.20E−09 | 0.00E+00 |
| r14 | 0 | 1.85E−03 | −5.71E−04 | 8.76E−06 | −6.46E−06 | 2.32E−07 | −3.30E−09 | 0.00E+00 |

Example 10

Figure 13:
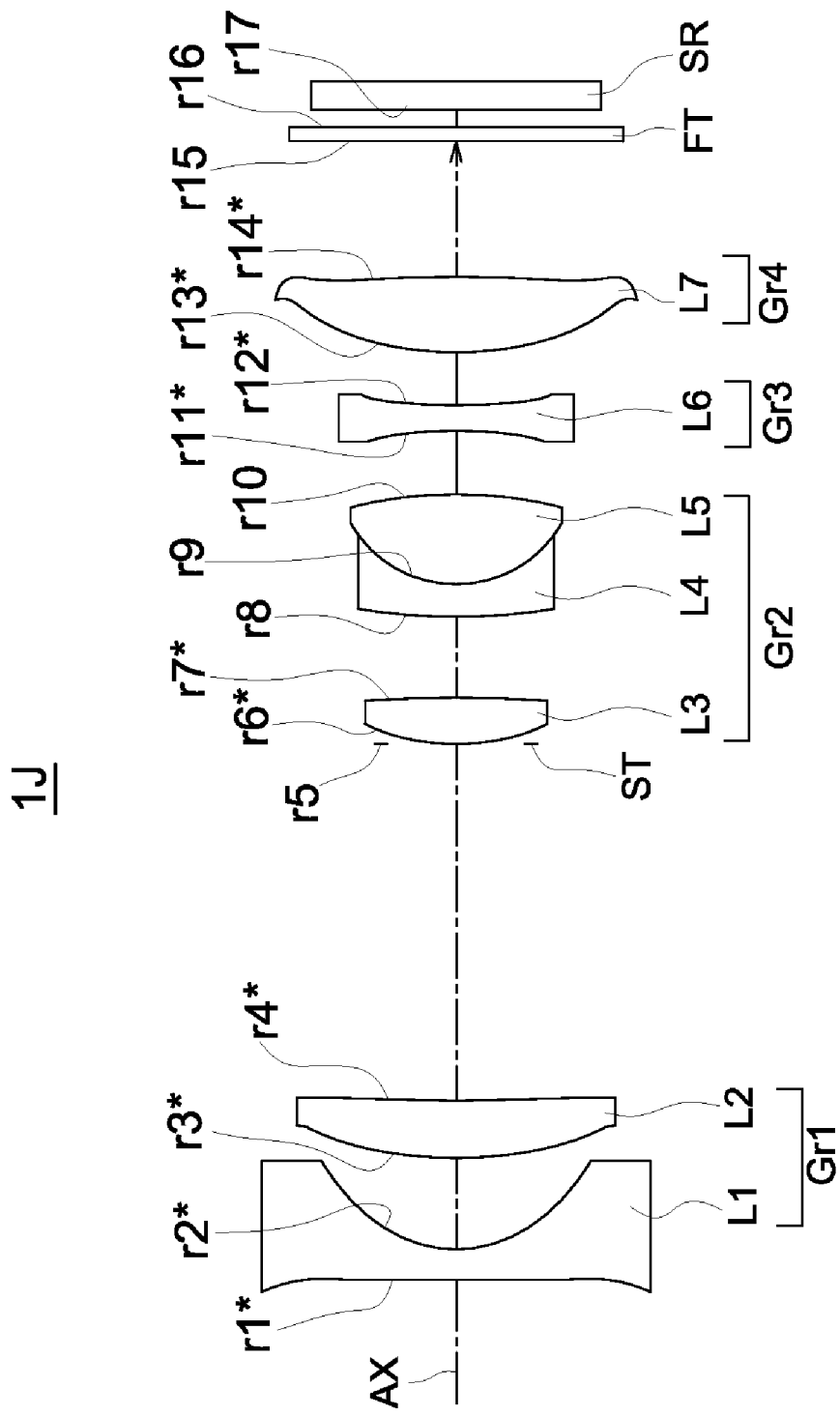
FIG. 13 is a cross sectional view showing the optical path at the wide-angle end of the variable-power optical system relating to Example 10.

FIG. 13 is a cross sectional view traversing the optical axis (AX), representing the arrangement of the lens group in the variable-power optical system 1J of Example 10. The variable-power optical system 1J of Example 10 includes a first lens group (Gr1) having the negative optical power as a whole, an optical stop (ST), a second lens group (Gr2) having the positive optical power as a whole, a third lens group (Gr3) having the negative optical power, and a fourth lens group (Gr4) having the positive optical power, arranged in that order as viewed from the object side. To put it in more detail, the first lens group (Gr1) is composed of a negative meniscus lens (L1) with a convex surface facing the object side, and a positive meniscus lens (L2) with a convex surface facing the object side, arranged in that order as viewed from the object side. The second lens group (Gr2) is composed of a biconvex positive lens (L3), and a cemented lens formed of a negative meniscus lens (L4) with a convex surface facing the object side and a biconvex positive lens (L5), arranged in that order as viewed from the object side. The third lens group (Gr3) is composed of one biconcave negative lens (L6). The fourth lens group (Gr4) is composed of one biconvex positive lens (L7).

In the variable-power optical system 1J with the above lens configuration in Example 10, at the time of zooming from the wide-angle end (W) to the telephoto end (T), as shown in FIG. 28a, the second lens group (Gr2) linearly moves toward the object, and the third lens group (Gr3) linearly moves toward the object in the manner of shifting the traveling speed at the intermediate point (M). In the meantime, the first lens group (Gr1) and fourth lens group (Gr4) are statically positioned. The optical stop (ST) travels together with the second lens group (Gr2) at the time of varying the power.

Tables 20 and 21 show the construction data of each lens in the variable-power optical system 1J of Example 10. As shown in these Tables and FIG. 13, in the Example 10, the first, second, third, sixth and seventh lenses (L1, L2, L3, L6 and L7) are designed as bi-aspherical surface lenses. The sixth and seventh lenses (L6 and L7) are resin lenses, and other lenses are glass lenses.

TABLE 20

| Lens surface | Curvature radius (mm) | On-axis distance between surfaces (mm) | | | Refractive index | Abbe umber |
|---|---|---|---|---|---|---|
| | | W | M | T | | |
| r1* | 47.745 | | | | | |
| | | 0.800 | | | 1.68980 | 52.82 |
| r2* | 3.116 | | | | | |
| | | 2.261 | | | | |
| r3* | 13.858 | | | | | |
| | | 1.516 | | | 1.80542 | 26.13 |
| r4* | 407.153 | | | | | |
| | | 9.161 | 4.445 | 0.600 | | |
| r5 | ∞ | | | | | |
| (Stop) | | | | | | |
| | | 0.000 | | | | |
| r6* | 5.878 | | | | | |
| | | 1.223 | | | 1.58913 | 61.24 |
| r7* | −24.608 | | | | | |
| | | 2.056 | | | | |
| r8 | 24.832 | | | | | |
| | | 0.800 | | | 1.84881 | 32.24 |
| r9 | 3.402 | | | | | |
| | | 2.293 | | | 1.61365 | 58.09 |
| r10 | −10.906 | | | | | |
| | | 1.600 | 2.228 | 5.294 | | |
| r11* | −10.254 | | | | | |
| | | 0.700 | | | 1.53048 | 55.72 |
| r12* | 24.138 | | | | | |
| | | 1.379 | 5.467 | 6.246 | | |
| r13* | 10.894 | | | | | |
| | | 1.921 | | | 1.53048 | 55.72 |
| r14* | −21.542 | | | | | |
| | | 3.489 | | | | |
| r15 | ∞ | | | | | |
| | | 0.300 | | | 1.51680 | 64.20 |
| r16 | ∞ | | | | | |
| | | 0.500 | | | | |
| r17 | ∞ | | | | | |
| (Image plane) | | | | | | |

TABLE 21

| Lens surface | Conic constant | Aspheric surface coefficient | | | | | | |
|---|---|---|---|---|---|---|---|---|
| | | A | B | C | D | E | F | G |
| r1 | −1 | −1.94E−03 | 2.08E−04 | −1.27E−05 | 4.14E−07 | −7.60E−09 | 1.00E−10 | 0.00E+00 |
| r2 | −1 | −2.00E−03 | 3.05E−04 | −1.94E−05 | 2.83E−06 | −2.82E−07 | 7.80E−09 | 0.00E+00 |
| r3 | −1 | −3.26E−04 | 1.82E−05 | 2.52E−06 | 2.20E−07 | −6.00E−10 | −7.00E−10 | 0.00E+00 |
| r4 | 0 | −5.37E−04 | 3.17E−05 | −9.46E−06 | 2.33E−06 | −2.23E−07 | 1.13E−08 | −2.00E−10 |
| r6 | 0 | −8.31E−04 | 5.23E−05 | −8.38E−06 | −3.83E−06 | 9.01E−08 | −7.67E−08 | 0.00E+00 |
| r7 | 0 | −1.46E−04 | 8.72E−05 | −2.61E−05 | 1.41E−06 | −6.00E−10 | −1.00E−08 | 0.00E+00 |
| r11 | 0 | 5.28E−04 | 5.20E−04 | −1.29E−04 | 1.41E−05 | −8.75E−07 | 3.68E−08 | 0.00E+00 |
| r12 | 0 | 1.32E−03 | 5.33E−04 | −1.22E−04 | 1.21E−05 | −6.01E−07 | 1.44E−08 | 0.00E+00 |
| r13 | 0 | 1.28E−03 | −3.15E−04 | 5.18E−05 | −4.04E−06 | 1.61E−07 | −2.60E−09 | 0.00E+00 |
| r14 | 0 | 2.60E−03 | −5.74E−04 | 8.39E−05 | −6.23E−06 | 2.40E−07 | −3.90E−09 | 0.00E+00 |

Example 11

Figure 14:
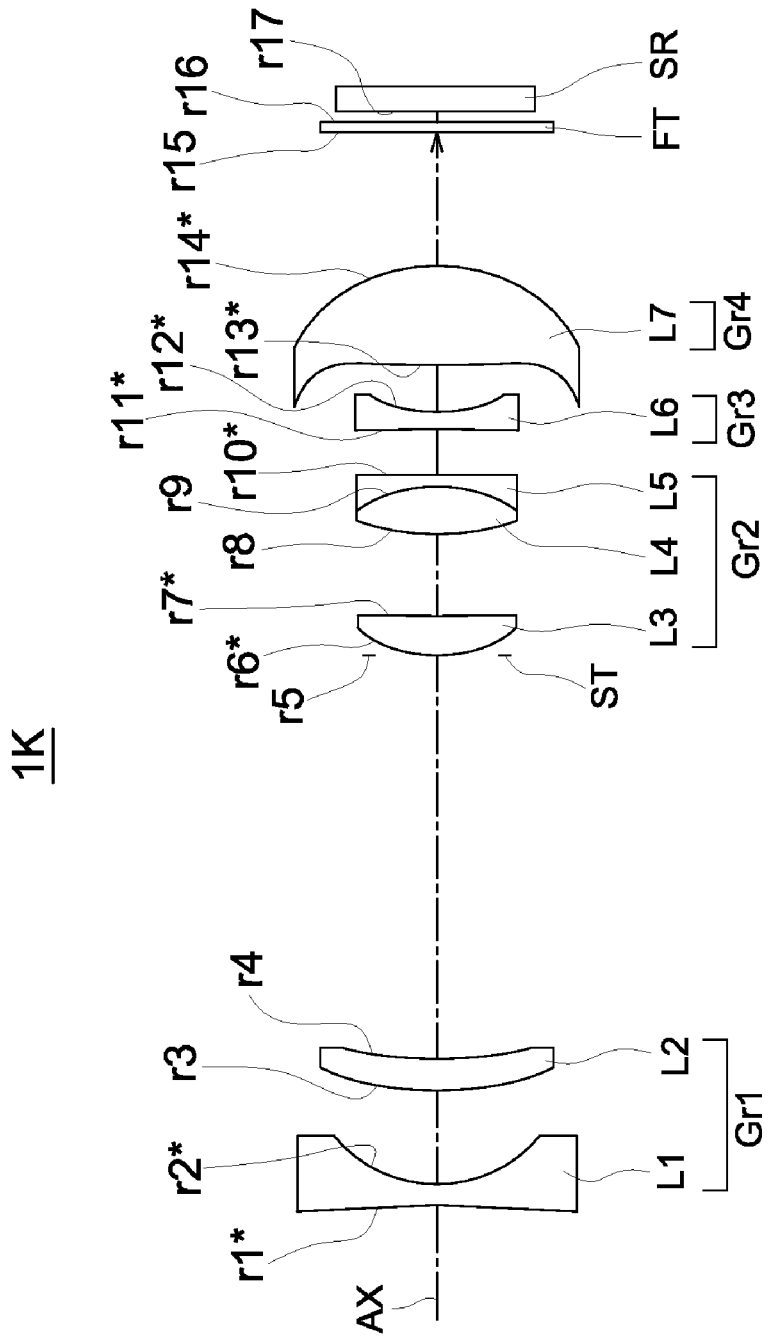
FIG. 14 is a cross sectional view showing the optical path at the wide-angle end of the variable-power optical system relating to Example 11.

FIG. 14 is a cross sectional view traversing the optical axis (AX), representing the arrangement of the lens group in the variable-power optical system 1K of Example 11. The variable-power optical system 1K of Example 11 includes a first lens group (Gr1) having the negative optical power as a whole, an optical stop (ST), a second lens group (Gr2) having the positive optical power as a whole, a third lens group (Gr3) having the negative optical power, and a fourth lens group (Gr4) having the positive optical power, arranged in that order as viewed from the object side. To put it in more detail, the first lens group (Gr1) is composed of a biconcave negative lens (L1), and a positive meniscus lens (L2) with a convex surface facing the object side, arranged in that order as viewed from the object side. The second lens group (Gr2) is composed of a positive meniscus lens (L3) with a convex surface facing the object side, and a cemented lens formed of a biconvex positive lens (L4) and a negative meniscus lens (L5) with a convex surface facing the image side, arranged in that order as viewed from the object side. The third lens group (Gr3) is composed of one negative meniscus lens (L6) with a convex surface facing the object side. The fourth lens group (Gr4) is composed of one biconvex positive lens (L7).

In the variable-power optical system 1K of Example 11 of the aforementioned lens structure, at the time of zooming from the wide-angle end (W) to the telephoto end (T), as shown in FIG. 28b, the second lens group (Gr2) linearly moves toward the object, and the third lens group (Gr3) makes a U-turn to form a convex shape projecting to the object side. In the meantime, the first lens group (Gr1) and the fourth lens group (Gr4) are statically positioned. The optical stop (ST) travels together with the second lens group (Gr2) at the time of varying the power.

Tables 22 and 23 show the construction data of each lens in the variable-power optical system 1K of Example 11. As shown in these Tables and FIG. 14, in the Example 11, the first, third, sixth and seventh lenses (L1, L3, L6 and L7) are designed as bi-aspheric surface lenses, and the fifth lens (L5) is designed as a lens with a single aspheric surface. The sixth and seventh lenses (L6 and L7) are resin lenses, and other lenses are glass lenses.

TABLE 22

| Lens surface | Curvature radius (mm) | On-axis distance between surfaces (mm) | | | Refractive index | Abbe number |
|---|---|---|---|---|---|---|
| | | W | M | T | | |
| r1* | −359.342 | | | | | |
| | | 0.907 | | | 1.69350 | 53.89 |
| r2* | 4.925 | | | | | |
| | | 3.429 | | | | |
| r3 | 12.935 | | | | | |
| | | 1.213 | | | 1.92286 | 20.88 |
| r4 | 22.936 | | | | | |
| | | 15.086 | 5.809 | 0.600 | | |
| r5 (Stop) | ∞ | | | | | |
| | | 0.000 | | | | |
| r6* | 5.403 | | | | | |
| | | 1.413 | | | 1.48749 | 70.44 |
| r7* | 55.376 | | | | | |
| | | 3.074 | | | | |
| r8 | 10.022 | | | | | |
| | | 1.793 | | | 1.48749 | 70.44 |
| r9 | −5.963 | | | | | |
| | | 0.502 | | | 1.74876 | 28.41 |
| r10* | −31.137 | | | | | |
| | | 1.600 | 3.552 | 8.787 | | |
| r11* | 14.057 | | | | | |
| | | 0.700 | | | 1.53048 | 55.72 |
| r12* | 4.421 | | | | | |
| | | 1.764 | 9.090 | 9.063 | | |
| r13* | 54.166 | | | | | |
| | | 3.666 | | | 1.53048 | 55.72 |
| r14* | −7.808 | | | | | |
| | | 5.052 | | | | |
| r15 | ∞ | | | | | |
| | | 0.300 | | | 1.51680 | 64.20 |
| r16 | ∞ | | | | | |
| | | 0.500 | | | | |
| r17 (Image plane) | ∞ | | | | | |

TABLE 23

| Lens surface | Conic constant | Aspheric surface coefficient | | | | | |
|---|---|---|---|---|---|---|---|
| | | A | B | C | D | E | F |
| r1 | 0 | −8.95E−04 | 1.16E−04 | −8.38E−06 | 3.44E−07 | −7.50E−09 | 1.00E−10 |
| r2 | 0 | −1.90E−03 | 1.02E−04 | −7.04E−06 | −7.93E−08 | 1.94E−08 | −6.00E−10 |
| r6 | 0 | −2.41E−04 | 1.64E−05 | 3.62E−06 | −1.78E−06 | 2.41E−07 | −1.04E−08 |
| r7 | 0 | −3.59E−05 | 4.73E−05 | −7.23E−06 | 4.99E−07 | 0.00E+00 | 0.00E+00 |
| r10 | 0 | 8.12E−04 | 2.34E−05 | 4.82E−07 | 1.17E−07 | 0.00E+00 | 0.00E+00 |
| r11 | 0 | −6.56E−03 | 5.90E−04 | −5.81E−05 | 5.25E−06 | −2.85E−07 | 6.80E−09 |
| r12 | 0 | −8.09E−03 | 7.30E−04 | −1.03E−04 | 1.23E−05 | −9.33E−07 | 3.04E−08 |
| r13 | 0 | −7.43E−04 | −2.86E−07 | −2.70E−07 | −2.31E−08 | 0.00E+00 | 0.00E+00 |
| r14 | 0 | −2.70E−04 | 6.44E−06 | −2.51E−07 | −8.20E−09 | 0.00E+00 | 0.00E+00 |

Example 12

Figure 15:
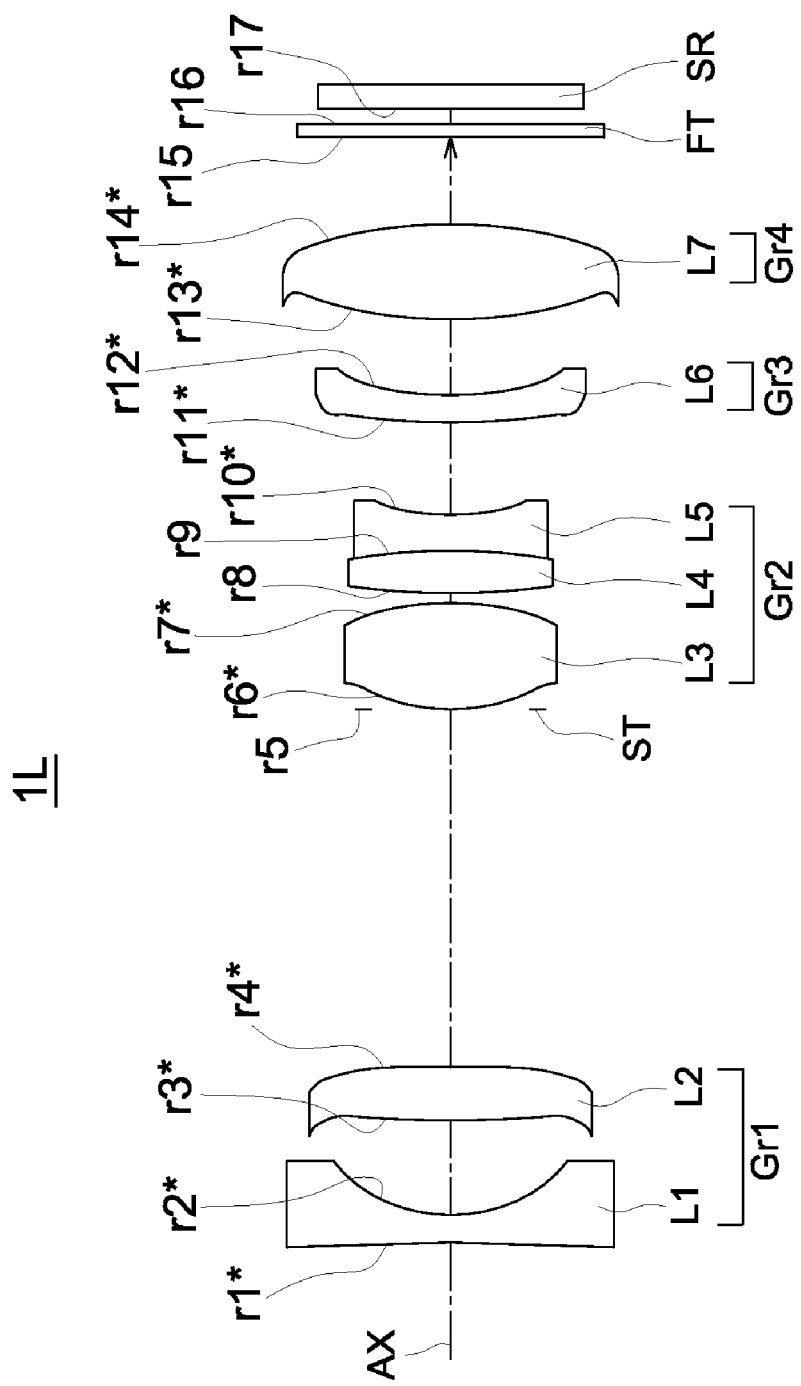
FIG. 15 is a cross sectional view showing the optical path at the wide-angle end of the variable-power optical system relating to Example 12.

FIG. 15 is a cross sectional view traversing the optical axis (AX), representing the arrangement of the lens group in the variable-power optical system 1L of Example 12. The variable-power optical system 1K of Example 12 includes a first lens group (Gr1) having the negative optical power as a whole, an optical stop (ST), a second lens group (Gr2) having the positive optical power as a whole, a third lens group (Gr3) having the negative optical power, and a fourth lens group (Gr4) having the positive optical power, arranged in that order as viewed from the object side. To put it in more detail, the first lens group (Gr1) is composed of a biconcave negative lens (L1), and a biconvex positive lens (L2), arranged in that order as viewed from the object side. The second lens group (Gr2) is composed of a biconvex positive lens (L3) and a cemented lens formed of a biconvex positive lens (L4) and a biconcave negative lens (L5), arranged in that order as viewed from the object side. The third lens group (Gr3) is composed of one negative meniscus lens (L6) with a convex surface facing the object side. The fourth lens group (Gr4) is composed of one biconvex positive lens (L7).

In the variable-power optical system 1L having the aforementioned lens configuration in Example 12, at the time of zooming from the wide-angle end (W) to the telephoto end (T), as shown in FIG. 28b, the second lens group (Gr2) linearly moves toward the object, and the third lens group (Gr3) makes a U-turn to form a convex shape projecting to the object side, as shown in FIG. 28b. In the meantime, the first lens group (Gr1) and fourth lens group (Gr4) are statically positioned. The optical stop (ST) travels together with the second lens group (Gr2) at the time of varying the power.

Tables 24 and 25 show the construction data of each lens in the variable-power optical system 1L of Example 12. As shown in these Tables and FIG. 15, in the Example 12, the first, second, third, sixth and seventh lenses (L1, L2, L3, L6 and L7) are designed as bi-aspheric surface lenses, and the fifth lens (L5) is designed as a lens with a single aspheric surface lens. The sixth and seventh lenses (L6 and L7) are resin lenses, and other lenses are glass lenses.

TABLE 24

| Lens surface | Curvature radius (mm) | On-axis distance between surfaces (mm) | | | Refractive index | Abbe number |
|---|---|---|---|---|---|---|
| | | W | M | T | | |
| r1* | −102.669 | | | | | |
| | | 0.800 | | | 1.68980 | 52.82 |
| r2* | 4.309 | | | | | |
| | | 2.595 | | | | |
| r3* | 24.974 | | | | | |
| | | 1.545 | | | 1.80542 | 26.13 |
| r4* | −49.286 | | | | | |
| | | 10.199 | 5.098 | 0.794 | | |
| r5 (Stop) | ∞ | | | | | |
| | | 0.000 | | | | |
| r6* | 5.486 | | | | | |
| | | 3.000 | | | 1.58913 | 61.24 |
| r7* | −10.938 | | | | | |
| | | 0.268 | | | | |
| r8 | 29.635 | | | | | |
| | | 1.198 | | | 1.70500 | 54.86 |
| r9 | −18.216 | | | | | |
| | | 0.958 | | | 1.80542 | 26.13 |
| r10* | 8.359 | | | | | |
| | | 2.643 | 2.313 | 7.911 | | |
| r11* | 22.504 | | | | | |
| | | 0.762 | | | 1.53048 | 55.72 |
| r12* | 8.855 | | | | | |
| | | 2.151 | 7.582 | 6.289 | | |
| r13* | 13.595 | | | | | |
| | | 2.658 | | | 1.53048 | 55.72 |
| r14* | −13.740 | | | | | |
| | | 2.423 | | | | |
| r15 | ∞ | | | | | |
| | | 0.300 | | | 1.51680 | 64.20 |
| r16 | ∞ | | | | | |
| | | 0.500 | | | | |
| r17 (Image plane) | ∞ | | | | | |

TABLE 25

| Lens surface | Conic constant | Aspheric surface coefficient | | | | | | |
|---|---|---|---|---|---|---|---|---|
| | | A | B | C | D | E | F | G |
| r1 | 0 | −2.10E−03 | 2.89E−04 | −1.56E−05 | 3.63E−07 | −3.00E−09 | 3.91E−12 | 0.00E+00 |
| r2 | 0 | −4.28E−03 | 3.22E−04 | −1.64E−05 | 2.71E−06 | −3.18E−07 | 9.50E−09 | 0.00E+00 |
| r3 | 0 | −8.46E−04 | −6.36E−05 | 1.20E−05 | 2.95E−08 | −7.30E−08 | 1.80E−09 | 0.00E+00 |
| r4 | 0 | −7.90E−04 | −3.56E−05 | −8.85E−07 | 1.84E−06 | −2.54E−07 | 1.25E−08 | −2.00E−10 |
| r6 | 0 | −1.09E−03 | −6.92E−05 | 8.04E−06 | −4.21E−06 | 5.65E−07 | −3.21E−08 | 0.00E+00 |
| r7 | 0 | −1.31E−03 | 3.67E−05 | −2.04E−05 | 2.12E−06 | −1.43E−07 | 2.20E−09 | 0.00E+00 |
| r10 | 0 | 2.77E−03 | 8.04E−05 | 9.64E−06 | −2.46E−07 | 0.00E+00 | 0.00E+00 | 0.00E+00 |
| r11 | 0 | −1.52E−03 | 5.18E−04 | −9.43E−05 | 1.28E−05 | −1.06E−06 | 3.40E−08 | 0.00E+00 |
| r12 | 0 | −1.52E−03 | 5.56E−04 | −9.78E−05 | 1.32E−05 | −1.06E−06 | 3.26E−08 | 0.00E+00 |
| r13 | −1 | 1.03E−03 | −3.01E−04 | 4.55E−05 | −3.90E−06 | 1.68E−07 | −2.80E−09 | 0.00E+00 |
| r14 | 0 | 3.08E−03 | −6.84E−04 | 8.94E−05 | −6.85E−06 | 2.69E−07 | −4.10E−09 | 0.00E+00 |

FIGS. 17 through 27 show spherical aberration, astigmatism, and distortion of the variable-power optical systems 1B through 1L of the aforementioned Examples 2 through 12, respectively, based on the aforementioned lens arrangements and configurations. Similarly to the case of FIG. 16, in the diagram illustrating the spherical aberration, aberrations at the time of using three beams of light having different wavelengths are shown. Namely, the one-dot chain line indicates a red color, the solid line denotes a yellow color and the broken line represents a blue color. The lens groups of all these Examples exhibit excellent optical characteristics wherein the distortion aberration is kept at 5% or less at any of the wide-angle end (W), intermediate point (M) and telephoto end (T).

Tables 26 and 27 show the focal length (in mm) and F value at the wide-angle end (W), intermediate point (M) and telephoto end (T) in each of the variable-power optical systems 1B through 1L in Examples 2 through 12. These Tables demonstrate that an optical system with a short focal length and excellent performance in terms of speed is realized, as in the case of Example 1.

TABLE 26

| | Focal length (mm) | | |
|---|---|---|---|
| | W | M | T |
| Example 1 | 4.8 | 8.1 | 13.2 |
| Example 2 | 5.4 | 9.1 | 14.8 |
| Example 3 | 3.6 | 7.2 | 10.3 |
| Example 4 | 5.4 | 9.1 | 14.8 |
| Example 5 | 4.9 | 8.4 | 13.6 |
| Example 6 | 5.6 | 9.5 | 15.3 |

TABLE 26-continued

| | Focal length (mm) | | |
|---|---|---|---|
| | W | M | T |
| Example 7 | 5.5 | 9.4 | 15.1 |
| Example 8 | 5.1 | 8.7 | 14.1 |
| Example 9 | 5.5 | 13.2 | 20.6 |
| Example 10 | 4.6 | 7.7 | 12.5 |
| Example 11 | 5.4 | 11.8 | 20.1 |
| Example 12 | 5.4 | 9.1 | 14.8 |

TABLE 27

| | F value | | |
|---|---|---|---|
| | W | M | T |
| Example 1 | 3.4 | 4.7 | 6.0 |
| Example 2 | 3.3 | 4.5 | 5.8 |
| Example 3 | 3.0 | 4.3 | 5.3 |
| Example 4 | 2.8 | 3.8 | 4.9 |
| Example 5 | 3.3 | 4.5 | 5.9 |
| Example 6 | 3.3 | 4.5 | 5.9 |
| Example 7 | 3.2 | 4.5 | 5.9 |
| Example 8 | 3.4 | 4.6 | 6.0 |
| Example 9 | 3.3 | 5.3 | 6.6 |
| Example 10 | 3.3 | 4.4 | 5.5 |
| Example 11 | 3.3 | 5.1 | 6.6 |
| Example 12 | 2.8 | 3.8 | 5.0 |

Tables 28 and 29 show values obtained by applying the aforementioned conditional expressions (1) through (14) to each of the variable-power optical systems 1B through 1L in Examples 2 through 12.

TABLE 28

| | | Example 1 | Example 2 | Example 3 | Example 4 | Example 5 | Example 6 | Example 7 | Example 8 |
|---|---|---|---|---|---|---|---|---|---|
| Conditional expression (1) | $T1/(fw \times ft)^{1/2}$ | 0.32 | 0.42 | 0.70 | 0.54 | 0.48 | 0.47 | 0.45 | 0.49 |
| Conditional expression (2) | $\Delta N2$ | 0.259 | 0.216 | 0.254 | 0.216 | 0.216 | 0.216 | 0.216 | 0.390 |
| Conditional expression (3) | $\Delta \nu 2$ | 31.7 | 35.1 | 51.0 | 35.8 | 35.1 | 35.1 | 35.1 | 60.0 |
| Conditional expression (4) | N1 | 1.80000 | 1.80542 | 2.00170 | 1.80542 | 1.80542 | 1.80542 | 1.80542 | 2.00170 |
| Conditional expression (5) | N1p | 1.80000 | 1.80542 | 2.00170 | 1.80542 | 1.80542 | 1.80542 | 1.80542 | 2.00170 |
| Conditional expression (6) | f2/fw | 0.90 | 1.34 | 1.92 | 1.62 | 1.52 | 1.24 | 1.30 | 1.22 |
| Conditional expression (7) | |f3/fw| | 0.86 | 4.01 | 38.19 | 3.69 | 5.74 | 3.01 | 3.44 | 2.67 |
| Conditional expression (8) | $|D3/(fw \times ft)^{1/2}|$ | 0.49 | 0.42 | 0.29 | 0.37 | 0.39 | 0.55 | 0.79 | 0.50 |

TABLE 28-continued

|  |  | Example 1 | Example 2 | Example 3 | Example 4 | Example 5 | Example 6 | Example 7 | Example 8 |
|---|---|---|---|---|---|---|---|---|---|
| Conditional expression (9) | h1/TLw | 0.13 | 0.15 | 0.21 | 0.13 | 0.17 | 0.16 | 0.16 | 0.17 |
| Conditional expression (10) | $T12/(fw \times ft)^{1/2}$ | 0.08 | 0.07 | 0.25 | 0.07 | 0.10 | 0.11 | 0.17 | 0.09 |
| Conditional expression (11) | \|EPw/fw\| | 1.96 | 2.26 | 2.49 | 3.73 | 2.40 | 1.99 | 1.85 | 2.44 |
| Conditional expression (12) | \|f1n/f1p\| | 0.33 | 0.33 | 0.26 | 0.29 | 0.33 | 0.36 | 0.31 | 0.25 |
| Conditional expression (13) | Lb/fw | 0.30 | 0.43 | 0.69 | 0.62 | 0.82 | 0.58 | 0.29 | 0.36 |
| Conditional expression (14) | f2/ft | 0.33 | 0.49 | 0.68 | 0.59 | 0.55 | 0.45 | 0.47 | 0.45 |

TABLE 29

|  |  | Example 9 | Example 10 | Example 11 | Example 12 |
|---|---|---|---|---|---|
| Conditional expression (1) | $T1/(fw \times ft)^{1/2}$ | 0.43 | 0.61 | 0.53 | 0.55 |
| Conditional expression (2) | ΔN2 | 0.241 | 0.247 | 0.261 | 0.158 |
| Conditional expression (3) | Δv2 | 25.1 | 27.4 | 42.0 | 31.9 |
| Conditional expression (4) | N1 | 1.80542 | 1.80542 | 1.92286 | 1.80542 |
| Conditional expression (5) | N1p | 1.80542 | 1.80542 | 1.92286 | 1.80542 |
| Conditional expression (6) | f2/fw | 1.55 | 1.70 | 1.80 | 1.67 |
| Conditional expression (7) | \|f3/fw\| | 1.91 | 2.95 | 2.32 | 5.23 |
| Conditional expression (8) | $\|D3/(fw \times ft)^{1/2}\|$ | 0.73 | 0.64 | 0.70 | 0.46 |
| Conditional expression (9) | h1/TLw | 0.12 | 0.16 | 0.12 | 0.13 |
| Conditional expression (10) | $T12/(fw \times ft)^{1/2}$ | 0.06 | 0.08 | 0.06 | 0.09 |
| Conditional expression (11) | \|EPw/fw\| | 5.06 | 3.95 | 5.35 | 4.16 |
| Conditional expression (12) | \|f1n/f1p\| | 0.31 | 0.27 | 0.23 | 0.29 |
| Conditional expression (13) | Lb/fw | 0.80 | 0.92 | 1.07 | 0.58 |
| Conditional expression (14) | f2/ft | 0.41 | 0.62 | 0.48 | 0.61 |

As described above, according to the variable-power optical systems 1A through 1L of Examples 1 through 12, it is possible to provide a less expensive zoom lens that permits satisfactory correction of various forms of aberrations over the entire variable-power region, and ensures extremely compact configuration particularly in the variable-power optical system having a variable-power ratio of about 2 to 4 times.

The invention claimed is:

1. A variable-power optical system comprising, in order from an object side thereof:
   a first lens group with a negative optical power;
   a second lens group with a positive optical power;
   a third lens group with a negative optical power; and
   a fourth lens group with a positive optical power,
   wherein an interval between the first lens group and the second lens group decreases when a power of the variable-power optical system varies from a wide-angle end to a telephoto end,
   the first lens group comprises a meniscus lens with a positive optical power including a convex surface facing the object side,
   the second lens group includes at least one aspheric surface,
   the variable-power optical system further comprising an aperture stop arranged on the object side of the second lens group, an aperture diameter of the aperture stop being fixed, and
   the variable-power optical system satisfies the following expressions (1) through (4):

$$0.3 < T1/(fw \times ft)^{1/2} < 0.8, \quad (1)$$

$$\Delta N2 > 0.15, \quad (2)$$

$$\Delta v\, 2 > 20, \quad (3)$$

$$N1 \geq 1.8, \quad (4)$$

$$N1p \geq 1.8, \quad (5)$$

where T1 is an axial thickness from a front lens surface of the first lens group to a rear lens surface of the first lens group,
fw is a composite focal length of a total optical system of the variable-power optical system at the wide-angle end,
ft is a composite focal length of the total optical system at the telephoto end, ΔN2 is a difference between a mean refractive index of a positive lens or lenses and a mean refractive index of a negative lens or lenses, among lenses in the second lens group, Δν 2 is a difference between a mean Abbe number of a positive lens or lenses and a mean Abbe number of a negative lens or lenses, among lenses in the second lens group, N1 is a maximum value of refractive indices of lenses in the first lens group; and N1p is a refractive index of the meniscus lens in the first lens group.

2. The variable-power optical system of claim 1, wherein the second lens group satisfies the expression (6):

$$0.6 < f2/fw < 2.0, \quad (6)$$

where f2 is a composite focal length of the second lens group.

3. The variable-power optical system of claim 1, wherein the second lens group comprises two positive lenses and one negative lens.

4. The variable-power optical system of claim 1, wherein the second lens group consists of three lenses including a positive lens, a negative lens, and a positive lens, in order from the object side.

5. The variable-power optical system of claim 1, wherein the variable-power optical system adjusts a focal point from an object at an infinite distance to an object to a near distance by moving the third lens group toward an image side, and the variable-power optical system satisfies the expression (7):

$$1.5 < |f3/fw| < 6.0, \quad (7)$$

where f3 is a composite focal length of the third lens group.

6. The variable-power optical system of claim 1, wherein the third lens group moves to form a locus in a convex shape projecting to the object side, when the power varies from the wide-angle end to the telephoto end, and the variable-power optical system satisfies the expression (8):

$$|D3/(fw \times ft)^{1/2}| < 1.5, \quad (8)$$

where D3 is a displacement amount of the third lens group when the power varies from the wide-angle end to the telephoto end.

7. The variable-power optical system of claim 1, wherein the first lens group is statically positioned when the power varies from the wide-angle end to the telephoto end, and the variable-power optical system satisfies the expression (9):

$$0.1 < h1/TLw, \quad (9)$$

where h1 is a radius of an effective optical path of a lens surface arranged at a closest position to the object side in the variable-power optical system, at the wide-angle end, and TLw is a distance on an optical axis from a tip of a lens surface to an image plane, at a wide-angle end, when an object is placed at an infinite distance, the lens surface being arranged at a closest position to the object side in the variable-power optical system.

8. The variable-power optical system of claim 1, further comprising:

a device adjusting a light amount arranged on an image side of the second lens group, wherein the variable-power optical system satisfies the following expression (10):

$$T12/(fw \times ft)^{1/2} < 0.3, \quad (10)$$

where T12 is an axial interval between the first lens group and the second lens group at the telephoto end.

9. The variable-power optical system of claim 1, wherein the fourth lens group is statically positioned when the power varies from the wide-angle end to the telephoto end, and the variable-power optical system satisfies the expression (11):

$$1.0 < |EPw/fw| < 8.0, \quad (11)$$

where EPw is a distance from an exit pupil position of a principal ray of a maximum angle of view to an image plane, at the wide-angle end.

10. The variable-power optical system of claim 1, wherein the variable-power optical system consists of four lens groups.

11. The variable-power optical system of claim 1, wherein only two lens groups including a lens group for varying the power and a lens group for correcting a shift of an image plane due to zooming, are movable when the power varies.

12. The variable-power optical system of claim 1, wherein the first lens group consists of a negative lens and a positive lens in order from the object side, and the variable-power optical system satisfies the expression (12):

$$0.15 < |fln/flp| < 0.50, \quad (12)$$

where flp is a focal length of the positive lens in the first lens group, and fln is a focal length of the negative lens in the first lens group.

13. The variable-power optical system of claim 1, wherein the variable-power optical system includes at least one lens made of a resin material.

14. The variable-power optical system of claim 13, wherein the lens made of a resin material is a lens formed with a material in which particles with a maximum size of 30 nm or less are dispersed into a resin material.

15. The variable-power optical system of claim 13, wherein a positive lens in the fourth lens group or in a lens group arranged at a closer position to an image side than the fourth lens group, is made of a resin material.

16. An image pickup device, comprising:

a variable-power optical system of claim 1, and an image pickup element converting an optical image to electric signal, wherein the variable-power optical system is capable of forming an optical image of an object onto a light receiving surface of the image pickup element.

17. A digital apparatus comprising:

an image pickup device of claim 16, and a controller for capturing at least one of a still image and a moving image, wherein a variable-power optical system in the image pickup device is mounted thereto so as to be capable of forming an optical image of an object onto a light receiving surface of an image pickup element.

18. The digital apparatus of claim 17, wherein the digital apparatus is a mobile terminal.

19. The variable-power optical system of claim 1, wherein the variable-power optical system satisfies the following expression:

$$0.32 \leq T1/(fw \times ft)^{1/2} < 0.8.$$

* * * * *